(12) United States Patent
Nasu

(10) Patent No.: US 7,333,738 B2
(45) Date of Patent: Feb. 19, 2008

(54) ELECTRONIC APPARATUS, EXPENDABLE ITEM RECYCLING APPARATUS, EXPENDABLE ITEM, ELECTRONIC APPARATUS CONTROL METHOD, EXPENDABLE ITEM RECYCLING METHOD, PROGRAM, AND COMPUTER-READABLE MEDIUM

(75) Inventor: Masami Nasu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 186 days.

(21) Appl. No.: 11/194,884

(22) Filed: Aug. 2, 2005

(65) Prior Publication Data

US 2006/0029400 A1    Feb. 9, 2006

(30) Foreign Application Priority Data

Aug. 3, 2004    (JP) .............................. 2004-227081

(51) Int. Cl.
*G03G 15/00* (2006.01)

(52) U.S. Cl. ........................... 399/12; 399/81; 399/109

(58) Field of Classification Search ................... 399/8, 399/9, 12, 13, 23, 24, 25, 27, 31, 109, 81
See application file for complete search history.

(56) References Cited

U.S. PATENT DOCUMENTS 6,366,742 B1 *    4/2002    Reihl et al. ................... 399/12

FOREIGN PATENT DOCUMENTS

| JP | 2002-318511 | 10/2002 |
| JP | 2002-333800 | 11/2002 |

* cited by examiner

*Primary Examiner*—Hoang Ngo
(74) *Attorney, Agent, or Firm*—Oblon, Spivak, McClelland, Maier & Neustadt, P.C.

(57) ABSTRACT

A technique is disclosed for storing in a recyclable expendable item used in an electronic apparatus first encrypted information generated by encrypting usable/unusable information pertaining to the expendable item using a first key, and a second key corresponding to the first key, decoding the first encrypted information using the second key; and controlling an operation of the electronic apparatus based on a decoding result of the decoding part and decoded usable/unusable information obtained by the decoding part.

39 Claims, 34 Drawing Sheets

FIG.4
(a) MANUFACTURING/RECYCLING PROCESSES AT A QUALIFIED FACILITY
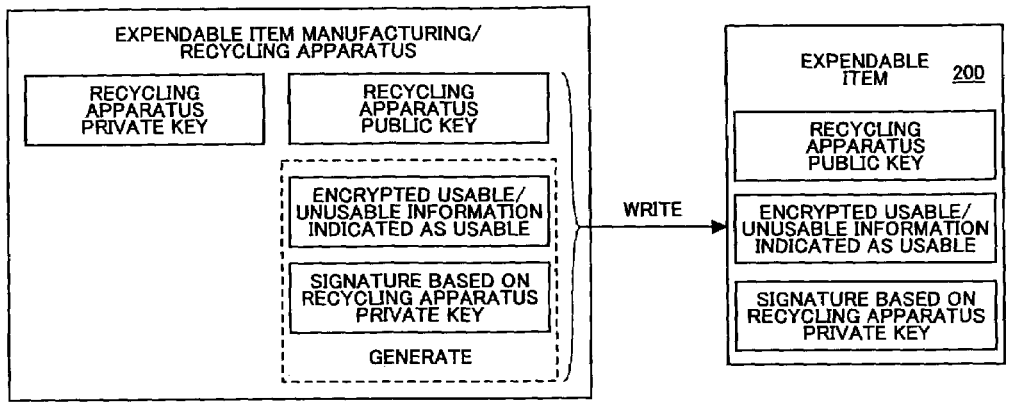
(b) START OF EXPENDABLE ITEM USAGE
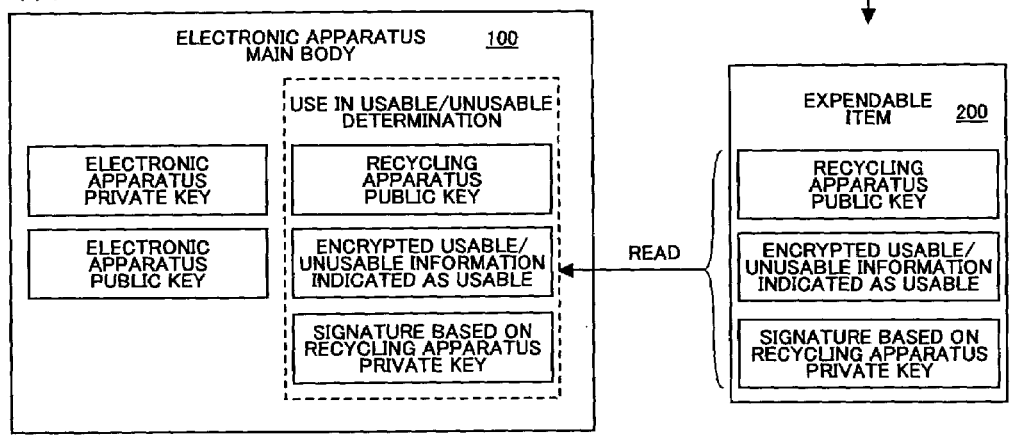
(c) AFTER END OF EXPENDABLE ITEM USAGE
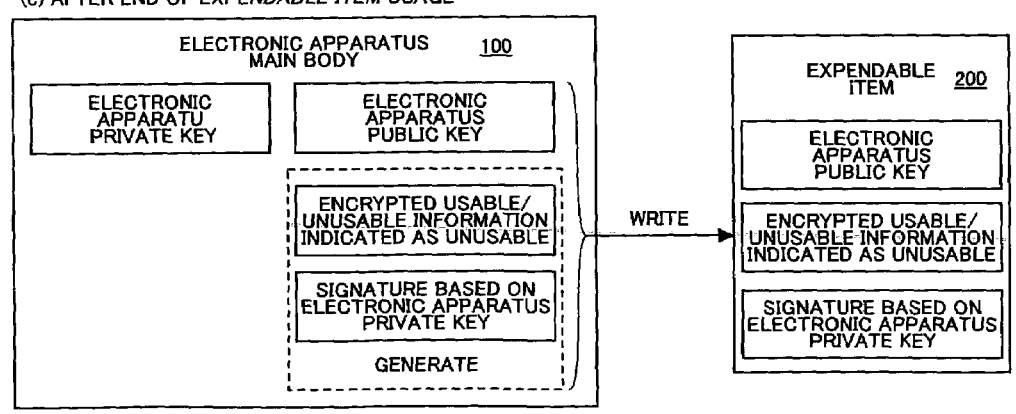

FIG.7
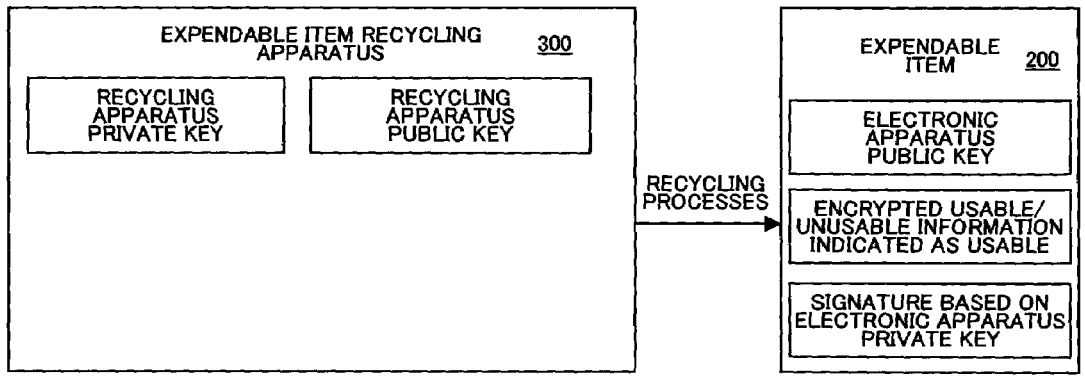
(a) RECYCLING PROCESSES AT A QUALIFIED FACILITY
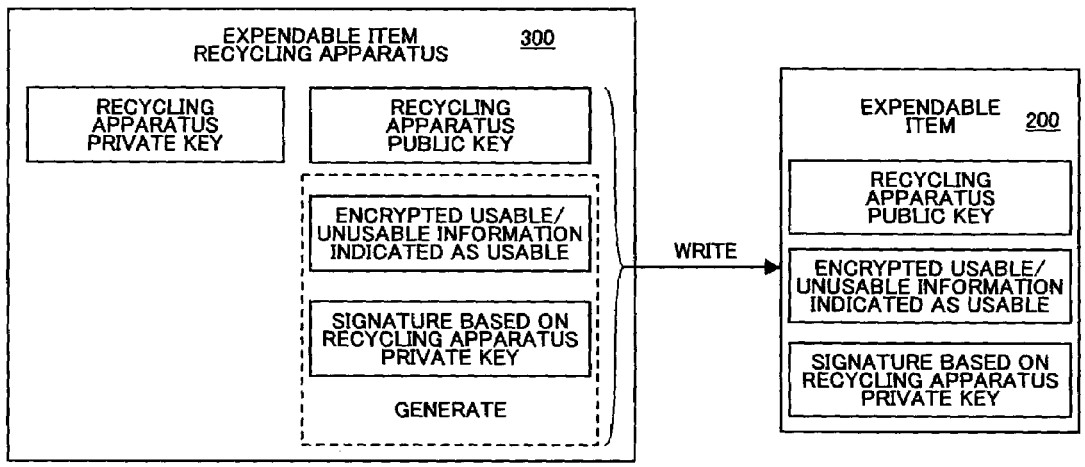
(b) AFTER COMPLETION OF RECYCLING PROCESSES
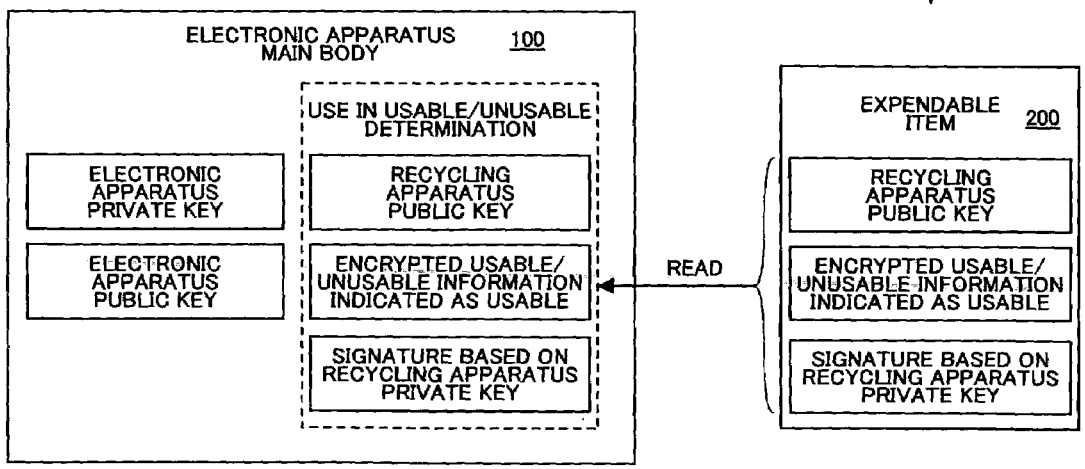
(c) START OF EXPENDABLE ITEM USAGE

FIG.8
(a) RECYCLING PROCESSES AT AN UNQUALIFIED FACILITY
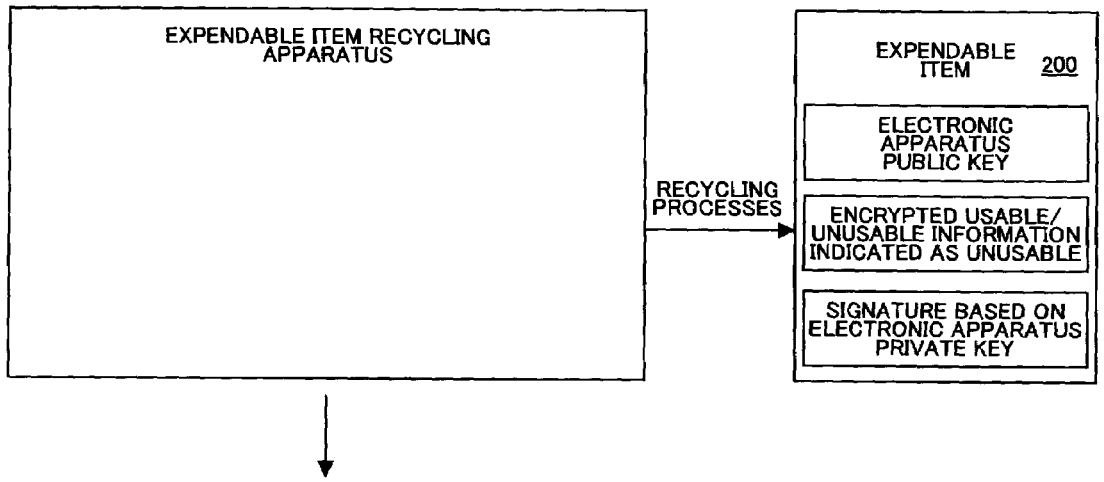
(b) AFTER COMPLETION OF RECYCLING PROCESSES
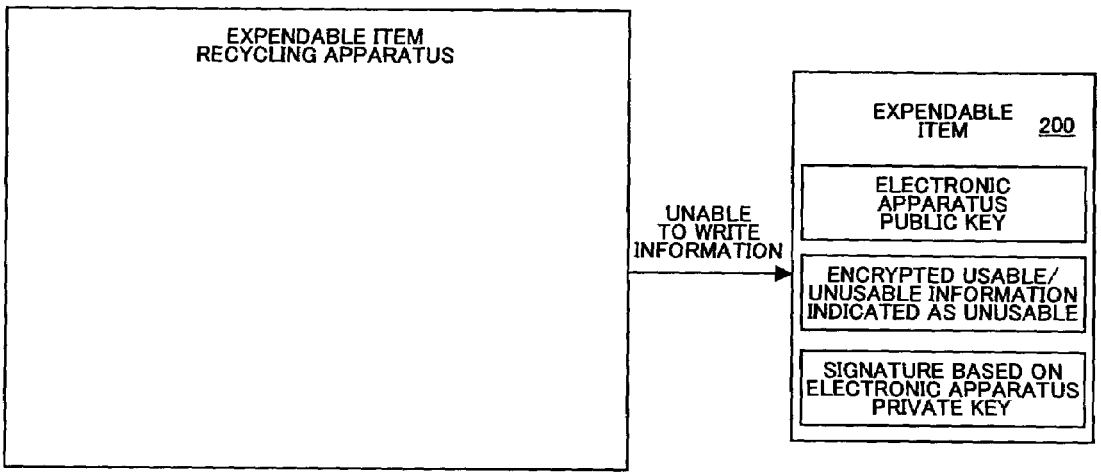
(c) START OF RECYCLED ITEM USAGE
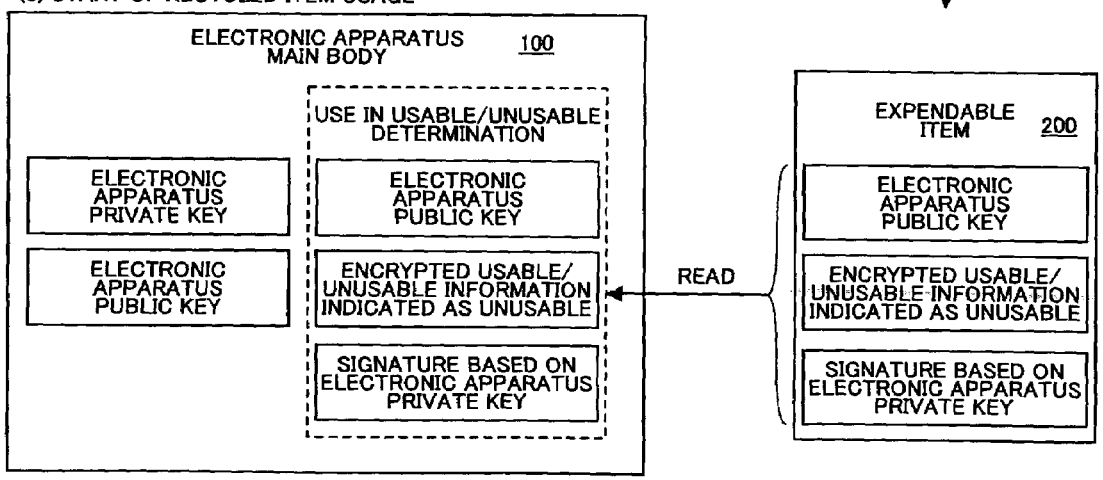

140

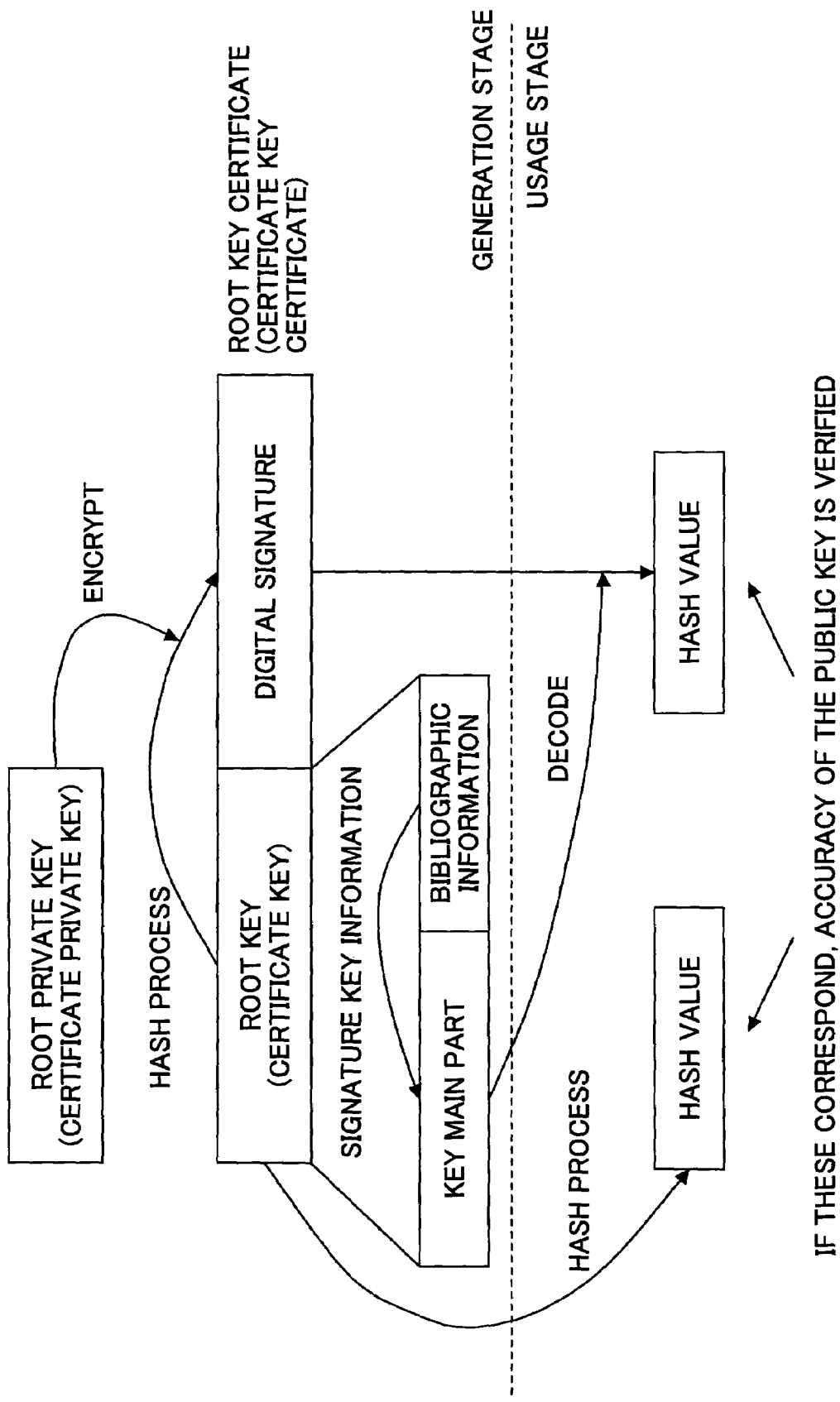

FIG.17A

| USABLE/UNUSABLE | USABLE |
| --- | --- |

FIG.17B

| EXPANDABLE ITEM STATE (REMAINDER) | full |
| --- | --- |
| NUMBER OF TIMES USED (RECYCLED) | 1 |
| USABLE/UNUSABLE | USABLE |

FIG.27

| PROCESS CARTRIDGE AUTHENTICATION FAILURE |
|---|
| THE CURRENTLY INSTALLED PROCESS CARTRIDGE IS NOT AUTHORIZED TO BE USED IN THIS APPARATUS. PLEASE CHANGE THIS TO AN APPROPRIATE PROCESS CARTRIDGE. |

FIG.28

ELECTRONIC APPARATUS, EXPENDABLE ITEM RECYCLING APPARATUS, EXPENDABLE ITEM, ELECTRONIC APPARATUS CONTROL METHOD, EXPENDABLE ITEM RECYCLING METHOD, PROGRAM, AND COMPUTER-READABLE MEDIUM

BACKGROUND OF THE INVENTION

1. Field of the Invention

The present invention relates to an electronic apparatus that uses a recyclable expendable item, an expendable item recycling apparatus for recycling an expendable item used in such an electronic apparatus, a recyclable expendable item used in such an electronic apparatus, a control method for controlling the electronic apparatus, a recycling method for recycling the expendable item, a program executed by a computer for controlling the electronic apparatus or the expendable item recycling apparatus, and a computer-readable medium storing such a program.

2. Description of the Related Art

In many cases, an apparatus includes a part that is arranged into a detachable unit that may be detached from the apparatus main body so that when such a unit breaks down, is worn out or expended, or reaches the end of its service life to thereby become unusable, the unit may be easily replaced with a new one by a user or a serviceperson so that operations of the apparatus as a whole may be maintained.

Such an arrangement is particularly useful in an apparatus that includes a component part that is less durable than other parts of the apparatus, and/or a member that is exchanged as is necessary or desired such as an expendable item that is worn out or expended with the operation of the apparatus to become unusable.

It is noted that a process cartridge used for image formation in an imaging apparatus such as an electrophotographic printer, a digital copier, or a digital multi-function printer corresponds to one specific example of the unit described above. Also, in such an imaging apparatus, components such as a photoconductor drum, an electrostatic unit, a developing unit, a toner bottle, a cleaning unit, an optical unit, a transfer unit, a paper feeding unit, and a fixing unit may be arranged into exchangeable units as well.

It is noted that some of the expendable items described above may be restored from an unusable state to a reusable state after undergoing a predetermined recycling process. For example, a process cartridge becomes unusable when toner corresponding to its content is consumed and depleted; however, after undergoing required inspection and cleaning processes, the toner may be refilled into the process cartridge so that it may be reused in the imaging apparatus.

In general, the recycling process as is described above is preferably performed by the manufacturer of the corresponding apparatus, or under conditions in which the manufacturer of the apparatus is able to adequately control the quality of the items being recycled. It is noted that expendable items recycled under such circumstances are referred to as "qualified recycled items". By recycling expendable items under such circumstances, even recycled items for which quality control is generally conceived as difficult for achieving sufficient quality may be stably supplied in a state similar to that of a new item by properly excluding items that are not fit for recycling according to their used states, for example. It is noted that new expendable items that are either manufactured by the manufacturer of the corresponding apparatus or is manufactured under conditions in which the manufacturer of the apparatus is able to adequately control the quality of the newly manufactured expendable items are referred to as "genuine items".

In recent years and continuing, "unqualified recycled items" are being produced by manufacturers that are unrelated to the manufacturer of the corresponding apparatus.

Generally, the manufacturer of the apparatus is unable to control the quality of such unqualified recycled items. Thereby, in a case where an unqualified recycled item is used, proper operation of the apparatus may not be ensured. Also, in such a case, even when the apparatus appears to be operating normally, defects may occur at detailed parts of the apparatus and problems may be prone to occur. For example, in the case of the imaging apparatus, the image quality may be degraded as a result of using such an unqualified recycled item. In turn, such a defect may lead to the degradation of the reliability of the apparatus itself.

Accordingly, the manufacturer of the apparatus seeks measures for promoting the use of a genuine item or a qualified recycled item in the corresponding apparatus.

In response to such a demand, techniques such as those described in Japanese Laid-Open Patent Publication No. 2002-333800 and Japanese Laid-Open Patent Publication No. 2002-318511 have been developed in the prior art. Japanese Laid-Open Patent Publication No. 2002-333800 discloses a technique in which identification information is stored in the expendable item beforehand, and an imaging apparatus using the expendable item determines whether the identification information stored in the expendable item matches with identification information stored in the apparatus beforehand to determine whether image formation may be performed. By enabling image formation only when the identification information stored in the expendable item corresponds to identification information of a genuine item, use of expendable items other than genuine items may be prevented.

Japanese Laid-Open Patent Publication No. 2002-318511 discloses a technique involving encrypting cartridge ID number information and recycling process history information using predetermined key information and storing the encrypted information in a toner cartridge so that when the toner cartridge is connected to a printer, the stored information may be transmitted to a management center. At the management center, the received information is decoded using key information that is stored in association with the cartridge ID number information. If the information is successfully decoded, the key information is transmitted to the printer. Upon receiving the key information, the printer may read information from the memory of the toner cartridge, decode the information, and write the decoded information in an EEPROM to enable operation of the printer.

However, in the technique disclosed in Japanese Laid-Open Patent Publication No. 2002-333800, once the identification information registered in the apparatus is analyzed and determined, the same identification information may easily be registered in an expendable item. In a specific example, a supplier of non-genuine items (i.e., new expendable items that do not correspond to genuine items) may register the same identification information in the non-genuine items, and in turn, genuine items and non-genuine items may become undistinguishable at the apparatus side.

Also, it is noted that the quality of a non-genuine item is not always inferior, and in some cases a non-genuine item may have the same quality as that of a genuine item. Thus, if operation of a corresponding apparatus is unconditionally disabled even when such a non-genuine item with adequate quality is used simply for the reason that the expendable item being used corresponds to a non-genuine item, this may lead to unnecessarily limiting the choices of the user of the apparatus, and may not be considered appropriate.

Further, it is noted that in Japanese Laid-Open Patent Publication No. 2002-333800, disclosures are not made pertaining to recycling of the units (items).

By using the technique disclosed in Japanese Laid-Open Patent Publication No. 2002-318511, a warning signal may be issued when a user uses a toner cartridge other than that which is genuine or qualified.

However, according to this disclosed technique, the determination of whether the loaded toner cartridge corresponds to a genuine item or a qualified recycled item is made at the management center. Therefore, in a case where the printer is unable to establish communication with the management center at the time the toner cartridge is loaded, operation of the printer may not be enabled even when a toner cartridge corresponding to a genuine item or a qualified recycled item is loaded in the printer. Also, since communication with the management center has to be established every time a toner cartridge is loaded, in an environment such as the dialup environment where connection takes time, and connection fees are charged at a metered rate, an unnecessary burden may be imposed on the user.

SUMMARY OF THE INVENTION

The present invention has been conceived in response to one or more of the problems of the related art, and its object is to provide a technique pertaining to use of a recyclable expendable item in an electronic apparatus which technique enables genuine items and qualified recycled items to be easily distinguished from non-genuine items and unqualified recycled items to thereby promote the use of genuine items and qualified recycled items in the electronic apparatus.

According to an aspect of the present invention, an electronic apparatus is provided that includes, a recyclable expendable item that stores usable/unusable information pertaining to the expendable item, first encrypted information generated by encrypting information corresponding to the usable/unusable information using a first key, and a second key corresponding to the first key;

a decoding part that decodes the first encrypted information using the second key; and a control part that controls an operation of the electronic apparatus based on a decoding result of the decoding part and the usable/unusable information.

In a preferred embodiment, the electronic apparatus of the present invention further includes:

a first write part that writes in the expendable item the usable/unusable information and second encrypted information generated by encrypting the information corresponding to the usable/unusable information using a third key; and a second write part that writes in the expendable item a fourth key corresponding to the third key.

According to another aspect of the present invention, an electronic apparatus is provided that includes:

a recyclable expendable item that stores first encrypted information generated by encrypting usable/unusable information pertaining to the expendable item using a first key, and a second key corresponding to the first key;

a decoding part that decodes the first encrypted information using the second key; and a control part that controls an operation of the electronic apparatus based on a decoding result of the decoding part and decoded usable/unusable information obtained by the decoding part.

In a preferred embodiment, the electronic apparatus of the present invention includes:

a first write part that writes in the expendable item second encrypted information generated by encrypting the usable/unusable information using a third key; and a second write part that writes in the expendable item a fourth key corresponding to the third key.

In another preferred embodiment of the present invention, the fourth key corresponds to a public key for the electronic apparatus, and the third key corresponds to a private key corresponding to this public key.

In another preferred embodiment of the present invention, the first key corresponds to a private key, and the second key corresponds to a public key corresponding to this private key.

In another preferred embodiment of the present invention, the control part includes a signaling part that signals a user when the usable/unusable information corresponds to information indicated as unusable.

In another preferred embodiment, the electronic apparatus of the present invention further includes:

a third write part that writes in the expendable item information indicating that the expendable item is unusable as the useable/unusable information when the expendable item becomes unusable.

According to another aspect of the present invention, an expendable item recycling apparatus that is configured to recycle a recyclable expendable item used in an electronic apparatus is provided, the expendable item recycling apparatus including:

a write part that writes in the expendable item usable/unusable information indicating that the expendable item is usable, encrypted information generated by encrypting information corresponding to the usable/unusable information using a first key, and a second key corresponding to the first key when the expendable item is recycled.

According to another aspect of the present invention, an expendable item recycling apparatus that is configured to recycle a recyclable expendable item used in an electronic apparatus is provided, the expendable item recycling apparatus including:

a write part that writes in the expendable item encrypted information generated by encrypting usable/unusable information indicating that the expendable item is usable using a first key, and a second key corresponding to the first key when the expendable item is recycled.

In a preferred embodiment of the present invention, the first key corresponds to a private key, and the second key corresponds to a public key corresponding to this private key.

In another preferred embodiment of the present invention, the second key corresponds to a public key for the expendable item recycling apparatus, and the first key corresponds to a private key corresponding to this public key.

According to another aspect of the present invention, a recyclable expendable item configured to be used in an electronic apparatus is provided, the expendable item including:

a storage part storing usable/unusable information pertaining to the expendable item, encrypted information generated by encrypting information corresponding to the usable/unusable information using a first key, and a second key corresponding to the first key.

According to another aspect of the present invention, a method of controlling an electronic apparatus that uses a recyclable expendable item that stores usable/unusable information pertaining to the expendable item, first encrypted information generated by encrypting information corresponding to the usable/unusable information using a first key, and a second key corresponding to the first key is provided, the method including the steps of controlling the electronic apparatus to execute:

a decoding procedure for decoding the first encrypted information using the second key; and a control procedure for performing an operation according to a decoding result of the decoding procedure and the usable/unusable information.

In a preferred embodiment, the method of the present invention further includes the steps for controlling the electronic apparatus to execute:

a first write procedure for writing in the expendable item the usable/unusable information and second encrypted information generated by encrypting the information corresponding to the usable/unusable information using a third key; and a second write procedure for writing in the expendable item a fourth key corresponding to the third key.

According to another aspect of the present invention, a method of controlling an electronic apparatus that uses a recyclable expendable item that stores first encrypted information generated by encrypting usable/unusable information pertaining to the expendable item using a first key, and a second key corresponding to the first key is provided, the method including the steps of controlling the electronic apparatus to execute:

a decoding procedure for decoding the first encrypted information using the second key; and a control procedure for performing an operation according to a decoding result of the decoding procedure and decoded usable/unusable information obtained from the decoding procedure.

In a preferred embodiment, the method of the present invention further includes:

a first writing procedure for writing in the expendable item second encrypted information generated by encrypting the usable/unusable information using a third key; and a second writing procedure for writing in the expendable item a fourth key corresponding to the third key.

In a preferred embodiment of the present invention, the fourth key corresponds to a public key for the electronic apparatus, and the third key corresponds to a private key corresponding to this public key.

In another preferred embodiment of the present invention, the first key corresponds to a private key, and the second key corresponds to a public key corresponding to this private key.

In another preferred embodiment of the present invention, the control procedure includes a signaling procedure for signaling a user when the usable/unusable information corresponds to information indicated as unusable.

In another preferred embodiment, the method of the present invention further includes:

a third writing procedure for writing in the expendable item information indicating that the expendable item is unusable as the useable/unusable information when the expendable item becomes unusable.

According to another aspect of the present invention, an expendable item recycling method for recycling a recyclable expendable item that is used in an electronic apparatus is provided, the method including:

a recycling procedure for recycling the expendable item; and a write procedure for writing in the recycled expendable item usable/unusable information indicating that the expendable item is usable, encrypted information generated by encrypting information corresponding to the usable/unusable information using a first key, and a second key corresponding to a first key.

According to another aspect of the present invention, an expendable item recycling method for recycling a recyclable expendable item that is used in an electronic apparatus is provided, the method including:

a recycling procedure for recycling the expendable item; and a write procedure for writing in the recycled expendable item encrypted information generated by encrypting usable/unusable information indicating that the expendable item is usable using a first key, and a second key corresponding to the first key.

In a preferred embodiment of the present invention, the first key corresponds to a private key, and the second key corresponds to a public key corresponding to this private key.

In another preferred embodiment of the present invention, the second key corresponds to a public key for the expendable item recycling apparatus, and the first key corresponds to a private key corresponding to this public key.

According to another aspect of the present invention, a program run on a computer for controlling an electronic apparatus that uses a recyclable expendable item storing usable/unusable information pertaining to the expendable item, encrypted information generated by encrypting information corresponding to the usable/unusable information using a first key, and a second key corresponding to the first key is provided, the program being executed by the computer to perform the steps of:

decoding the encrypted information using the second key; and controlling an operation of the electronic apparatus based on a decoding result of the decoding step and the usable/unusable information.

According to another aspect of the present invention, a program run on a computer for controlling an expendable item recycling apparatus that recycles a recyclable expendable item that is used in an electronic apparatus is provided, the program being executed by the computer to perform a step of:

writing in the expendable item usable/unusable information indicating that the expendable item is usable, encrypted information generated by encrypting usable/unusable information pertaining to the expendable item, encrypted information generated by encrypting information corresponding to the usable/unusable information using a first key, and a second key corresponding to the first key when the expendable item is recycled by the expendable item recycling apparatus.

According to another aspect of the present invention, a computer-readable storage medium storing a program of the present invention is provided.

BRIEF DESCRIPTION OF THE DRAWINGS

FIG. 4 is a diagram illustrating information stored in the expendable item and usage thereof from the time the expendable item of FIG. 1 is manufactured or recycled at a qualified facility handling genuine expendable items till the time the expendable item is used up at the electronic apparatus;

FIG. 7 is a diagram illustrating information stored in the expendable item and usage thereof in a case where recycling processes are performed at a qualified facility after the process steps shown in FIG. 4 are performed;

FIG. 8 is a diagram illustrating states of the expendable item in a case where recycling processes are performed at an unqualified facility after the process steps of FIG. 4 are performed;

FIGS. 16A and 16B are diagrams illustrating exemplary relations between the public key certificate and the root key certificate of FIG. 15;

FIGS. 17A and 17B are diagrams illustrating examples of the usable/unusable information;

FIG. 27 is a diagram showing an exemplary configuration of a display screen for issuing a warning to a user in the process of FIG. 26;

FIG. 28 is a cross-sectional view illustrating an overall configuration of a digital multifunction image processing apparatus according to a second embodiment of the present invention;

DESCRIPTION OF THE PREFERRED EMBODIMENTS

In the following, preferred embodiments of the present invention are described with reference to the accompanying drawings.

First Embodiment

In the following, an electronic apparatus, an expandable item used by the electronic apparatus, and an expandable item recycling apparatus according to a first embodiment of the present invention are described with reference to FIGS. 1 through 13.

Figure 1:
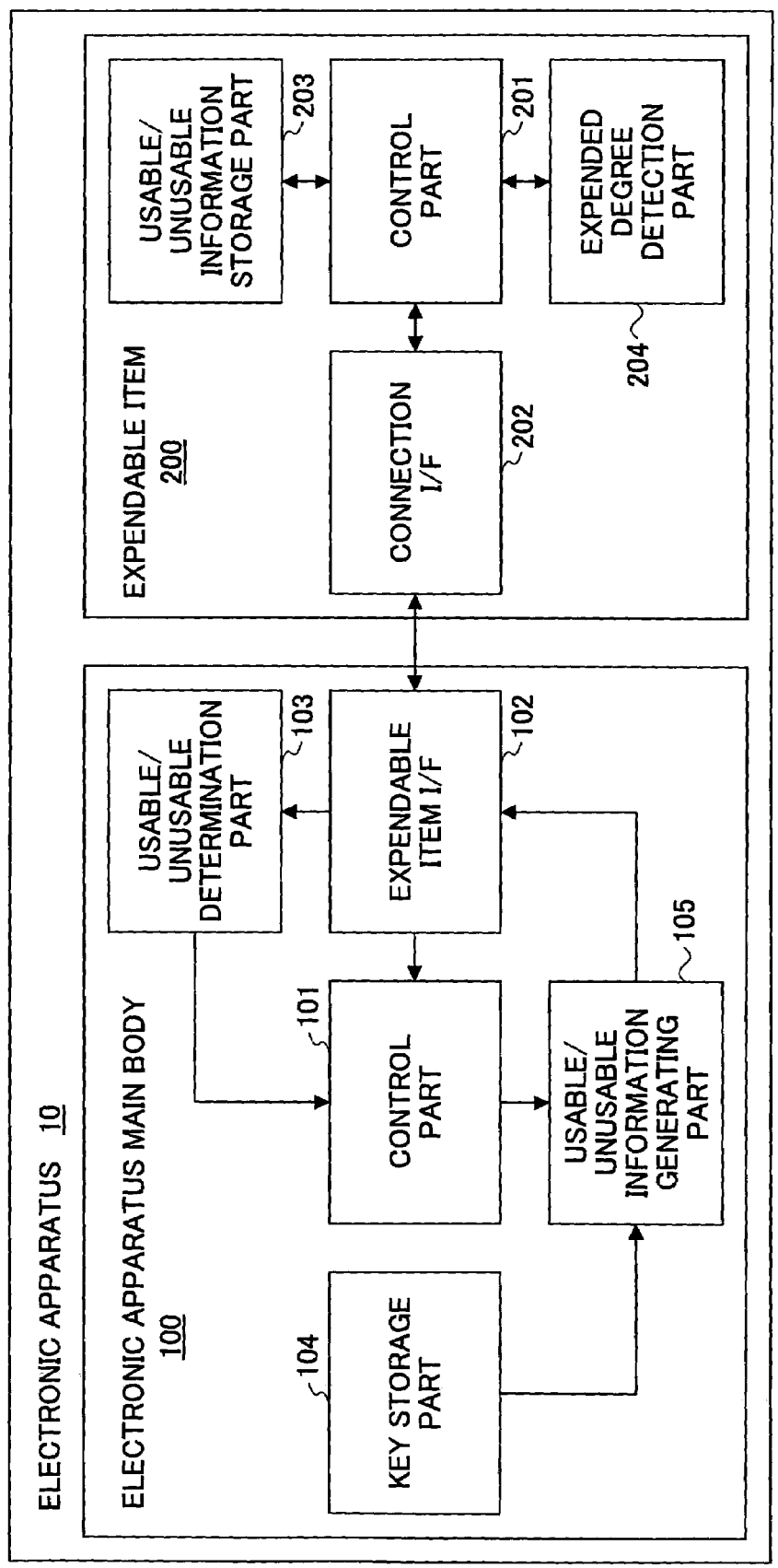
FIG. 1 is a block diagram showing a functional configuration of relevant parts of an electronic apparatus and an expendable item according to a first embodiment of the present invention.

FIG. 1 is a block diagram illustrating functional configurations of relevant portions of the electronic apparatus and the expendable item according to the first embodiment. In the illustrated embodiment, the electronic apparatus 10 includes an electronic apparatus main body 100 and the expendable item 200. It is noted that the expendable item 200 may correspond to one of plural units making up the electronic apparatus 10, and the expendable item 200 may be combined with the other units to form the electronic apparatus 10. In this case, the electronic apparatus main body 100 may represent parts of the electronic apparatus 10 other than the expendable item 200. Also, in a case where the expendable item 200 corresponds to a supplementary unit to be implemented in the electronic apparatus 10, the electronic apparatus main body 100 may realize the electronic apparatus 10.

It is noted that the electronic apparatus 10 may correspond to a variety of apparatuses including an imaging apparatus such as a printer, a facsimile machine, a digital copier, a scanner, or a digital multi-function printer; a network appliance; a vending machine; a medial apparatus; a power source apparatus; a ventilation system; a meter system for gas, water, or electricity; a general-purpose computer; an automobile; and an air plane, for example. In the following descriptions, illustrations and explanations of specific features of such apparatuses are omitted, and configurations of relevant parts for realizing functions pertaining to identification of an unqualified reproduced item (or non-genuine item) are described.

The expendable item 200 corresponds to a member or a unit that is used in the electronic apparatus 10 and is exchanged after reaching a certain condition and falling into an unusable state. It is noted that the expression "a certain condition" may refer to a period of time or a number of times the expendable item 200 is used, for example. The expendable item 200 is configured to be recyclable, so that even when falling into an unusable state, the expendable item 200 may be restored back to a usable state after undergoing predetermined recycling processes such as exchanging of parts, cleaning, refilling of contents, and/or physico-chemical processes, for example.

The expendable item 200 as is described above may correspond to a variety of component parts depending on the functions and configuration of the electronic apparatus 10. For example, in a printer, the expendable item 200 may correspond to a process cartridge (toner cartridge) that is formed by combining an image forming unit and a toner supply unit together. In the following descriptions, illustrations and explanations of specific features of the expendable item in a specific apparatus are omitted, and configurations of relevant parts for realizing functions pertaining to identification of an unqualified reproduced item (or non-genuine item) are described.

As is shown in FIG. 1, the electronic apparatus main body 100 of the electronic apparatus 10 includes a control part 101, an expendable item interface (I/F) 102, a usable/unusable determination part 103, a key storage part 104, and a usable/unusable information generating part 105.

The control part 101 corresponds to control means for controlling the overall functions and operations of the electronic apparatus main body 100 or the electronic apparatus 10 including the expendable item 200. The control part 101 is configured to conduct control operations by executing control programs that are stored in a suitable memory. Also, the control part 101 is arranged to control the electronic apparatus 10 to perform different operations depending on whether the expendable item 200 is determined to be usable or unusable by the usable/unusable determination part 103.

The expendable item I/F 102 corresponds to an interface that is connected to a connection I/F 202 at the expendable item 200 side and is configured to realize information exchange between the electronic apparatus main body 100 and the expendable item 200. The electronic apparatus main body 100 reads/writes relevant information from/on a usable/unusable information storage part 203 of the expendable item 200 via the expendable item I/F 102. It is noted that this read/write operation may be realized through a control operation conducted by the control part 101 on the electronic apparatus main body 100 side or a control operation conducted by a control part 201 on the expendable item 200 side. Also, it is noted that the expendable item I/F 102 and the connection I/F 202 may simply correspond to connection points or units/sockets including a signal conversion circuit, for example. Also, signal transmission between the interfaces may be realized through wired connection or wireless connection.

The usable/unusable determination part 103 is configured to read relevant information such as usable/unusable information, public key information, and signature information from the usable/unusable information storage part 203 on the expendable item 200 side, and determine whether the expendable item 200 used in the electronic apparatus 10 is usable/unusable based on the read information. In the present example, it is assumed that this determination includes a determination as to whether the expendable item 200 is actually usable/unusable in the electronic apparatus 10 as well as a determination as to whether the expendable item 200 is suited for use in the electronic apparatus 10, or whether use of the expendable item 200 in the electronic apparatus 10 is recommended (e.g., including a determination as to whether the expendable item 200 corresponds to a genuine item or a qualified recycled item).

The key storage part 104 stores public key information and corresponding private key information for the electronic apparatus 10, and is configured to supply the stored information to a process executed at the usable/unusable information generating part 105.

Upon detecting that the expendable item 200 is no longer in a usable state, the usable/unusable information generating part 105 is configured to generate usable/unusable information indicating that the expendable item 200 is unusable, encrypt the generated information using the private key information stored in the key storage part 104, and attach signature information to the usable/unusable information. Further, the usable/unusable information generating part 105 is configured to transmit the encrypted information and the signature information to the expendable item 200 along with the public key information stored in the key storage part 104 to induce the usable/unusable information storage part 203 to replace its currently stored usable/unusable information, signature information, and public key information with the transmitted usable/unusable information, signature information, and public key information.

The expendable item 200 includes the control part 201, the connection I/F 202, the usable/unusable information storage part 203, and an expended degree detection part 204.

The control part 201 corresponds to control means for controlling operations of the expendable item 200, and is configured to keep track of the remaining contents or the remaining service life of the expendable item 200 according to the detection result obtained by the expended degree detection part 204, control communication with the electronic apparatus main body 100 via the connection I/F 202, and control the read/write operation for reading/writing information from/on the usable/unusable information storage part 203, for example.

The connection I/F 202 corresponds to an interface that is connected to the expendable item I/F 102 of the electronic apparatus main body 100, and is configured to realize information exchange between the expendable item 200 and the electronic apparatus main body 100. As is described above, the connection I/F 202 is not limited to a particular configuration.

The usable/unusable information storage part 203 is configured to store information pertaining to the expendable item 200 such as usable/unusable information, signature information, and public key information for verifying the signature information, the stored information being used in a process of determining whether the expendable item 200 is usable/unusable which process is performed at the electronic apparatus main body 100.

The expended degree detection part 204 may include a sensor, for example, for detecting the expended degree of the portion of the expendable item 200 that is expended, and is configured to detect the expended degree of the expandable item 200 or whether the expendable item 200 is still in a usable state. The expended degree detection part 204 is also configured to store the expended degree and/or other information obtained from the detection. It is noted that the expended degree detection part 204 may alternatively be provided in the electronic apparatus main body 100 or in both the electronic apparatus main body 100 and the expendable item 200.

Figure 2:
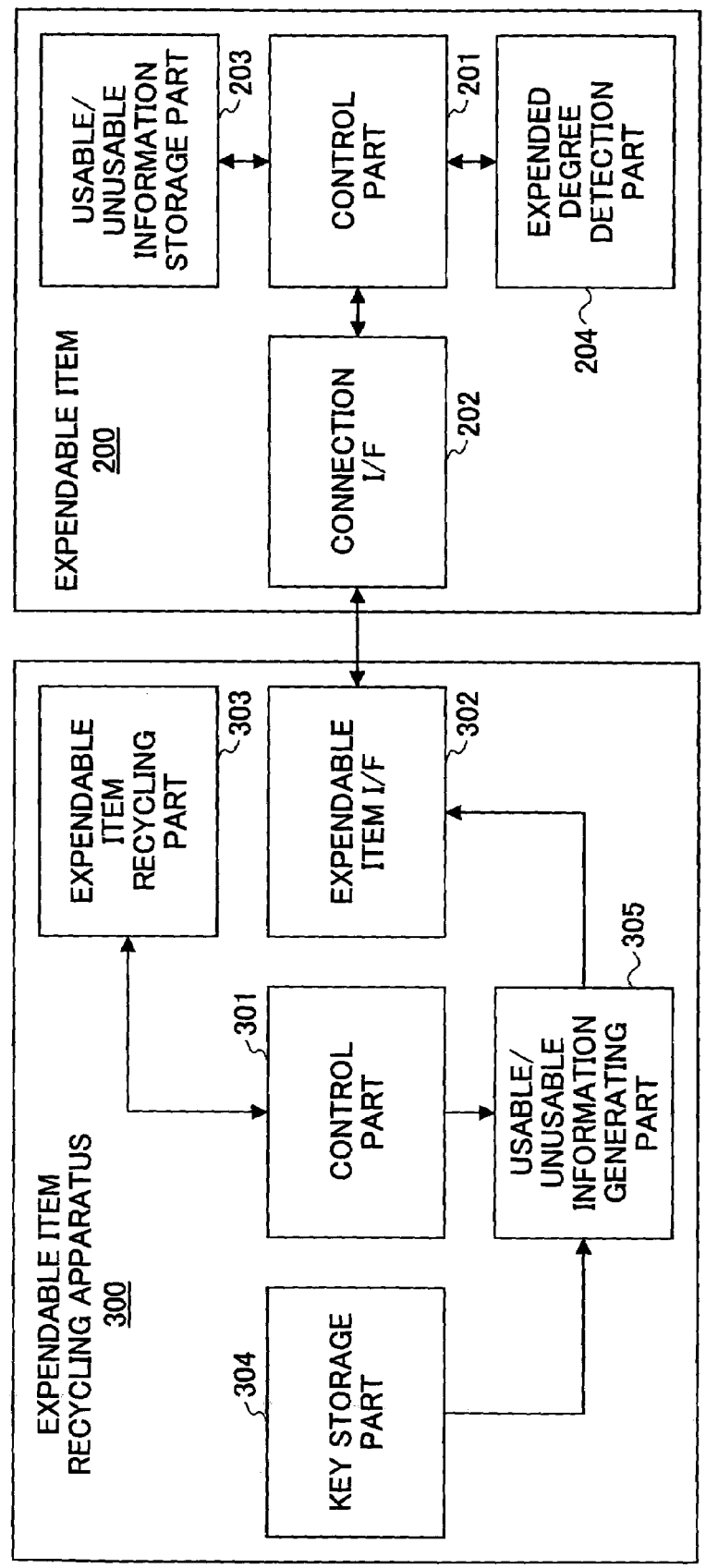
FIG. 2 is a block diagram showing a functional configuration of relevant parts of an expendable item recycling apparatus for recycling the expendable item shown in FIG. 1 according to the first embodiment of the present invention.

FIG. 2 is a block diagram illustrating functional configuration a relevant portion of the expendable item recycling apparatus 300 for recycling the expendable item 200. It is noted that in this drawing, parts of the expendable item recycling apparatus 300 that are unrelated to identification of an unqualified recycled item are not shown and their descriptions are omitted. Also, it is noted that the expendable item recycling apparatus 300 of FIG. 2 does not necessarily have to be configured to perform all the process steps for recycling the expendable item 200.

As is shown in FIG. 2, the expendable item recycling apparatus 300 includes a control part 301, an expendable item I/F 302, an expendable item recycling part 303, a key storage part 304, and a usable/unusable information generating part 305.

The control part 301 corresponds to control means for controlling the overall functions and operations of the expendable item recycling apparatus 300, and is configured to execute control programs stored in a suitable memory to perform corresponding control operations.

The expendable item I/F 302 corresponds to an interface connected to the connection I/F 202 of the expendable item 200, and is configured to realize information exchange between the expendable item recycling apparatus 300 and the expendable item 200. The expendable item recycling apparatus 300 is configured to read/write relevant information from/on the usable/unusable information storage part 203 of the expendable item 200 via the expendable item I/F 302. It is noted that this read/write operation may be controlled by the control part 301 of the expendable item recycling apparatus 300 or the control part 201 of the expendable item 200. Also, the configuration of the expendable item I/F 302 is not limited to a particular configuration as is the case with the expendable item I/F 102 of the electronic main body 100.

The expendable item reproducing part 303 is configured to conduct recycling processes on the expendable item 200. It is noted that specific configurations and functions of the expendable item recycling part 303 differs depending on the specific configurations and functions of the expendable item 200 and the specific process steps of the recycling processes, and thereby, their descriptions are omitted.

The key storage part 304 stores public key information for the expendable item recycling apparatus 300 and its corresponding private key information, and is configured to supply the stored information to a process conducted at the usable/unusable information generating part 305.

Upon completion of the recycling processes of the expendable item 200, the usable/unusable information generating part 305 is configured to generate usable/unusable information indicating that the expendable item 200 is usable, encrypt the generated information using the private key information stored in the key storage part 304, and attach signature information to the usable/unusable information. Further, the usable/unusable information generating part 305 is configured to transmit the encrypted usable/unusable information and the signature information to the expendable item 200 to induce the usable/unusable information storage part 203 to replace its currently stored usable/unusable information, signature information, and public key information with the transmitted usable/unusable information, signature information, and public key information.

Figure 3:
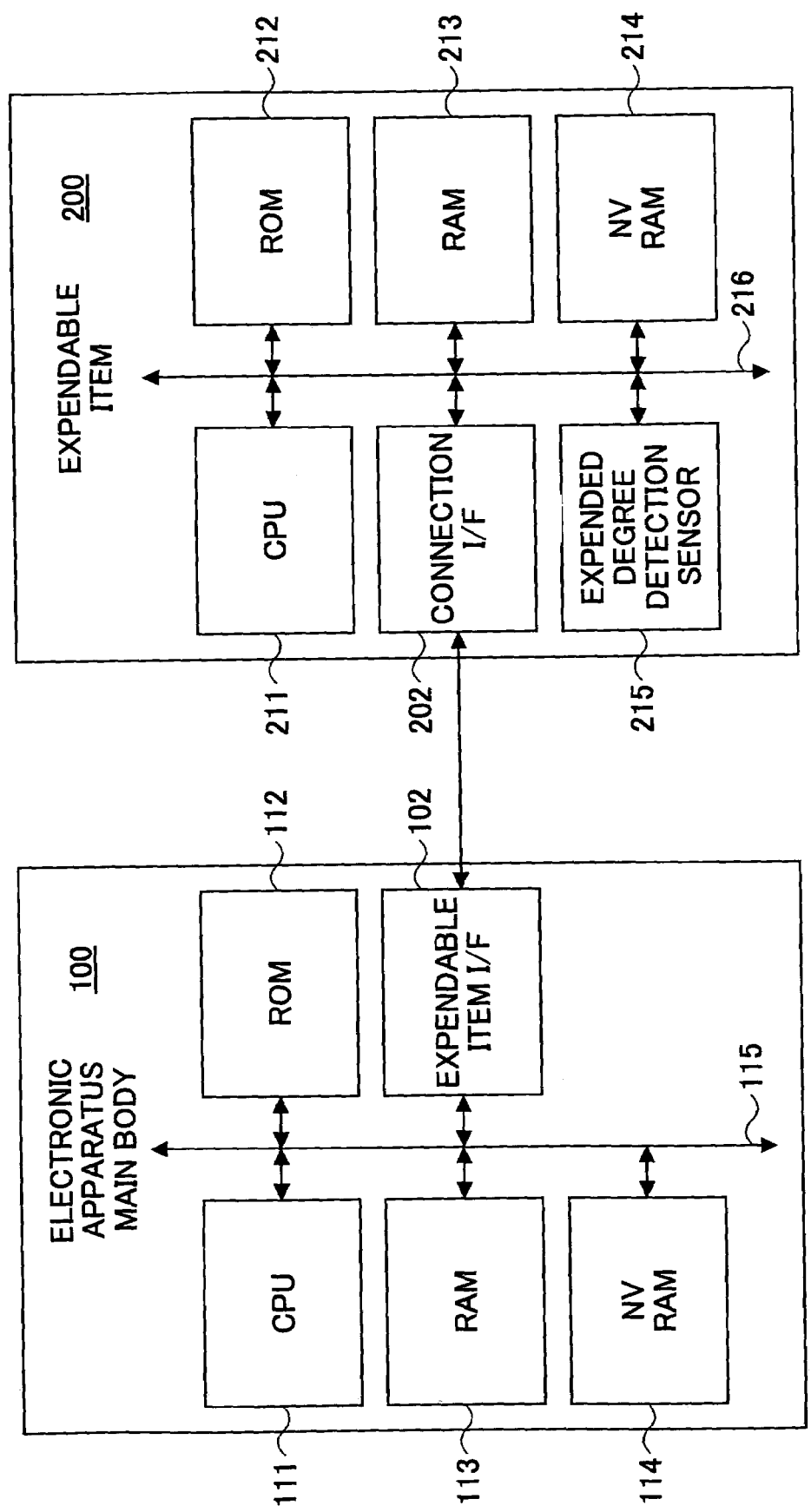
FIG. 3 is a block diagram showing hardware configurations for realizing the functions of the electronic apparatus main body and the expendable item shown in FIG. 1.

FIG. 3 is a block diagram illustrating hardware configurations for realizing the functions of the relevant parts of the electronic apparatus main body 100 and the expendable item 200 shown in FIG. 1. In this drawing, parts that are unrelated to identification of an unqualified recycled item (or non-genuine item) are not shown, and their descriptions are omitted as with the previous drawings.

As is shown in FIG. 3, the electronic apparatus main body 100 includes a CPU 111, a ROM 112, a RAM 113, a NVRAM (nonvolatile RAM) 114, and an expendable item I/F 102 that are interconnected by an internal bus 115. The CPU 111 is configured to execute programs that are stored in the ROM 112 and the NVRAM 114 to realize the functions of the control part 101, the usable/unusable determination part 103, and the usable/unusable information generating part 105. The key storage part 104 is provided in the NVRAM 114 corresponding to rewritable nonvolatile storage means.

The expendable item 200 includes a CPU 211, a ROM 212, a RAM 213, a NVRAM 214, an expended degree detection sensor 215, and a connection I/F 202 that are interconnected by an internal bus 216. The CPU 211 is configured to execute programs that are stored in the ROM 212 and the NVRAM 214 to realize the functions of the control part 201. The usable/unusable information storage part 203 is provided in the NVRAM 214 corresponding to rewritable nonvolatile storage means. The expended degree detection sensor 215 corresponds to a sensor provided in the expended degree detection part 204. It is noted that specific detections made by the expended degree detection sensor 215 differ depending on the configurations and functions of the expended item 200. For example, in the case where the expendable item 200 corresponds to a process cartridge, the expended degree detection sensor 215 may be configured to detect the remaining amount of toner.

Also, it is noted that the hardware configuration of the expendable item reproducing apparatus 300 for realizing the functions other than the expendable item reproducing part 303 may be identical to the hardware configuration of the electronic apparatus main body 100 shown in FIG. 2.

In the following, information for identifying a non-genuine item or an unqualified recycled item that is stored in the expendable item is described.

FIG. 4 is a diagram illustrating information stored in the expendable item and usage thereof from the time the expendable item 200 is manufactured or recycled at a qualified facility handling genuine expendable items till the time the expendable item is used up at the electronic apparatus 10. It is noted that a qualified facility may correspond to a plant owned by the manufacturer of the electronic apparatus 10 or a plant that is adequately monitored/controlled by the manufacturer to produce items with sufficient quality.

Referring to process step (a) of FIG. 4, an expendable item manufacturing apparatus or an expendable item recycling apparatus (simply referred to as "recycling apparatus" hereinafter) at a qualified facility stores public key information for the expendable item recycling apparatus (recycling apparatus public key information) and recycling apparatus private key information corresponding to the recycling apparatus public key information. When manufacturing or recycling processes for the expendable item 200 is completed, usable/unusable information indicating that the expendable item 200 is usable and its corresponding signature (digital signature) information that is created using the recycling apparatus private key information are generated. Then, the generated information items are written in the expendable item 200 along with the recycling apparatus public key information. In this case, the usable/unusable information is written in the expendable item 200 in an encrypted state. Then, the expendable item 200 with the above-described information stored therein may be distributed.

It is noted that the recycling apparatus private key information of the present embodiment corresponds to a first key, and the recycling apparatus public key information (or key main part thereof) of the present embodiment corresponds to a second key.

Figure 5:
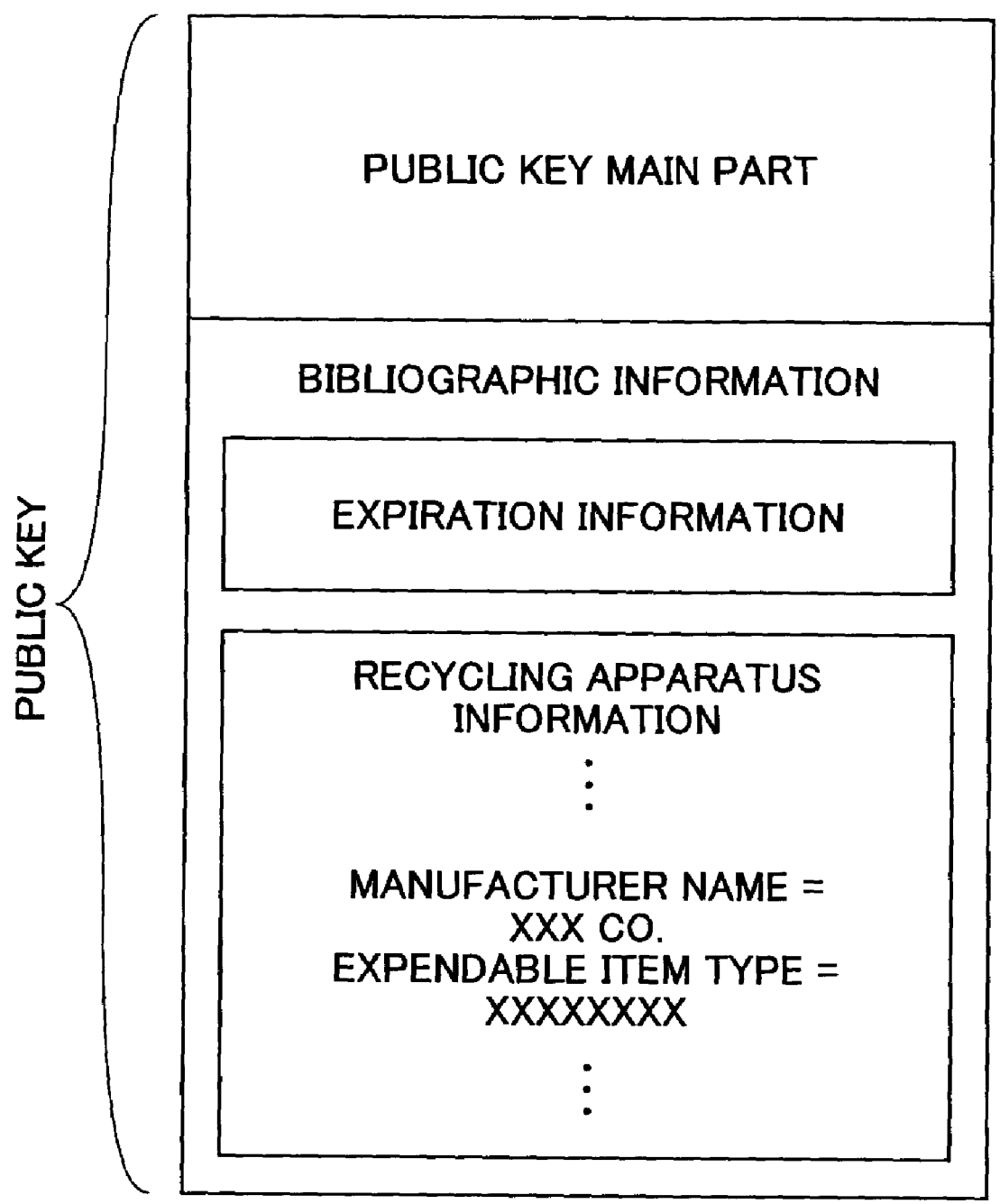
FIG. 5 is a diagram showing a configuration of a recycling apparatus public key shown in FIG. 4.

FIG. 5 is a diagram illustrating a configuration of the recycling apparatus public key information.

Public key information corresponds to one type of key information that may be used for encrypting or decoding data in key encryption processes. As is shown in FIG. 5, the public key information includes a public key main part that is actually used in the computation processes for encrypting or decoding data, and bibliographic information that includes expiration information of the public key information, issuer information of the public key information, and other required information, for example. It is noted that the recycling apparatus public key information is illustrated in this drawing, and accordingly, information on the recycling apparatus is included as the issuer information of the public key information. The information on the recycling apparatus may include the name of the manufacturer operating the recycling apparatus, information pertaining to the type of the expendable item being recycled by the recycling apparatus, and other various items of information.

An apparatus acquiring the public key information as is described above may refer to the bibliographic information to determine the issuer of the public key information (i.e., the apparatus issuing the public key information).

Figure 6:
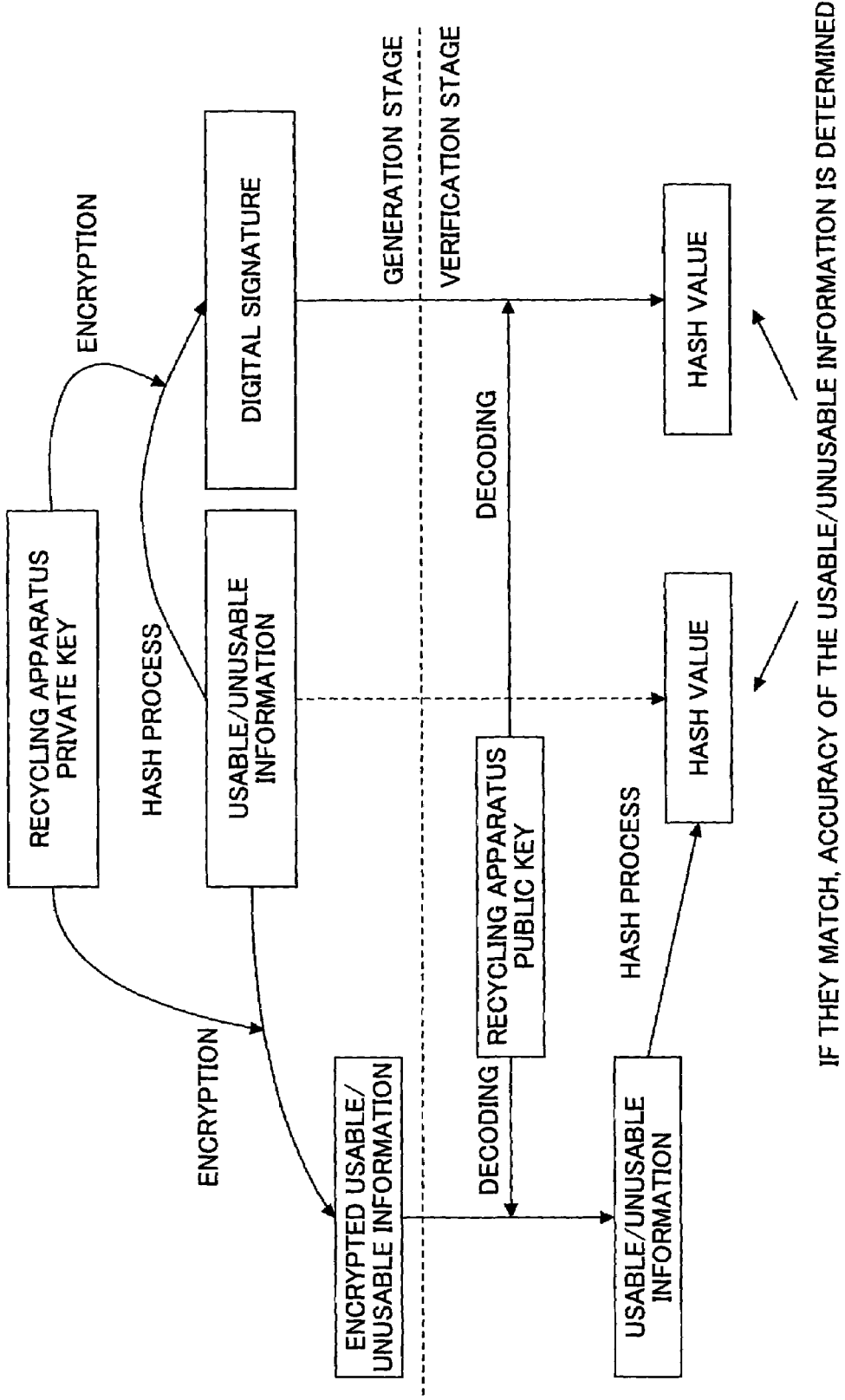
FIG. 6 is a diagram showing the relation between usable/unusable information, digital signature information, and encrypted usable/unusable information.

FIG. 6 is a diagram illustrating the relation between usable/unusable information, digital signature information, and encrypted usable/unusable information.

The digital signature corresponds to information that is used for detecting a case in which usable/unusable information is altered from its original state due to damage or tampering. It is noted that the signature may be attached according to various methods. In the illustrated example of FIG. 6, at the generation stage, a hash process is performed on the usable/unusable information to obtain a hash value, and a value obtained by encrypting the hash value by the recycling apparatus private key information (i.e., private key information used in creating the signature information) is provided as digital signature information.

In this case, at the verification stage, the digital signature information is decoded by the recycling apparatus public key information corresponding to the recycling apparatus private key information to decode the digital signature into the original hash value. Then, the decoded hash value is compared with a hash value that is obtained by performing a hash process on the usable/unusable information. If the hash values correspond, it may be verified that the usable/unusable information has not been damaged or tampered with after creation of the digital signature information. In this regard, the digital signature information may ensure the accuracy of the usable/unusable information with respect to a user having access to public key information for decoding this digital signature information.

It is noted that the digital signature information of the present embodiment may correspond to first encrypted information that is generated by encrypting information corresponding to usable/unusable information using a first key (e.g., recycling apparatus private key information).

The encrypted usable/unusable information may correspond to encrypted information that is generated by encrypting the usable/unusable information using a first key (e.g., recycling apparatus private key information). The original usable/unusable information may be obtained by decoding the encrypted usable/unusable information with the recycling apparatus public key information. It is noted that in the present embodiment, the original usable/unusable information is not stored in the expendable item, and thereby, the decoded usable/unusable information obtained by decoding the encrypted usable/unusable information is used for the verification of the digital signature.

Specifically, the digital signature is generated by encrypting the hash value of the pre-encrypted usable/unusable information with the recycling apparatus private key information. Since the pre-encrypted usable/unusable information is not stored in the expendable item 200, a hash value of the usable/unusable information for verifying the accuracy of the digital signature may not be generated. Accordingly, the encrypted usable/unusable information stored in the expendable item 200 may be decoded to generate the original usable/unusable information, and its corresponding hash value may be compared with the hash value obtained by decoding the digital signature.

It is noted that in an alternative embodiment, unencrypted usable/unusable information may be stored in the expendable item 200, and in such a case, the accuracy of the digital signature may be verified by the hash value of the stored usable/unusable information.

Referring back to FIG. 4, the distributed expendable item 200 may be loaded in or connected to the electronic apparatus main body 100 by a user, for example. In this case, as is illustrated by process step (b), the electronic apparatus main body 100 reads the recycling apparatus public key information, the encrypted usable/unusable information, and the signature information from the expendable item 200, and uses the read information to identify the expendable item 200. Specifically, the electronic apparatus main body 100 verifies that the recycling apparatus public key information stored in the expendable item 200 corresponds to public key information for an expendable item recycling apparatus used at a qualified facility, decodes the usable/unusable information using the recycling apparatus public key information, and verifies that the usable/unusable information is not damaged or tampered with based on the signature information. When the above verifications are made and the usable/unusable information indicates that the expendable item 200 is usable, it may be determined that the expendable item 200 corresponds to a genuine item or a qualified recycled item and the expendable item 200 can be used in the electronic apparatus main body 100.

When an expendable item 200 that is manufactured or recycled at a qualified facility is loaded in the electronic apparatus main body 100, the expendable item 200 is normally determined to be usable. In turn, the electronic apparatus main body 100 performs operations using the expendable item 200.

Then, when the expendable item 200 is expended to become unusable, this is signaled to the user to induce exchange of the expendable item 200. Also, as is illustrated by process step (c), usable/unusable information indicating that the expendable item 200 is unusable is generated and written in the expendable item 200. In this case, in a similar manner to that of process step (a), the usable/unusable information is encrypted and signature information is attached to the usable/unusable information, after which the encrypted usable/unusable information and the signature information are written in the expendable item 200 along with public key information for decoding the encrypted usable/unusable information and the signature information.

However, it is noted that in the writing operation of process step (c), public key information for the electronic apparatus 10 (electronic apparatus public key information) is written in the expendable item 200, and electronic apparatus private key information corresponding to the electronic apparatus public key information is used in the encryption and signature generating processes. It is noted that the electronic apparatus private key information of the present embodiment corresponds to a third key, and the electronic apparatus public key information (or the key main part thereof) of the present embodiment corresponds to a fourth key. Also, it is noted that the write operation is conducted in a manner such that information such as the usable/unusable information and the public key information stored in the expendable item 200 may be updated (replaced).

After the write operation, the used expendable item 200 is retrieved, and if it is in a recyclable state, recycling processes may be performed thereon.

FIG. 7 is a diagram illustrating information stored in the expendable item 200 and usage thereof in a case where recycling processes are performed at a qualified facility after the process steps shown in FIG. 4 are performed.

Used expendable items 200 that have been retrieved and collected are transported to a recycling plant. At the recycling plant, the retrieved expendable items 200 undergo required quality inspections, and those that pass the inspections are subject to recycling processes by the expendable item recycling apparatus 300 of the present embodiment. At this stage, as is illustrated by process step (a) of FIG. 7, the expendable item 200 subject to the recycling processes stores the usable/unusable information indicating that the expendable item 200 is unusable that is previously written in the expendable item 200 in the process step (c) of FIG. 4.

The expendable item recycling apparatus 300 may read the information stored in the expendable item 200, and decode the read information to obtain information pertaining to the electronic apparatus main body 100 in which the expendable item 200 has been used. However, it is noted that such a process does not necessarily have to be performed in the present embodiment.

Then, after the recycling processes on the expendable item 200 are completed, and the expendable item 200 is restored back to a usable state, as is illustrated by process step (b) of FIG. 7, the expendable item recycling apparatus 300 generates usable/unusable information indicating that the expendable item 200 is usable, encrypts the generated information using the recycling apparatus private key information, attaches the corresponding signature information, and writes the encrypted information and the signature information in the expendable item 200 along with the corresponding recycling apparatus public key information as in the case of process step (a) of FIG. 4. Also, it is noted that the above write operation is performed in a manner such that information such as the usable/unusable information and the public key information stored in the expendable item 200 is updated as in the process step (c) of FIG. 4. It is noted that the write operation may be performed after the recycled expendable item 200 passes required quality inspections.

Then, the expendable item 200 with the updated information stored therein is distributed to a user. It is noted that the user using the expendable item 200 before it is recycled and the user using the expendable item 200 after it is recycled do not necessarily have to be the same, and the electronic apparatus using the expendable item 200 before it is recycled and that using the expendable item 200 after it is recycled do not necessarily have to be the same either.

The distributed expendable item 200 may be connected to or loaded in an electronic apparatus 100 by a user, for example. In this case, as is illustrated in process step (c) of FIG. 7, the electronic apparatus main body 100 reads the recycling apparatus public key information, the encrypted usable/unusable information, and the signature information from the expandable item 200, and uses the read information to identify the expendable item 200 as in the process step (b) of FIG. 4. Since the expendable item 200 illustrated in the present example is recycled at a qualified facility, it presumably has usable/unusable information indicated as usable stored therein. Accordingly, the electronic apparatus main body 100 may determine that the expandable item 200 is usable, and conduct operations using the expendable item 200.

Then, the process flow of process step (c) of FIG. 4 through process step (c) of FIG. 7 may be repeated, and the expendable item 200 may be repetitively recycled any number of times provided that the expendable item 200 is in a recyclable state.

FIG. 8 is a diagram illustrating states of the expendable item 200 in a case where recycling processes are performed at an unqualified facility after the process steps of FIG. 4 are performed.

In this illustrated example, the used expendable item 200 is collected by a third party that is unrelated to the manufacturer of the electronic apparatus 10, and is recycled at an unqualified facility that is unrelated to the manufacturer of the electronic apparatus 10. Even in such a case, as long as a suitable expendable item recycling apparatus is used, recycling processes may be properly performed on the used expendable item 200 as is illustrated by the process step (a) of FIG. 8.

However, it may be presumed that the expendable item recycling apparatus used at an unqualified facility does not store the recycling apparatus public key information and the recycling apparatus private key information as is described above and is thereby incapable of generating proper encrypted usable/unusable information and signature information, for example. Also, even if the recycling apparatus were capable of generating such information, the recycling apparatus may not be able to store the information in a format that enables the electronic apparatus main body 100 to accurately read the information for use in determining whether the expendable item 200 is usable/unusable unless the recycling apparatus is informed of the appropriate write format, write positions (e.g., memory address), and write interface for writing the generated information. Also, unless the person in charge of running the unqualified facility is aware of the existence of such information, attempts to write and rewrite such information may not be made upon recycling the expendable item 200.

Accordingly, as is illustrated by process step (b) of FIG. 8, the expendable item recycling apparatus used in the unqualified facility is not capable of writing pertinent information such as usable/unusable information in the expendable item 200, and thereby, the expendable item 200 after being recycled by such an expendable item recycling apparatus is distributed to a user with the usable/unusable information indicated as unusable written therein from the process step (c) of FIG. 4.

When the user loads/connects such an expendable item 200 in/to the electronic apparatus main body 100, as is illustrated by process step (c) of FIG. 8, the electronic apparatus main body 100 reads the public key information, the encrypted usable/unusable information, and the signature information from the expendable item 200, and determines whether the expendable item 200 is usable/unusable. In this case, the usable/unusable information of the expendable item 200 is indicated as unusable and corresponds to an unqualified recycled item that has not been recycled at a qualified facility, it is determined that the currently loaded/connected expendable item 200 cannot be used in the electronic apparatus 10 or is preferably not used in the electronic apparatus 10.

In this way, a qualified recycled item that is recycled at a qualified facility may be distinguished over an unqualified recycled item that is recycled at an unqualified facility based on the usable/unusable information even when the same recycling processes are performed on the expendable items 200 at the two types of facilities and the unqualified recycled item is physically in a usable state.

It is noted that in one embodiment, the expendable item 200 may be determined to be unusable when appropriate data are not recorded in an area where usable/unusable information or certificate information is supposed to be stored so that a qualified recycled item may be distinguished from an unqualified recycled item when the usable/unusable information of the expendable item 200 is cleared during the recycling process performed at the unqualified facility.

Also, it may be presumed that a non-genuine item manufactured at an unqualified facility is incapable of storing usable/unusable information indicated as usable in an appropriate format, and thereby, the electronic apparatus main body 100 may be able to identify the non-genuine item in a manner similar to the case of FIG. 8.

It is noted that oftentimes, it may not be appropriate to unconditionally eliminate the possibility of using an unqualified recycled item or a non-genuine item simply for the reason that it is manufactured/recycled at an unqualified facility. Thus, by enabling distinction between a qualified recycled item or a genuine item and an unqualified recycled item or a non-genuine item, a warning may be issued to a user indicating that the performance of the electronic apparatus may be degraded when an unqualified recycled item or a non-genuine item is used so that the user may be encouraged to use a qualified recycled item or a genuine item recycled/manufactured at a qualified facility.

Figure 9:
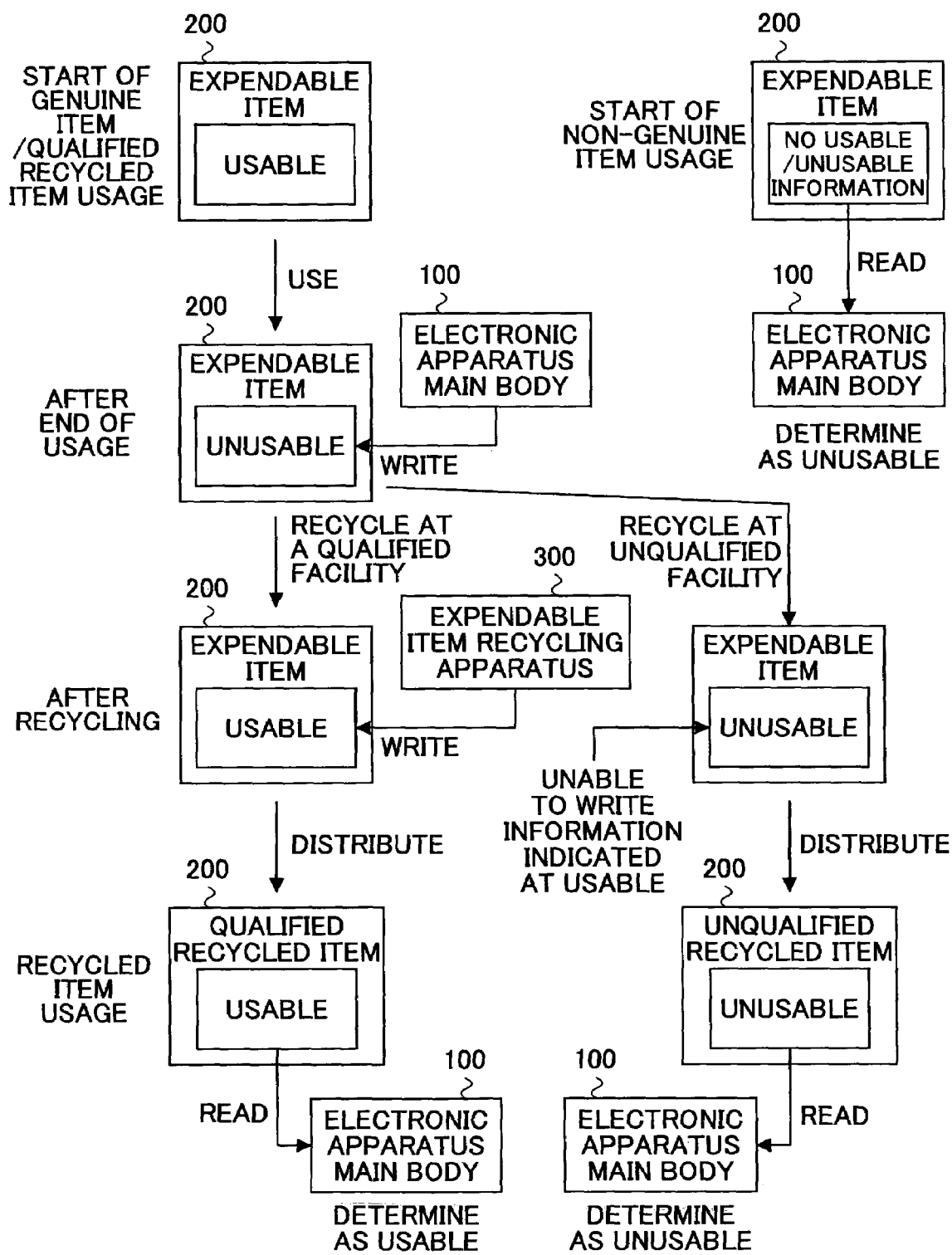
FIG. 9 is a general flowchart summarizing the procedural steps illustrated in FIGS. 4, 7, and 8.

FIG. 9 is a general flowchart summarizing the method of distinguishing a qualified recycled item or a genuine item over an unqualified recycled item or a non-genuine item based on usable/unusable information stored in the expendable item 200 as is illustrated by FIGS. 4 through 8. In FIG. 9, only descriptions of the usable/unusable information are shown as the information stored in the expendable item 200 for the sake of simplifying the drawing; however, the expendable item 200 may store other information such as that shown in FIGS. 4, 7, and 8.

According to FIG. 9, the process steps illustrated in FIGS. 4 through 8 may be summarized as follows:

When an expendable item 200 corresponding to a qualified recycled item or a genuine item is used in the electronic apparatus main body 100 and the expendable item 200 is expended to become unusable, the electronic apparatus main body 100 writes usable/unusable information indicated as unusable in the expendable item 200. Then, the expended expendable item 200 is retrieved and collected to be subject to recycling processes.

In the case where the recycling processes are conducted at a qualified facility, the expendable item recycling apparatus 300 may write usable/unusable information indicated as usable in the expendable item 200. Thereby, the recycled expendable item 200 corresponding to a qualified recycled item may be distributed to a user, and when the user attempts to use this expendable item 200 in the electronic apparatus main body 100, the electronic apparatus main body 100 reads the usable/unusable information to determine whether the expendable item 200 is usable. Since appropriate information indicated as usable is stored in the expendable item 200 in the present case, the electronic apparatus main body 100 may determine that the expendable item 200 corresponds to a qualified recycled item (or genuine item) and that it is in a usable state.

In the case where the recycling processes are conducted at an unqualified facility, since the usable/unusable information indicated as usable cannot be written in such a facility, the usable/unusable information stored in the recycled expended item 200 (corresponding to an unqualified recycled item) may still be indicated as unusable even after the recycling processes are completed and the expendable item 200 is distributed to a user to be used in the electronic apparatus main body 100. Accordingly, when the electronic apparatus main body 100 reads the usable/unusable information to determine whether the expendable item 200 is usable, since information indicated as unusable is stored, the electronic apparatus main body 100 may determine that the expendable item 200 corresponds to an unqualified recycled item and that the user must therefore be warned that the expendable item 200 may be unsuitable for use.

It may be presumed that a non-genuine item is not capable of storing usable/unusable information indicated as usable in an appropriate format at the time it is manufactured. Accordingly, the electronic apparatus main body 100 may recognize that the non-genuine item does not correspond to an appropriate expendable item such as a qualified recycled item or a genuine item and determine that the user needs to be warned of this fact in a manner similar to that described in handling an unqualified recycled item.

In the following, processes are described that are performed by the respective apparatuses for distinguishing a qualified recycled item over an unqualified recycled item.

Figure 10:
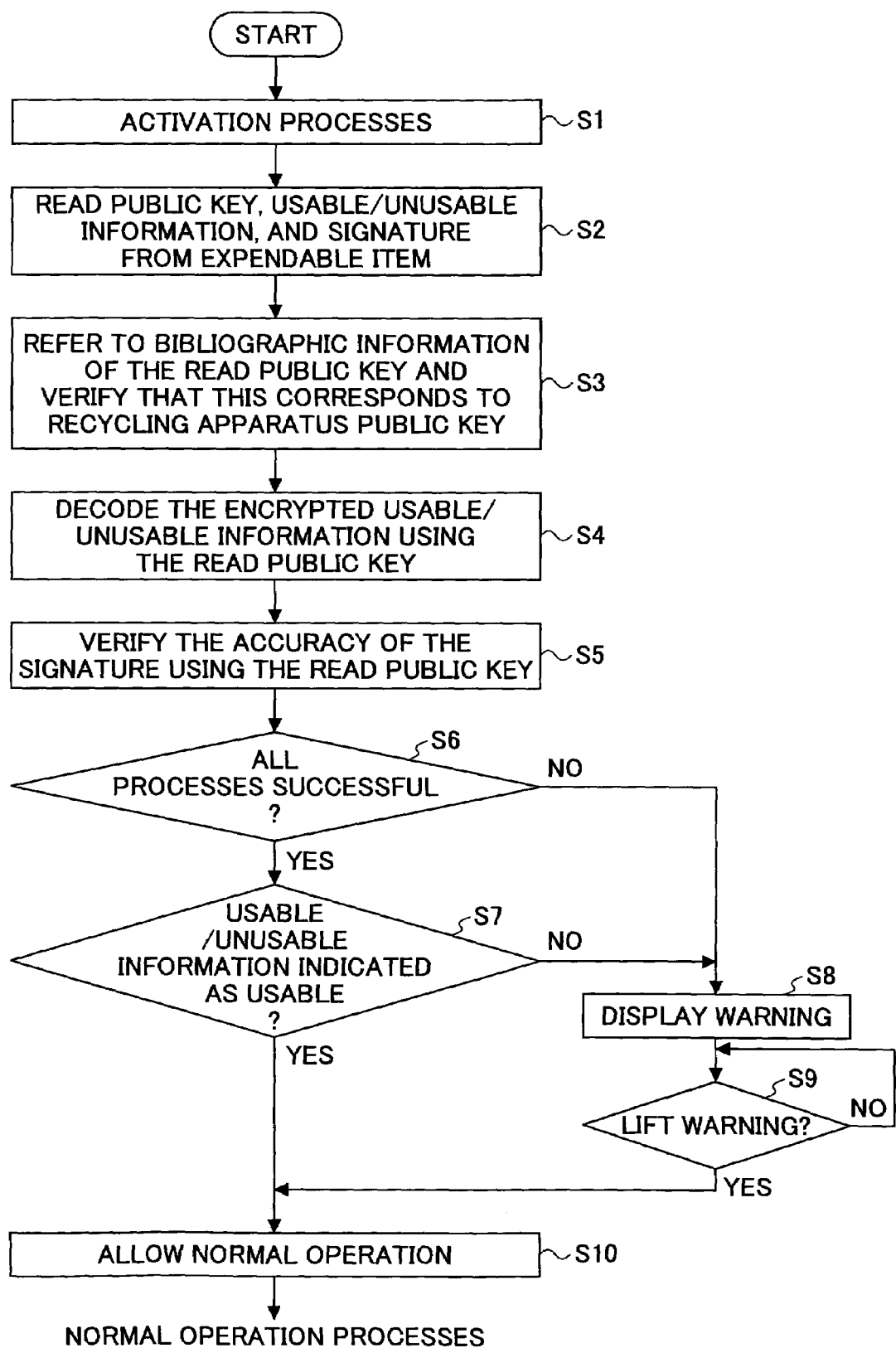
FIG. 10 is a flowchart illustrating a determination process performed by the electronic apparatus main body shown in FIG. 1 upon activating the electronic apparatus for identifying the expendable item 200 based on usable/unusable information.

FIG. 10 is a flowchart illustrating process steps performed by the electronic apparatus main body 100 upon activating the electronic apparatus 10 for identifying the expendable item 200 based on usable/unusable information.

In the electronic apparatus main body 100, the CPU 111 executes predetermined control programs to realize activation processes such as power-on and reset processes to start the process steps of the flowchart of FIG. 10. It is noted that the process steps of FIG. 10 relate to a control method for controlling an electronic apparatus according to an embodiment of the present invention.

According to the illustrated example, first, in step S1, general activation processes are performed such as initialization of the respective parts and switching to an operable state, for example. It is noted that in a case where the expendable item 200 is required for operating the electronic apparatus 10 and the expendable item 200 is not installed in the electronic apparatus 10, an error state is detected at this time. On the other hand, in a case where the expendable item 200 is not required for the operation of the electronic apparatus 10 and the expendable item 200 is not installed, the electronic apparatus 10 may proceed to perform normal operation processes.

Then, in step S2, public key information, usable/unusable information, and signature information are read from the usable/unusable information storage part 203 of the expendable item 200. At this stage of reading the information items, the specific contents of the information sets do not necessarily have to be determined. For example, in the process step (b) of FIG. 4, the recycling apparatus public key information, usable/unusable information indicated as usable, and the signature information created using the recycling apparatus private key information are read. In the process step (c) of FIG. 8, the electronic apparatus public key information, usable/unusable information indicated as unusable, and the signature information created using the electronic apparatus private key information is read. In the present example, it is assumed that the CPU 111 is capable of determining the address of a memory and the format in which the above information items are stored according to appropriate methods.

Then, in step S3, the bibliographic information of the public key information read in step S2 is referred to in order to verify that this information corresponds to the recycling apparatus public key information. Specifically, it is verified that the read public key information corresponds to the public key for the expendable item recycling apparatus 300 used at a qualified facility.

Then, in step S4, the usable/unusable information read in step S2 is decoded using the public key information read in the same step to obtain the original usable/unusable information. Then, in step S5, the accuracy of the signature information read in step S2 is verified using the public key information read in the same step. It is noted that this process step includes the process of decoding digital signature information using the public key information as is described with reference to FIG. 6.

In the present example, it is assumed that the electronic apparatus 10 may proceed to perform normal operation processes even when the verification and decoding processes of steps S3 through S5 are not successfully performed. It is noted that steps S4 and S5 include decoding processes, and the CPU 111 functions as decoding means in theses processes.

Then, in step S6, a determination is made as to whether the processes of steps S3 through S5 have all been successfully performed. If all processes have been successfully performed, it may be determined that the usable/unusable information corresponds to that written by the expendable item recycling apparatus 300 of a qualified facility and that the information is not damaged or tampered with. In this case, the operation proceeds to step S7 where a determination is made as to whether the usable/unusable information obtained from the decoding process of step S4 is indicated as usable.

If the information is indicated as usable, it is determined that the expendable item 200 may be used in the electronic apparatus main body 100. In turn, in step S10, normal operation of the electronic apparatus 10 is allowed, and operations according to the functions of the electronic apparatus 10 are performed.

Figure 11:
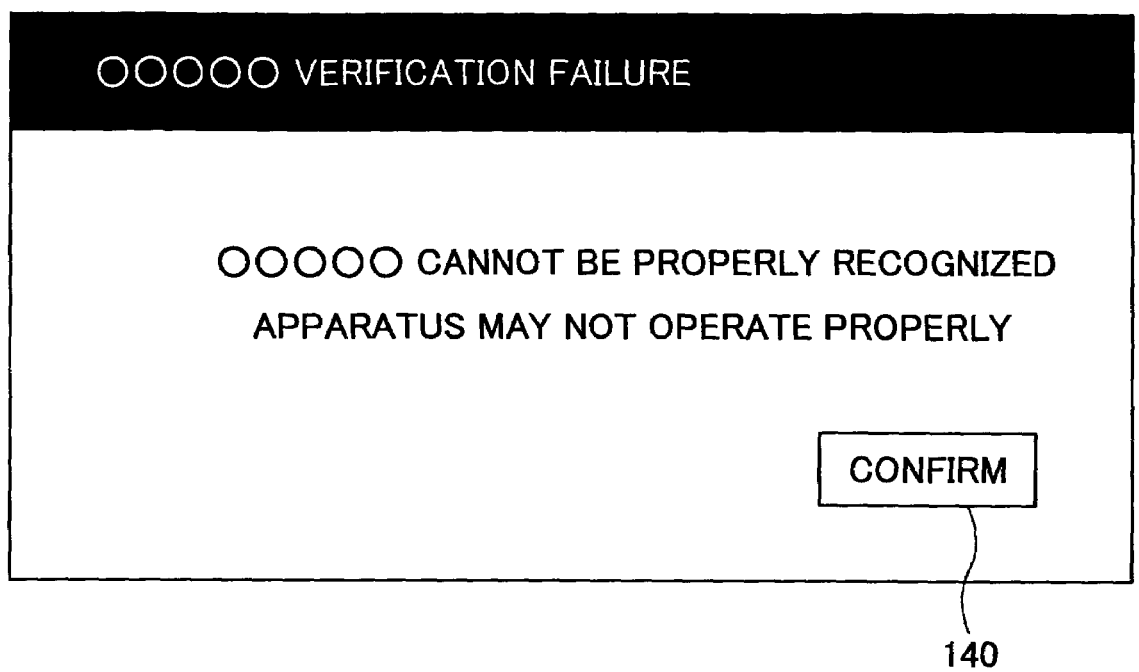
FIG. 11 is a diagram showing an example of a display screen for warning a user in the process shown in FIG. 10.

In a case where it is determined in step S6 that at least one of the processes from steps S3 through S5 are not successfully performed, or in a case where a negative determination is made in step S7, the expendable item 200 may possibly correspond to a non-genuine item or an unqualified recycled item that may have quality defects. In this case, the operation proceeds to step S8 where a warning is displayed by predetermined display means such as a display (not shown) of the electronic apparatus main body 100. For example, a display screen as is illustrated in FIG. 11 may be displayed on the display. It is noted that this process step corresponds to a warning process according to an embodiment of the present invention, and the CPU 111 may function as warning means in this case.

In this example, when the user pushes a confirmation button 140 of the display screen, or after a predetermined time elapses, it is determined that the warning displayed in step S9 may be lifted. Thus, the operation proceeds to step S10 to allow normal operations. In this case, the display screen displayed by the display means is also restored back to a normal screen.

In the present example, in the process steps S6 through S9, the CPU 111 controls and adjusts operations of the electronic apparatus 10 as is necessary or desired according to the decoding results of steps S4 and S5, and usable/unusable information obtained from the decoding results.

In a case where an expendable item 200 that is installed for use is already expended and is in an unusable state, the user is warned of this fact and is prompted to exchange of the expendable item. It is noted that such procedures make up a part of normal operation processes that are performed during normal operation of the electronic apparatus 10.

By performing the above-described processes, when a non-genuine item or an unqualified recycled item is installed for use as the expendable item 200, a warning may be issued indicating that the electronic apparatus 10 may not operate properly. In this case, usable/unusable information is stored in the expendable item 200 along with digital signature information that is based on private key information (i.e., information obtained by encrypting the usable/unusable information with its corresponding information), and the signature is verified using corresponding public key information. In this way, even when usable/unusable information is tampered with, this may be properly detected, and a genuine item or a qualified recycled item may be distinguished (identified) from a non-genuine item or an unqualified recycled item with high reliability.

In the present example, the private key information for the expendable item recycling apparatus 300 is used as the private key information for generating the digital signature information and encrypting the usable/unusable information upon writing the usable/unusable information indicated as usable in the expendable item 200, and thereby, the corresponding public key information may include identification information of the expendable item recycling apparatus 300 as bibliographic information. Accordingly, the electronic apparatus main body 100 may refer to the bibliographic information to verify that the usable/unusable information has been written by the expendable item recycling apparatus 300 of a qualified facility.

Also, the accuracy of the usable/unusable information may be verified by decoding the encrypted usable/unusable information using the corresponding public key information. It is noted that in the present example, encryption of the usable/unusable information as well as attachment of the digital signature information are performed.

By performing the above-described identification and warning processes, the user may be prevented from using a non-genuine item or an unqualified recycled item believing it to be a genuine item or a qualified recycled item. Accordingly, when a problem occurs in the operation of the electronic apparatus 10 due to defects of the non-genuine item or the unqualified recycled item, the user may be able to understand that the cause of the problem lies in the non-genuine item or the unqualified recycled item being used in the electronic apparatus 10. In this way, degradation of the reliability of the electronic apparatus 10 may be prevented. Also, a user that is concerned with quality performance may be prompted into selecting a genuine item or a qualified recycled item so that an expendable item 200 that is produced under quality control by the supplier of the electronic apparatus 10 may be used. It is noted that features of a genuine item or a qualified recycled item may be adequately adjusted by the manufacturer of the apparatus in which the item is to be used according to the features of the apparatus. Therefore, high quality performance may be achieved by using such an expendable item.

It is noted that the warning may take the form of a message display as is described above. Alternatively or in addition, a warning sound, voice guidance, lighting or flickering of a light source, and/or vibration may be used for signaling the warning. Also, it is noted that other means or operations for signaling the results of the processes performed in steps S2 through S7 may be used instead of the warning.

Also, in the above-described example, the process for identifying the expendable item 200 are performed immediately after performing the activation processes; however, the present invention is not limited to such an example, and the identification process may be performed at an arbitrary timing.

Figure 12:
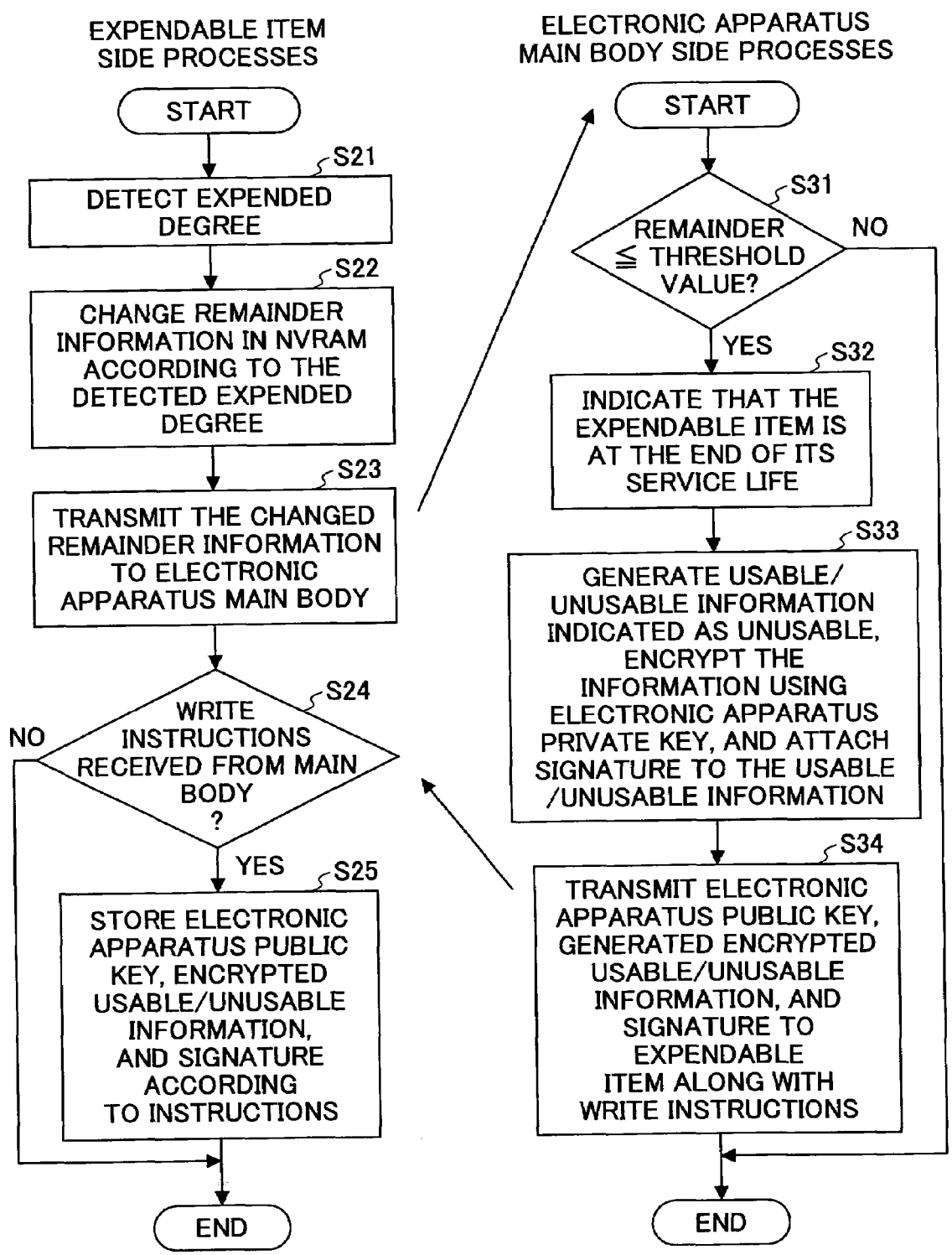
FIG. 12 shows a pair of flowcharts illustrating process steps pertaining to detection of the end of the service life of the expendable item that are performed at the electronic apparatus and the expendable item during operation of the electronic apparatus shown in FIG. 1.

In FIG. 12, flowcharts are shown illustrating process steps pertaining to detection of the expended state of the expendable item 200 performed at the electronic apparatus main body 100 and the expendable item 200, respectively, while the electronic apparatus 10 is in operation. In this drawing, arrows between the two flowcharts indicate that the pointed process step is started after the process step at the root of the corresponding arrow is completed. It is noted that the process steps shown in FIG. 12 that are performed at the electronic apparatus main body 100 side relate to a control method for controlling an electronic apparatus according to an embodiment of the present invention.

In the expendable item 200, when the electronic apparatus 10 is in operation, the CPU 211 starts the process flow shown on the left side of FIG. 12 periodically or at predetermined timings.

In step S21, the expended degree detection sensor 215 is used to detect the expended degree of the expendable item 200. Then, in step S22, remainder information stored in the NVRAM 214 is changed to indicate a value representing the amount of expendable contents remaining at the time of the detection according to the detected expended degree. Then, in step S23, the changed remainder information is transmitted to the electronic apparatus main body 100.

Upon receiving the remainder information from the expendable item 200, the CPU 111 of the electronic apparatus main body 100 starts the process flow shown on the right side of FIG. 12.

In step S31, a determination is made as to whether the received remainder information is less than or equal to a predetermined threshold value. The threshold value represents a value indicating that the expendable item 200 is expended to a state in which it can no longer be used. In a case where the remainder information is less than or equal to the threshold value, the operation proceeds to step S32 where the fact that the expendable item is at the end of its service life is indicated by predetermined display means so as to prompt the user into exchanging the expendable item 200.

Then, in step S33, usable/unusable information indicating that the expendable item 200 is unusable is generated. This information is encrypted using the electronic apparatus private key information corresponding to the third key according an embodiment of the present invention, and digital signature information generated using the same private key information is attached to the usable/unusable information. The, in step S34, the electronic apparatus public key information corresponding to the fourth key according to an embodiment of the present invention, and the encrypted usable/unusable information and digital signature information generated in step S33 are transmitted to the expendable item 200 along with write instructions for writing the information in the usable/unusable information storage part 203 of the NVRAM 214. In this way, the process flow of the electronic apparatus main body is completed.

In a case where it is determined in step S31 that the remainder information is greater than the threshold value, the process flow may be ended at this point.

At the expendable item 200 side, upon receiving the write instructions transmitted from the electronic apparatus main body 100 in step S34, the CPU 211 determines in step S24 that write instructions have been received, and the operation proceeds to step S25, where CPU 211 stores the received electronic apparatus public key information, the encrypted usable/unusable information, and signature information in the usable/unusable information storage part 203 of the NVRAM 214, after which the process flow is ended. It is noted that the storing process may be realized by replacing corresponding information previously stored in the usable/unusable information storage part 203 with the transmitted information. Also, in step S24, when write instructions are not received within a predetermined time period, the process flow is ended at this point.

By performing the above-described processes, when the expendable item 200 is expended through used within the electronic apparatus to fall into a state in which it can no longer be used, this may be informed to the user, and usable/unusable information indicated as unusable may be stored in the expendable item 200 along with required key information and encrypted information. Further, the usable/unusable information may be stored in an encrypted state, the information being encrypted in a manner such that it may be decoded by key information that is stored along with the encrypted usable/unusable information.

In this way, the expendable item 200 may store usable/unusable information indicated as unusable until being properly recycled by an expendable item recycling apparatus 300 at a qualified facility.

Also, in the present example, the expendable item 200 is arranged to store usable/unusable information along with a digital signature created using private key information attached thereto (i.e., information generated by encrypting the usable/unusable information and corresponding information thereof), and thereby, verification of the digital signature information may be made using the public key information corresponding to the private key information so that even when the usable/unusable information is damaged or tampered with, this may be properly detected.

Also, since private key information for the electronic apparatus 10 is used in the present example, the corresponding public key information includes identification information of the electronic apparatus 10 as bibliographic information. Accordingly, the expendable item recycling apparatus 300 and other electronic apparatuses may refer to the bibliographic information to verify that the usable/unusable information has been written by the electronic apparatus 10. It is noted that the actual processes to be performed in the verification depends on the contents of the bibliographic information. For example, the bibliographic information may describe an apparatus by a particular manufacturer, an apparatus of a particular region, an apparatus with a particular function, an apparatus of a particular type, or an apparatus with a particular serial number.

It is noted that the accuracy of the usable/unusable information may be verified in a similar manner by decoding the encrypted usable/unusable information using the corresponding public key information. In this case, encryption of usable/unusable information and attachment of signature information are both performed.

Figure 13:
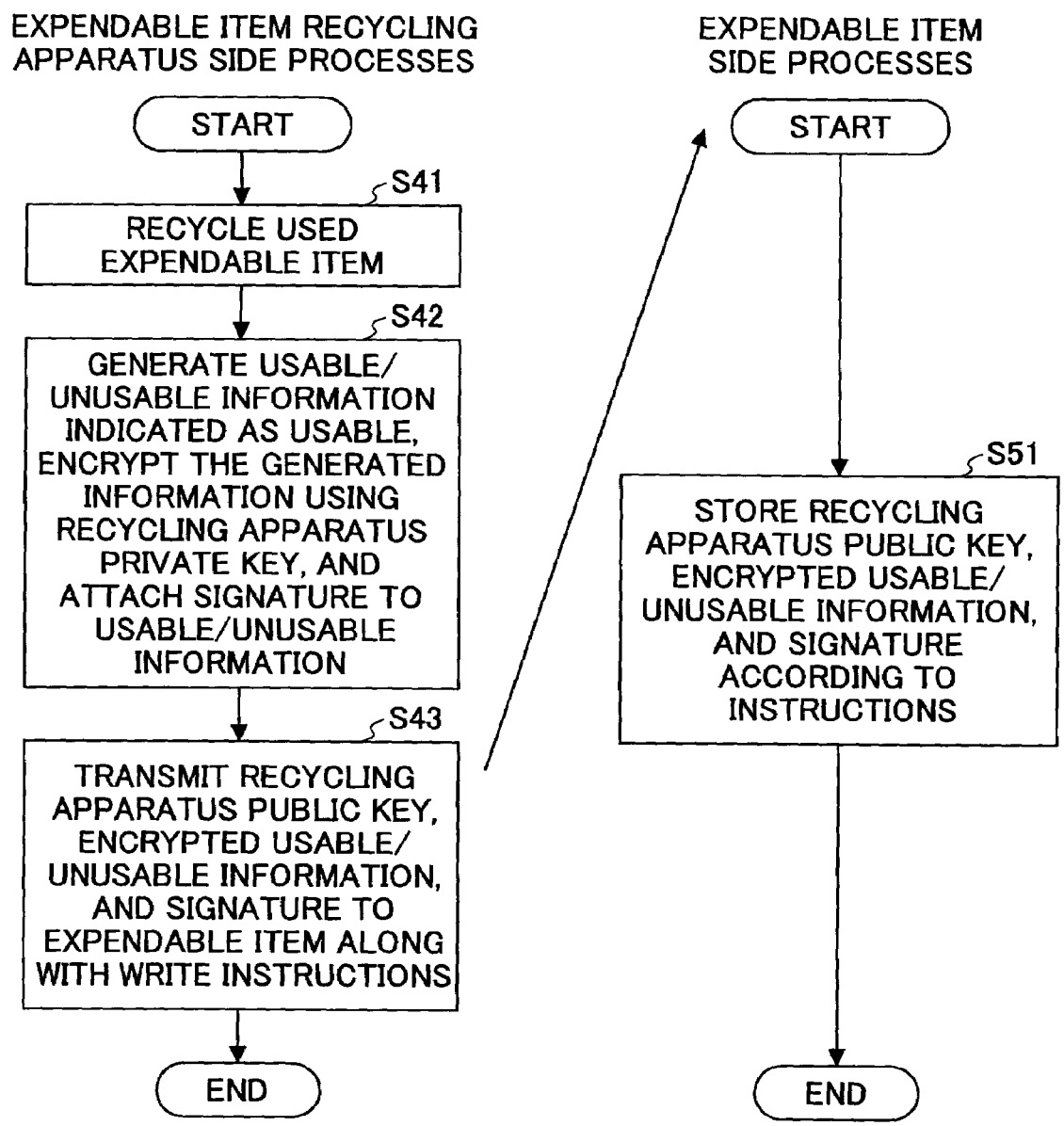
FIG. 13 shows a pair of flowcharts illustrating process steps performed by the expendable item recycling apparatus and the expendable item, respectively, when the expendable item is being recycled.

In FIG. 13, flowcharts illustrating processes performed by the expendable item recycling apparatus 300 and the expendable item 200, respectively, upon recycling the expendable item 200 are shown. It is noted that the arrow between the two flowcharts of this drawing indicates that the pointed process is performed after completion of the process at the root of this arrow. Also, it is noted that the process steps of the expendable item recycling apparatus 300 illustrated in this drawing corresponds to a control method for controlling an expendable item recycling apparatus according to an embodiment of the present invention.

In performing recycling processes on the expendable item 200, a CPU of the expendable item recycling apparatus 300 starts the processes of the flowchart on the left side of FIG. 13.

In step S41, processes are performed for recycling a used expendable item so that it may be reused. The recycling processes may include data processes as well as physical and/or chemical processes. The actual processes to be conducted in the recycling processes may vary depending on the functions and configurations of the expendable item 200.

After the recycling processes are completed, the operation proceeds to step S42 where usable/unusable information indicating the expendable item 200 is usable is generated, encrypted usable/unusable information is generated by encrypting the generated usable/unusable information using the recycling apparatus private key information corresponding to the first key according to an embodiment of the present invention, and digital signature information created using the same private key information is attached to the usable/unusable information. Then, in step S43, the recycling apparatus public key information corresponding to the fourth key according to an embodiment of the present invention, and the encrypted usable/unusable information and the digital signature information generated in step S42 are transmitted to the expendable item 200 along with write instructions for writing the transmitted information in the usable/unusable information storage part 203 of the NVRAM 214, after which the process flow is ended.

At the expendable item 200 side, upon receiving the write instructions transmitted in step S43 from the expendable item recycling apparatus 300, the processes illustrated by the flowchart on the right side of FIG. 13 are started. In step S51, the received recycling apparatus public key information, encrypted usable/unusable information, and digital signature information are stored in the usable/unusable information storage part 203 of the NVRAM 214 according to the write instructions, after which the process is ended. This storing process is also realized by replacing the previously stored recycling apparatus public key information, encrypted usable/unusable information, and digital signature information with the newly received recycling apparatus public key information, encrypted usable/unusable information, and digital signature information as in the process step S25 of FIG. 12.

By performing the processes describe above, usable/unusable information indicated as usable may be stored in the expendable item 200 that is recycled by the expendable item recycling apparatus 300 along with required key information and encrypted information. Also, the usable/unusable information may be stored in an encrypted state, along with key information that is capable of decoding the encrypted usable/unusable information.

In this way, it may be indicated that the expendable item 200 is in a usable state.

In a case where recycling processes are conducted at an unqualified facility, it may be presumed that appropriate usable/unusable information cannot be stored in the recycled item. Thus, by storing the usable/unusable information in the manner described above, a qualified recycled item may be easily distinguished (identified) over an unqualified recycled item.

In other words, by performing the processes illustrated in FIGS. 12 and 13 upon using/recycling the expendable item 200, a qualified recycled item may be distinguished (identified) over an unqualified recycled item in the processes illustrated in FIG. 10.

It is noted that oftentimes it is difficult to distinguish a qualified recycled item from an unqualified recycled item based on outward appearances of the recycled items in a case where both items are recycled from genuine items. Therefore, it may be beneficial to enable identification of the expendable item 200 based on information stored therein according to the method described above.

It is noted that in the case of indicating that the expendable item 200 is unusable, there is no particular information that needs to be stored in the corresponding expendable item 200. For example, the information indicating that the expendable item 200 is usable may simply be destroyed. In the process flow illustrated in FIG. 10, an expendable item 200 is recognized as a qualified recycled item or a genuine item only when information indicated as usable is properly stored in the corresponding expandable item 200. Accordingly, the state of the expendable item 200 may be switched so that it may not be recognized as a qualified recycled item or a genuine item by simply destroying or erasing the information indicated as usable stored therein.

Also, it is noted that plural expandable items may be used in one electronic apparatus 10 according to an embodiment of the present invention. In such a case, usable/unusable information is independently stored in each of the expendable items used, and the processes illustrated by FIGS. 10, 11, and 12 may be independently performed in each of the expendable items. Also, in this case, the expendable items used in the electronic apparatus 10 are not limited to one type; that is, plural types of expendable items may be used in the electronic apparatus 10.

MODIFIED EXAMPLES

In the following, modified examples of the first embodiment are described. It is noted that in the first embodiment described above, when storing usable/unusable information in the expendable item 200, the usable/unusable information is stored in an encrypted state by encrypting the usable/unusable information using private key information, and signature information created using the same private key information is stored along with the encrypted usable/unusable information. However, the present invention is not limited to such an embodiment.

Figure 14A:
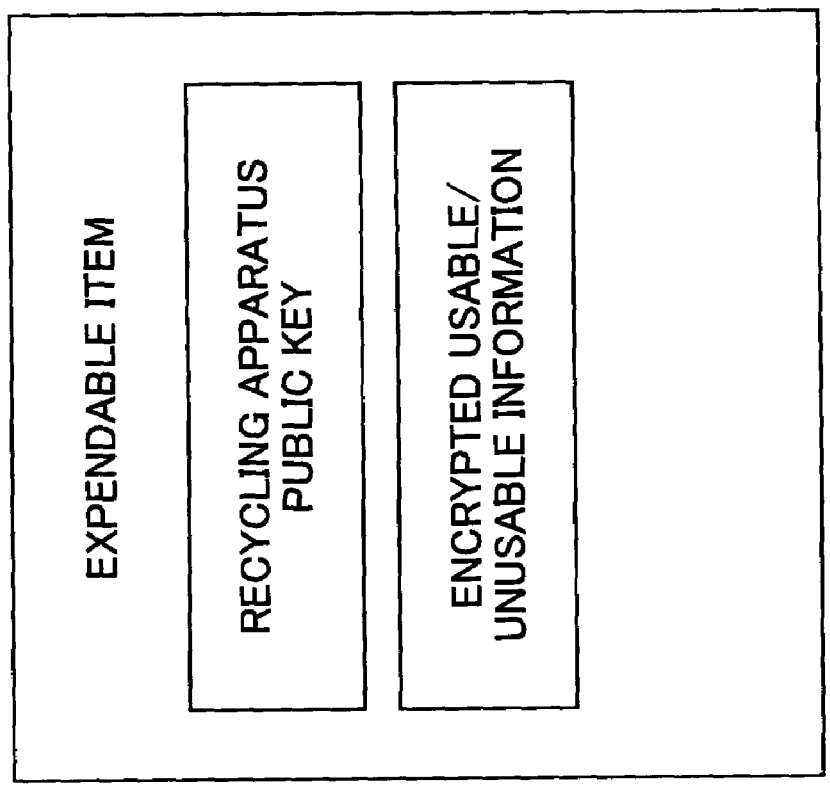
FIGS. 14A and 14B are diagrams illustrating storage formats for storing usable/unusable information and related information thereof in an expendable item according to modified examples of the present invention.
Figure 14B:
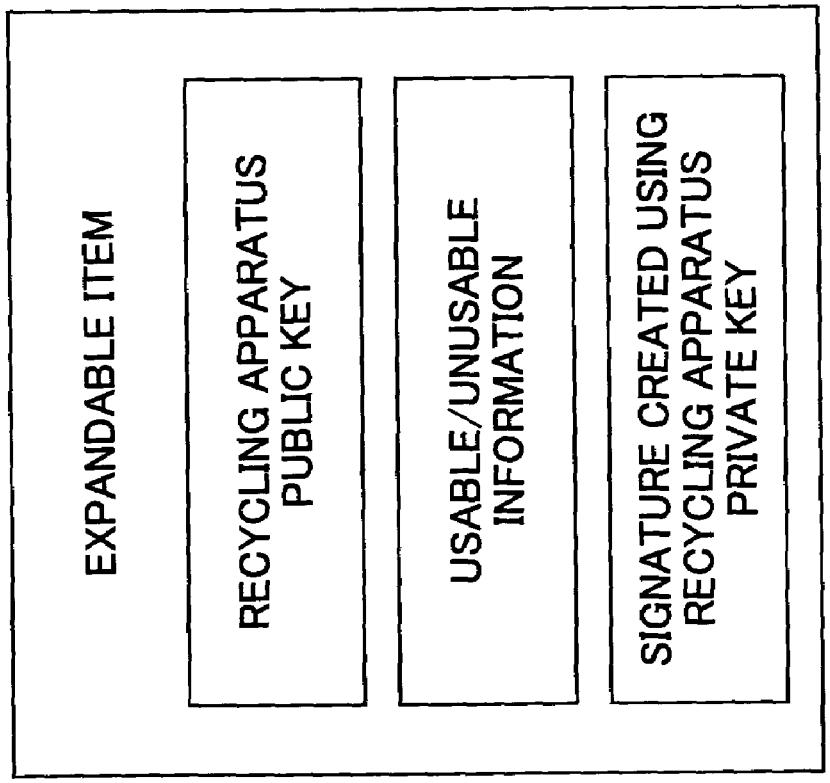

FIGS. 14A and 14B are diagrams illustrating storage formats for storing usable/unusable information and related information thereof in an expendable item according to modified examples of the present invention.

According to one modified example, when signature information is attached to usable/unusable information to be stored in an expendable item, a determination is made as to whether the usable/unusable information is different from its original state at the time of the signature generation due to damage or tampering, for example, by verifying the signature information. Therefore, the usable/unusable information itself does note necessarily have to be encrypted. Specifically, as is shown in FIG. 14A, the usable/unusable information may be stored in the expendable item in plain language. In this case, the process step S4 of FIG. 10 is unnecessary.

In another modified example, when the usable/unusable information is encrypted using private key information, the encrypted usable/unusable information cannot be decoded by the corresponding public key information when it is damaged or tampered with in the encrypted state, and thereby, inaccuracy of the usable/unusable information may be properly detected. Therefore, signature information does not necessarily have to be attached in this case. Specifically, as is shown in FIG. 14B, the expendable item does not have to store signature information derived by the private key information. In this case, the process step S5 of FIG. 10 may be unnecessary.

Figure 15B:
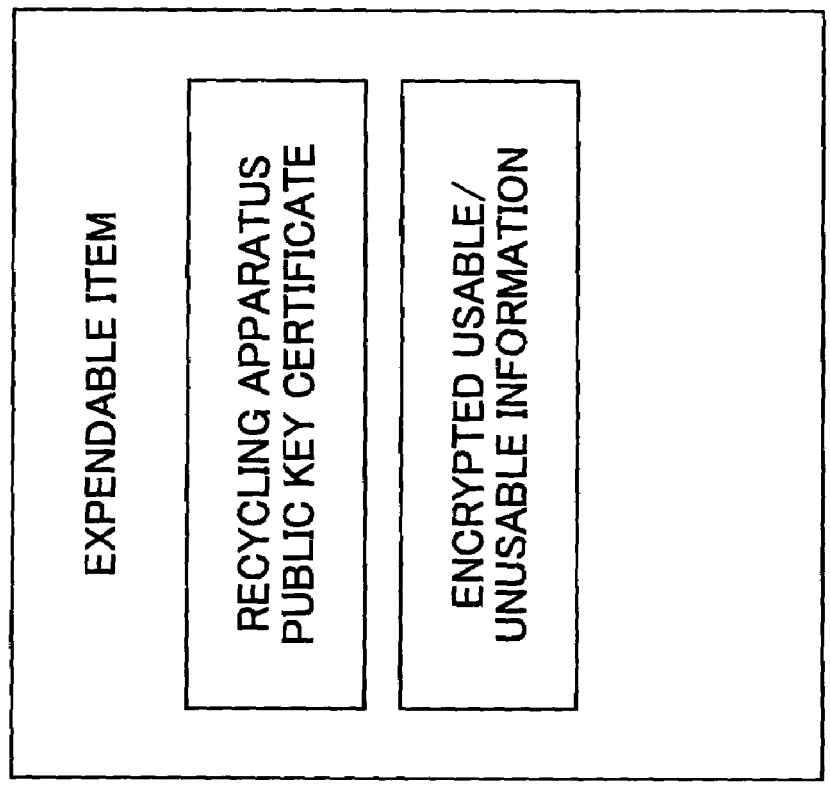
FIG. 15 illustrates a storage format for storing usable/unusable information and related information thereof in an expendable item according to another modified example of the present invention.
Figure 15A:
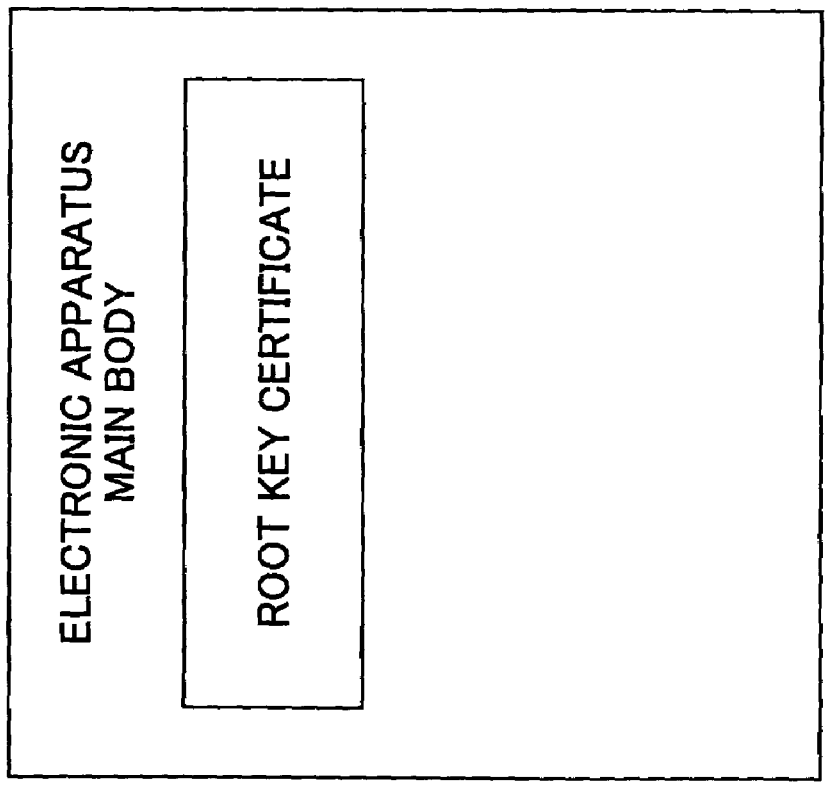

FIG. 15 illustrates a storage format for storing usable/unusable information and related information thereof in an expendable item according to another modified example of the present invention.

In the previously described examples, the public key information is stored in the expendable item in its original state. However, in such cases, since the bibliographic information included in the public key information is not encrypted, it may be susceptible to tampering. For example, the bibliographic information of public key information for an expended item recycling apparatus at an unqualified facility may be rewritten into that of the expended item recycling apparatus 300 at a qualified facility.

To avoid such a problem, a CA (certificate authority) corresponding to the issuer of the public key information may generate a public key certificate corresponding to a digital certificate with digital signature information attached thereto to be stored instead of the public key information. In this case, key information (root key) for decoding the digital signature information attached to the public key certificate and verifying that the public key information is not damaged or tampered with is required. Such information may be stored in the electronic apparatus main body 100 (and in the expendable item recycling apparatus 300 if necessary or desired).

As is illustrated in FIG. 15, in the case of using the public key certificate, a root key certificate may be stored in the electronic apparatus 100, and a recycling apparatus public key certificate and encrypted usable/unusable information may be stored in the expendable item 200.

Figure 16A:
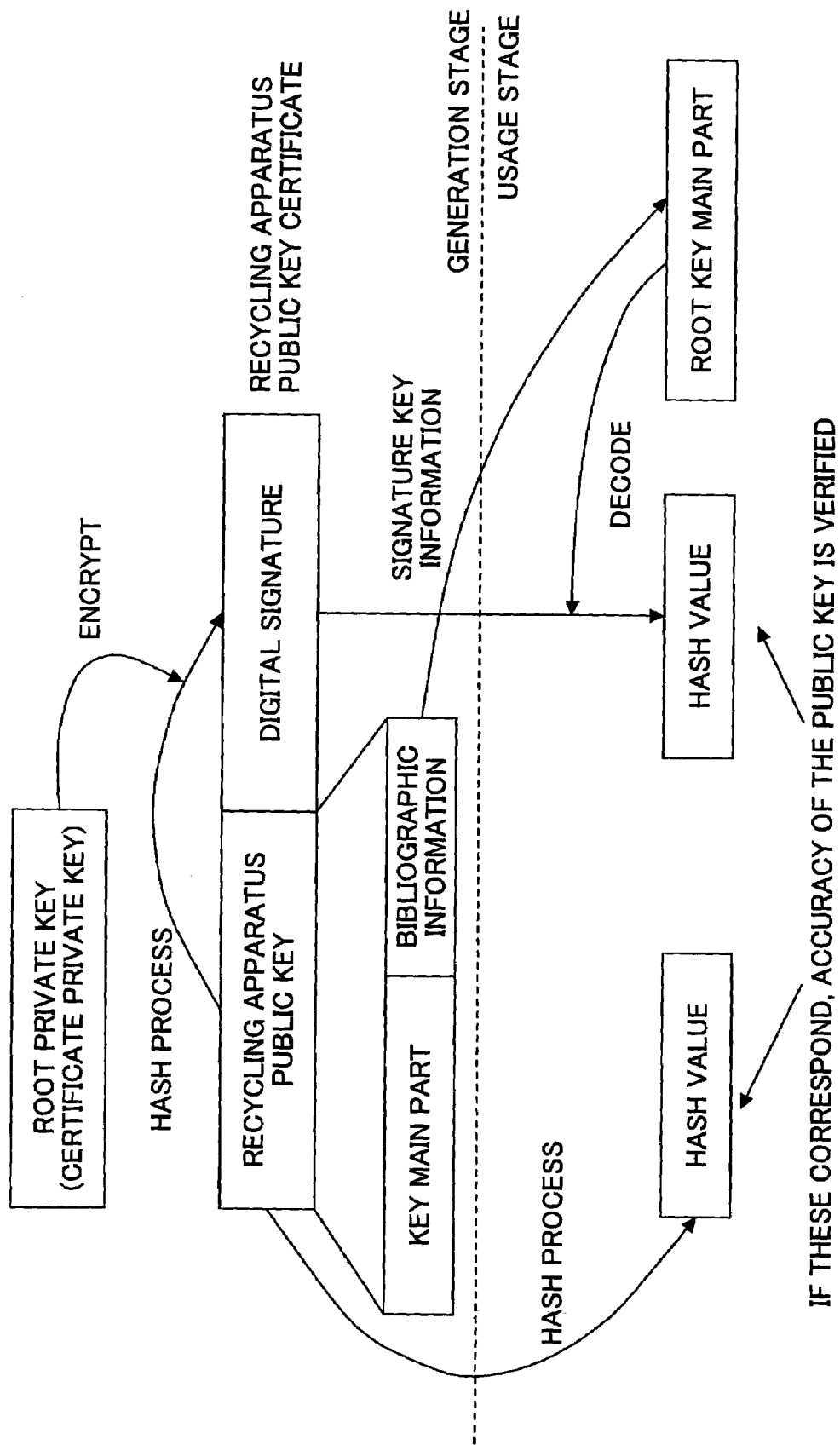

FIGS. 16A and 16B are diagrams illustrating relations between the public key certificate and the root key certificate.

As is illustrated in FIG. 16A, according to one example, the recycling apparatus public key information may include a key main part that is used for decoding data encrypted using recycling apparatus private key information corresponding to this public key information, and bibliographic information including information on the issuer (CA) of the recycling apparatus public key information and expiration information of the recycling apparatus public key information. In the present example, the CA encrypts a hash value obtained by performing a hash process on the of the recycling apparatus public key information using a root private key, and attaches the encrypted information as digital signature information to the recycling apparatus public key information t indicate that the key main part and the bibliographic information is not tampered with. In this case, the identification information of the root private key used in creating the digital signature information is added to the bibliographic information of the of the recycling apparatus public key information as signature key information. The public key certificate with such digital signature information attached thereto corresponds to a recycling apparatus public key certificate.

In the case of using the recycling apparatus public key certificate in the identification process shown in FIG. 10, the digital signature information included therein is decoded using a key main part of a root public key (simply referred to as root key hereinafter) corresponding to the root private key. If the decoding operation is successfully performed, it may be verified that the digital signature information corresponds to that attached by the CA. Also, if a hash value obtained by performing a hash process on the recycling apparatus public key information and a hash value obtained by the decoding operation correspond, the accuracy of the key information itself may be verified; that is, it may be determined that the key information has not been damaged or tampered with. Further, if received data can be successfully decoded using the recycling apparatus public key information, it may be verified that the data correspond to data transmitted from the owner of the recycling apparatus public key information.

It is noted that the public key certificate as is described above may be generated according to a format such as the so-called X.509 certificate format.

In order to verify the accuracy of the public key certificate, the root key has to be stored in the apparatus making this verification beforehand. According to one example, as is shown in FIG. 16B, the root key may be stored as a root key certificate with the digital signature information attached thereto by the CA. In this example, the root key certificate is stored in a manner such that the digital signature information may be decoded using the public key information stored in the apparatus. When using the root key, the digital signature information is decoded using the key main part included in the root key certificate, and the hash value obtained from the decoding operation is compared with the hash value obtained by performing a hash process on the root key. When the hash values correspond, it may be verified that the root key has not been damaged or tampered with.

It is noted that the usable/unusable information and related information thereof that are stored in the expendable item may be encrypted further or dispersed to be stored in various locations of a memory. In this way, analysis of the memory of the expendable item 200 by a third person may be made difficult so that the risk of the third person figuring out the storage format of the usable/unusable information may be lowered. It is noted that it is quite easy to store read/write algorithms and keys required for encrypting/decoding processes in the expendable item 200, and thereby, such an arrangement may not be a particular burden on the qualified apparatus.

FIGS. 17A and 17B are diagrams illustrating examples of the usable/unusable information.

As is shown in FIG. 17A, the usable/unusable information may simply be configured to make a distinction between usable and unusable. However, as is shown in FIG. 17B, information pertaining to the usage history of the expendable item such as the number of times the expendable item is used/recycled, or the state of the expendable item such as the expended state of the expandable item may be described in the usable/unusable information. As is described above, measures for preventing tampering are implemented on the usable/unusable information, and thereby, if usage history information is described in the usable/unusable information, tampering of the usage history information may be prevented as well.

In the case of including information pertaining to the expendable item state in the usable/unusable information, the expendable item 200 itself is not capable of changing this information, and thereby, the electronic apparatus main body may be arranged to generate the usable/unusable information indicating the expendable item state according to the remainder information, transmit the generated information to the expendable item 200 along with write instructions for writing the transmitted information.

According to another modified example, a CPU may not be included in an expendable item of an electronic apparatus, and a CPU may only be included in an electronic apparatus main body.

Figure 18:
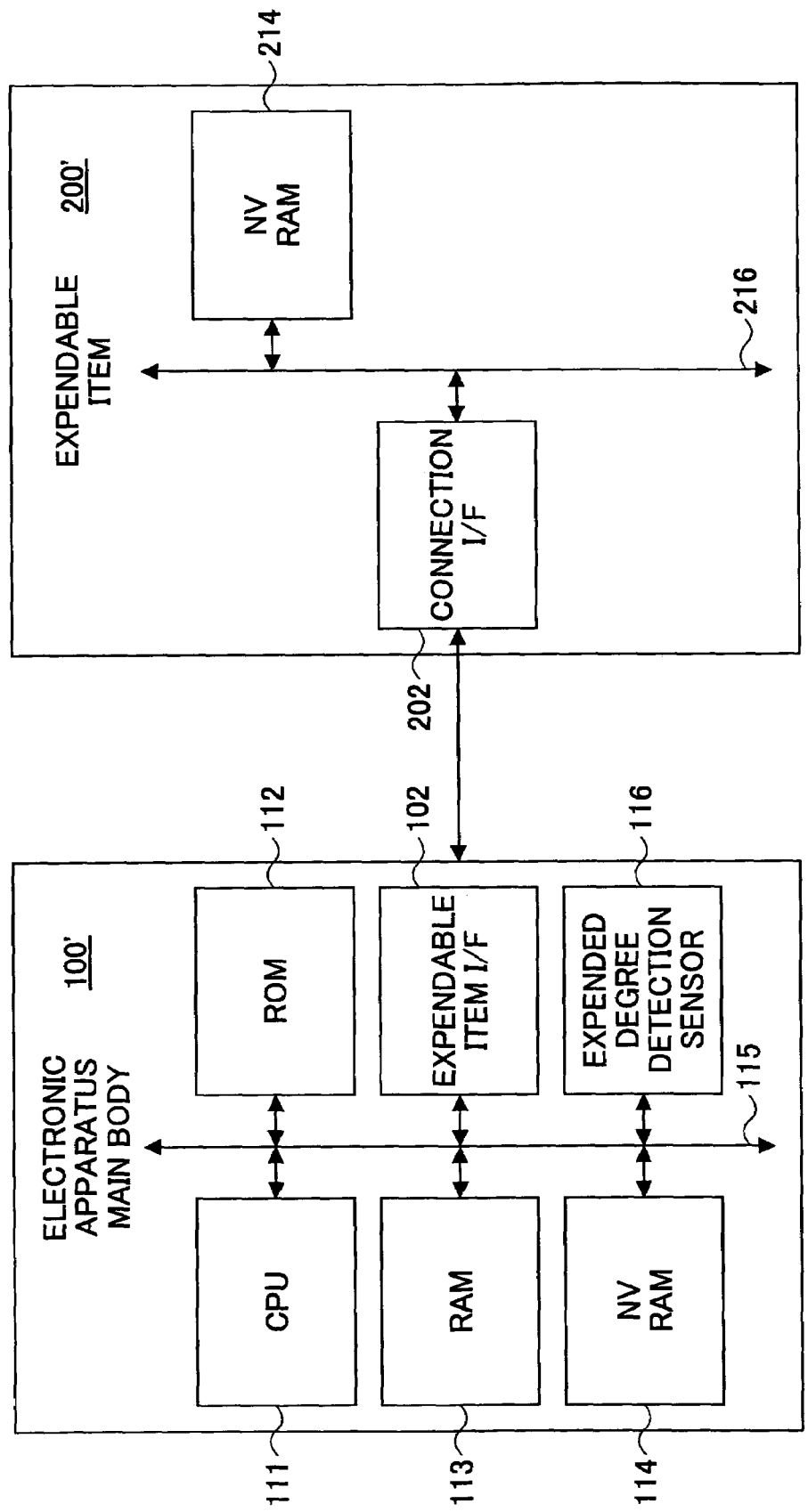
FIG. 18 is a block diagram illustrating a hardware configuration of an electronic apparatus according to a modified example.

FIG. 18 is a block diagram illustrating a hardware configuration of such an electronic apparatus. It is noted that in this drawing, component parts that are identical to those shown in FIG. 3 are assigned the same numerical references.

In the present example, the expandable item 200' does not include a CPU, a ROM, nor a RAM, and merely includes a NVRAM 214 and a connection I/F 202 that are interconnected by an internal bus 216. According to the present example, the electronic apparatus main body 100' includes an expended degree detection sensor 116 since such a sensor may not be adequately controlled at the expendable item 200' side without a CPU.

According to the present example, usable/unusable information and related information thereof are stored in the NVRAM 214. However, operations for reading/writing the stored information are controlled by the CPU 111 of the electronic apparatus main body 100'. An arrangement as is described above may not cause particular problems provided that the expendable item 200' is used as a part of the electronic apparatus 10' and is connected to the internal bus 115 of the electronic apparatus main body 100'.

However, it is noted that in such an arrangement, processes pertaining to detection of the expended degree of the expended item 200' and rewriting of the usable/unusable information are slightly different from those of the first embodiment.

Figure 19:
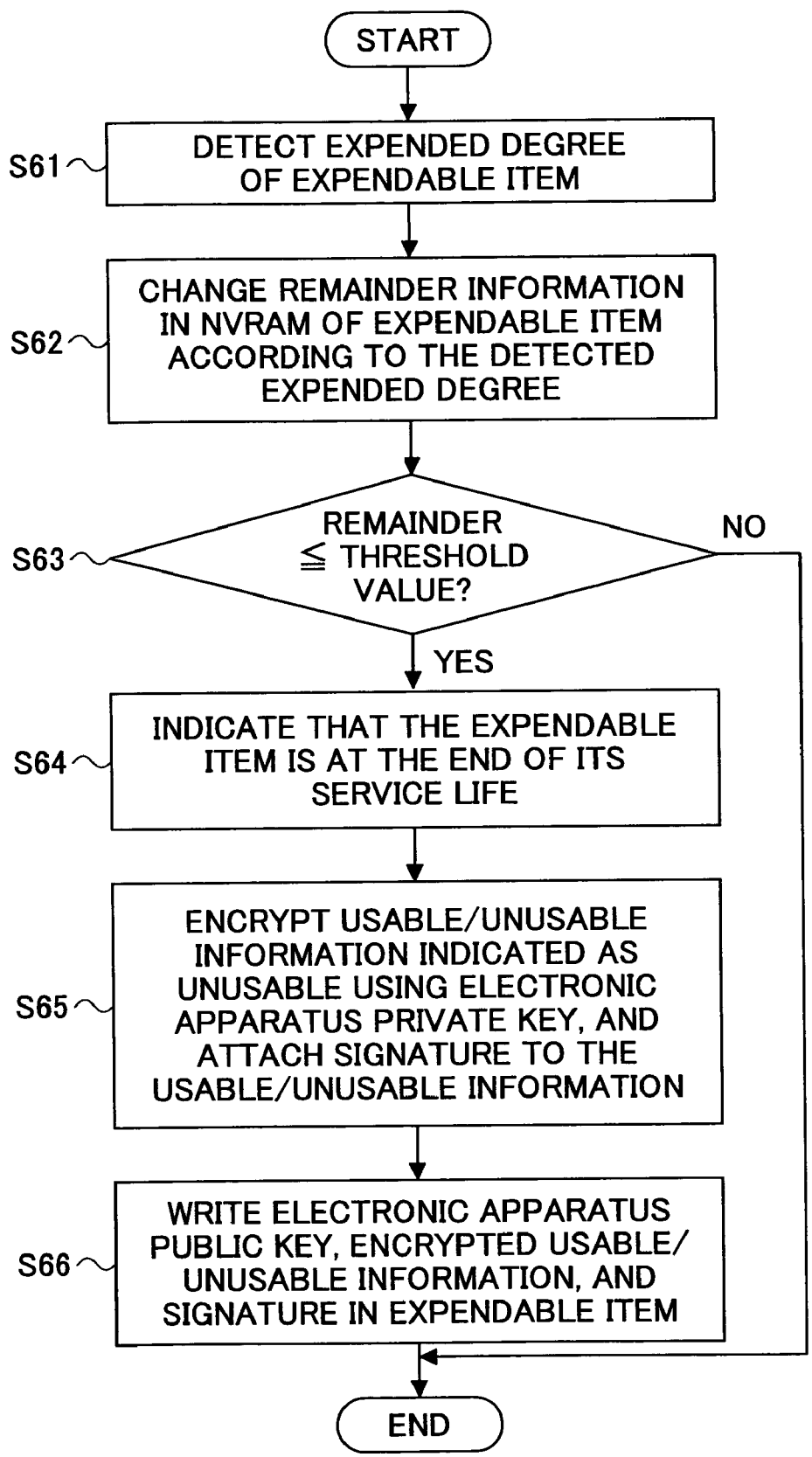
FIG. 19 is a flowchart illustrating process steps performed by the electronic apparatus of FIG. 18.

For example, FIG. 19 is a flowchart illustrating process steps performed in the present example that corresponds to the process steps illustrated in FIG. 12 according to the first embodiment. It is note that the process steps are all executed by the CPU 111 of the electronic apparatus main body 100'. Specifically, in the processes for detecting the expended degree of the expended item, changing the remainder information, and writing usable/unusable information that are performed at the expendable item 200 side in the first embodiment are performed at the electronic apparatus main body 100' side according to the present example.

It is noted that effects pertaining to identification of the expendable item may be achieved in the present example that are similar to those achieved in the first embodiment.

Also, it is noted that the write process step S51 of FIG. 13 that is conducted at the expendable item 200 side according to the first embodiment may be conducted at the expendable item recycling apparatus 300 side according to the present example to obtain advantageous effects pertaining to identification of the expendable item that are similar to those obtained in the first embodiment.

According to another example, a public key certificate and a private key may be stored in each of the electronic apparatus main body 100 and the expendable item 200, and in the case of using the expendable item 200, an authentication process using PKI may be conducted between the two sides. In turn, a determination may be made as to whether the expendable item 200 corresponds to a genuine item through this authentication process. In the case where the electronic apparatus main body 100 is unable to properly authenticate the expendable item 200, it may be determined that the expendable item 200 does not correspond to a genuine item, and a warning may be issued to the user in a manner similar to step S8 of FIG. 10.

Figure 20:
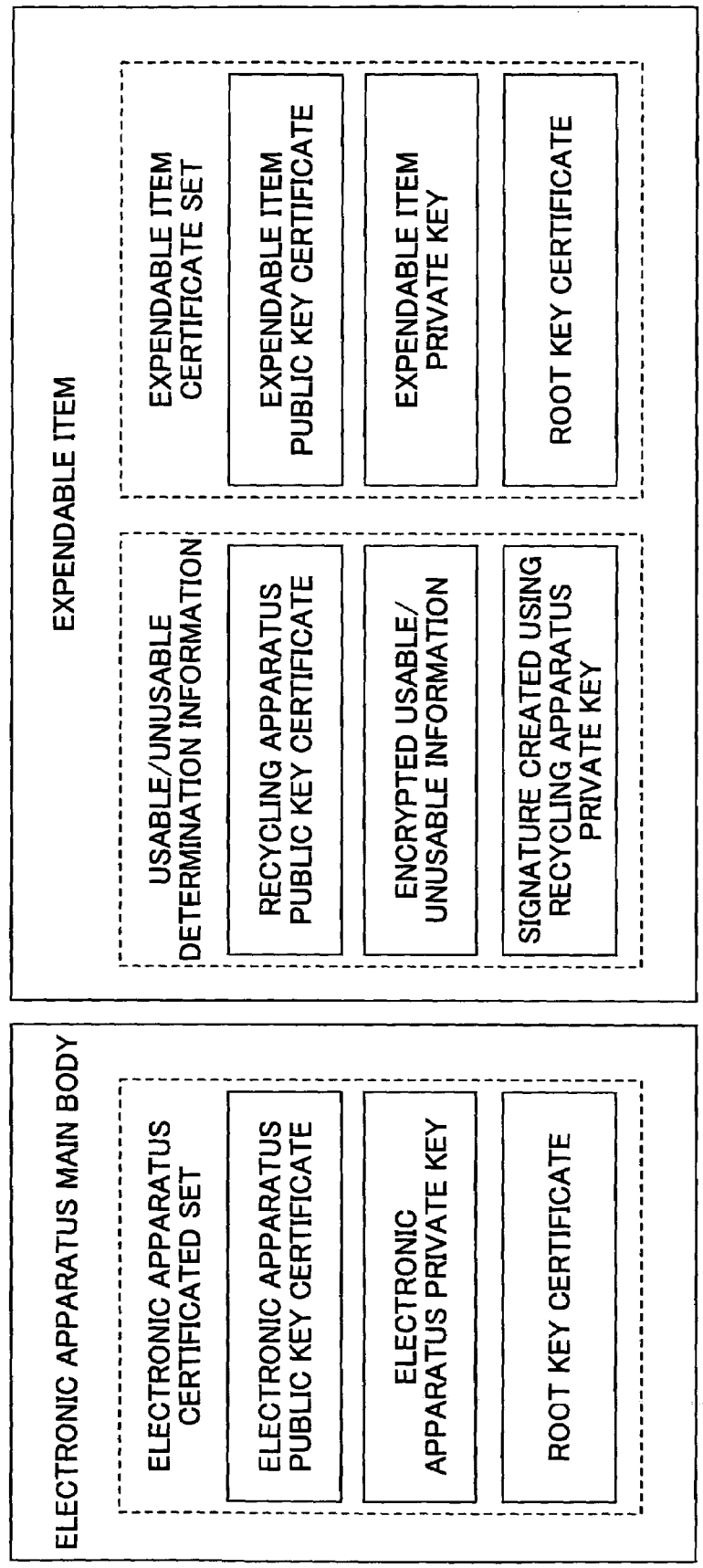
FIG. 20 is a diagram illustrating exemplary configurations of information stored in the electronic apparatus main body and the expendable item in a case where an authentication process based on PKI is performed between the electronic apparatus main body and the expendable item.

FIG. 20 is a diagram illustrating exemplary configurations of information stored in the electronic apparatus main body 100 and the expendable item 200 in the case where such an authentication process is used.

According to the present example, information corresponding to that used in the first embodiment is stored as usable/unusable determination information, and additionally, a certificate set is stored in each of the electronic apparatus main body 100 and the expendable item 200. Specifically, an electronic apparatus public key certificate and an electronic apparatus private key are issued as the public key certificate and the private key for the electronic apparatus 10, and an expendable item public key certificate and a expendable item private key are issued as the public key certificate and the private key for the expendable item 200. Also a root key certificate for verifying the accuracy of the public key certificate being transmitted from the other side is stored in each of the electronic apparatus main body 100 and the expendable item 200. It is noted that the root key certificates stored in the electronic apparatus main body 100 and the expendable item 200 may be identical or different from each other.

Figure 21A:
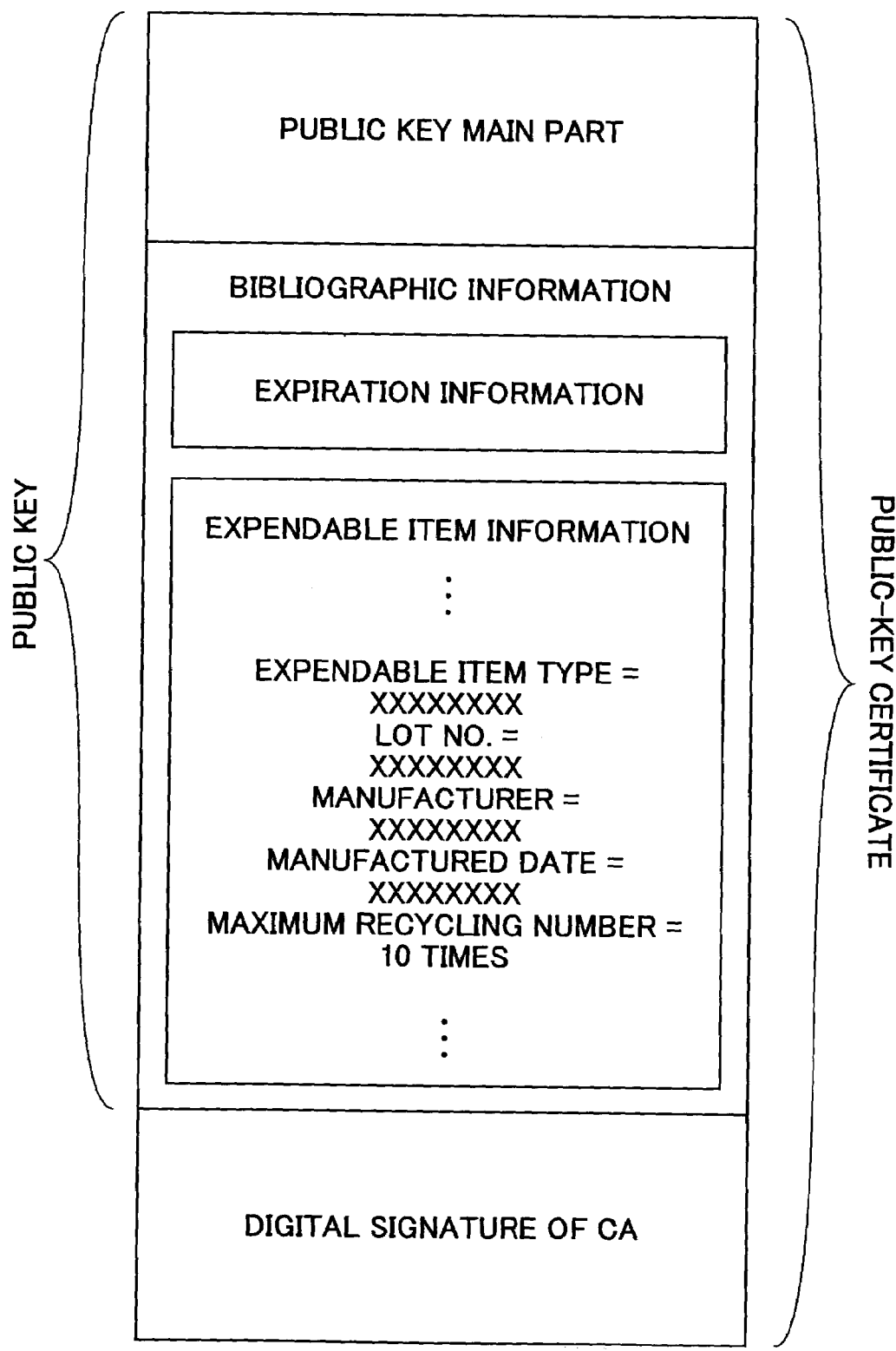
FIGS. 21A and 21B are diagrams illustrating detailed configurations of the expendable item public key certificate and the electronic apparatus public key certificate shown in FIG. 20.
Figure 21B:
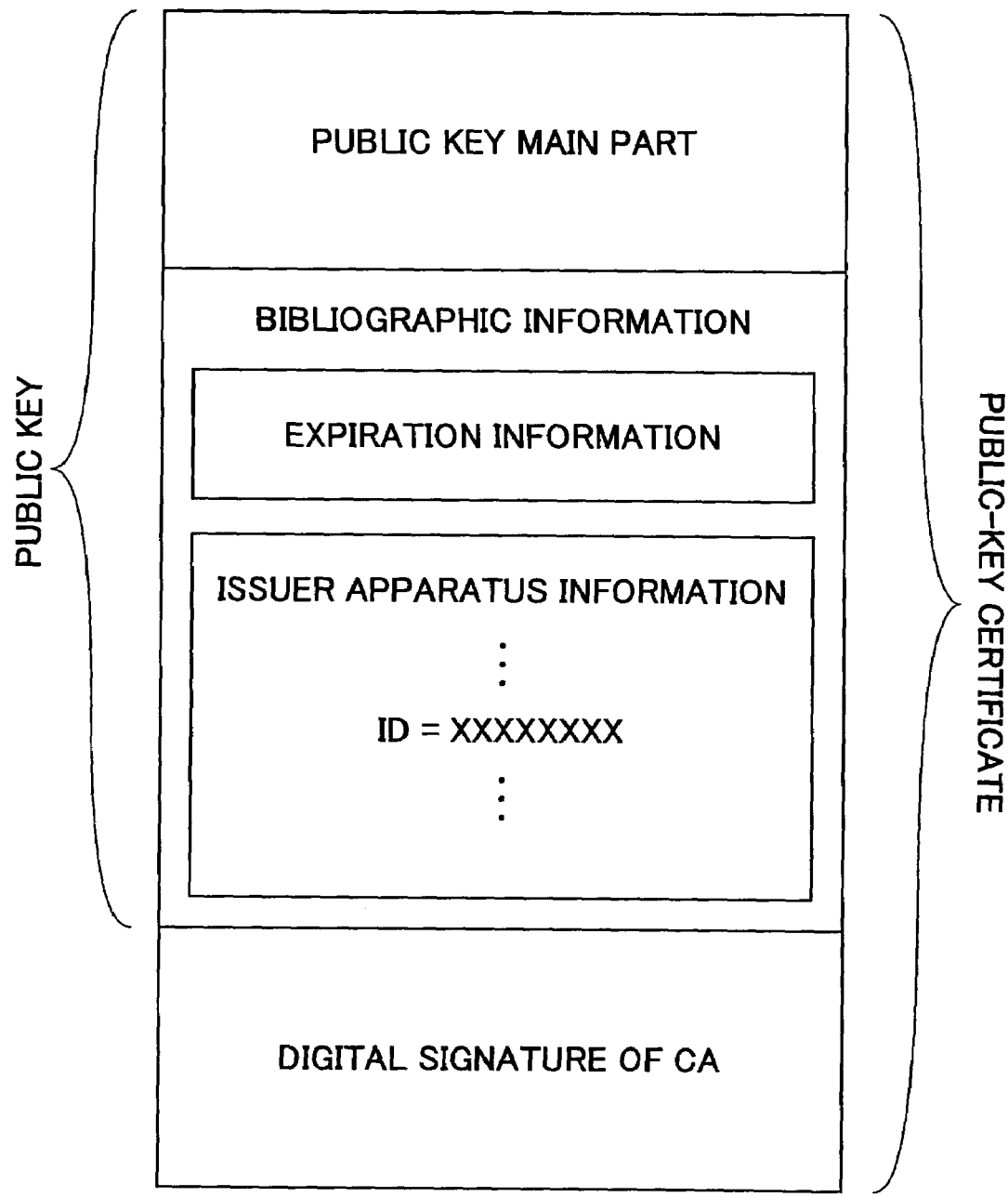

FIGS. 21A and 21B are diagrams illustrating configurations of the expendable item public key certificate and the electronic apparatus public key certificate.

As is shown in FIG. 21A, the expendable item public key certificate includes as its bibliographic information expiration information of the public key certificate and information pertaining to the expendable item 200 for which the public key is issued such as the expendable item type (e.g., process cartridge), lot number, manufacturer, manufactured date, and maximum recycling number, for example. The bibliographic information as described above may be used for identifying the expendable item 200 and correspond to information that does not have to be rewritten. Accordingly, such information is described within the public key in order to protect the information from tampering, for example.

It is noted that other items of information pertaining to the expendable item that do not require rewriting may be stored in the bibliographic information section as well. For example, individual identification information of the expendable item such as a serial number may be described in the bibliographic information section.

As is shown in FIG. 21B, the electronic apparatus public key certificate includes as its bibliographic information expiration information of the public key certificate and information pertaining to the apparatus for which the public key is issued such as identification information (e.g., serial number) of the apparatus. In other words, each apparatus is arranged to store its individual public key certificate. Alternatively, a common public key certificate may be stored in apparatuses having a particular function (e.g., color imaging apparatus) instead of describing information for identifying each individual apparatus.

Figure 22:
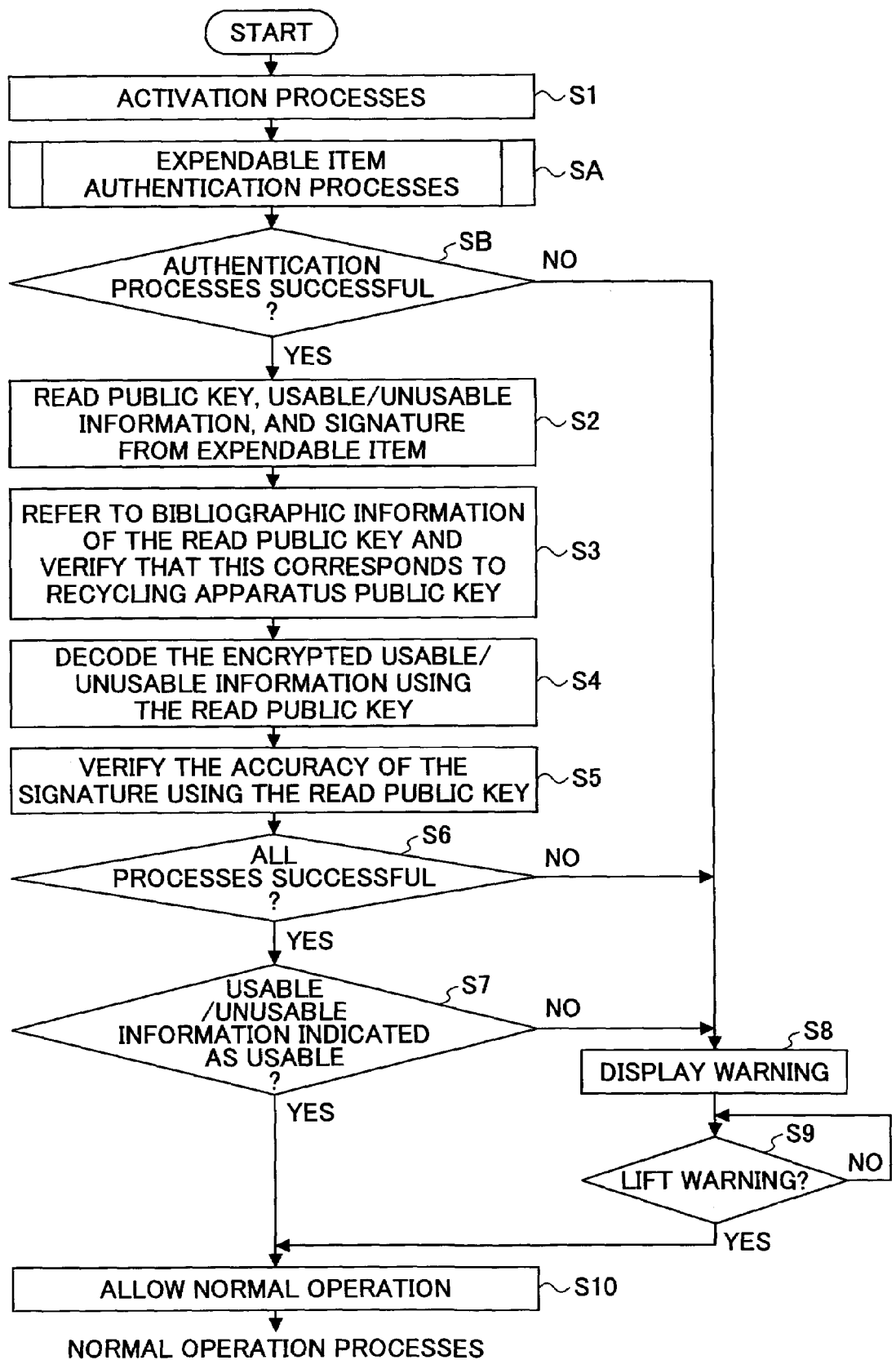
FIG. 22 is a flowchart illustrating process steps that are executed in a case where the authentication process using certificate information of FIG. 20 is performed upon activation of the electronic apparatus.

FIG. 22 is a flowchart illustrating process steps that are executed by the CPU 11 of the electronic apparatus main body 100 upon activation of the electronic apparatus 10 in a case where the authentication process using certificate information as is described above is performed.

It is noted that the process flow according to the present example includes steps SA and SB in between the process steps S1 and S2 shown in FIG. 10. Specifically, in step SA, an authentication process for the expendable item is performed, and in step SB, a determination is made as to whether the authentication process has been successful. If the authentication process is determine to be successful; that is, if the expendable item 200 is determined to correspond to an item manufactured/recycled at a qualified facility, the operations proceeds to step S2 and onward to determine whether the expendable item may be used based on the usable/unusable information.

In a case where the authentication process is determined to be unsuccessful in step SB; that is, if the expendable item 200 is determined to correspond to an item that is not manufactured/recycled at a qualified facility, the operation proceeds to step S8 and a warning is issued to the user indicating that the expendable item 200 cannot be properly recognized. According to the present example, the CPU 111 controls and adjusts the operation of the electronic apparatus 10 based on the authentication result of the authentication process through execution of the process steps SA and SB.

Figure 23:
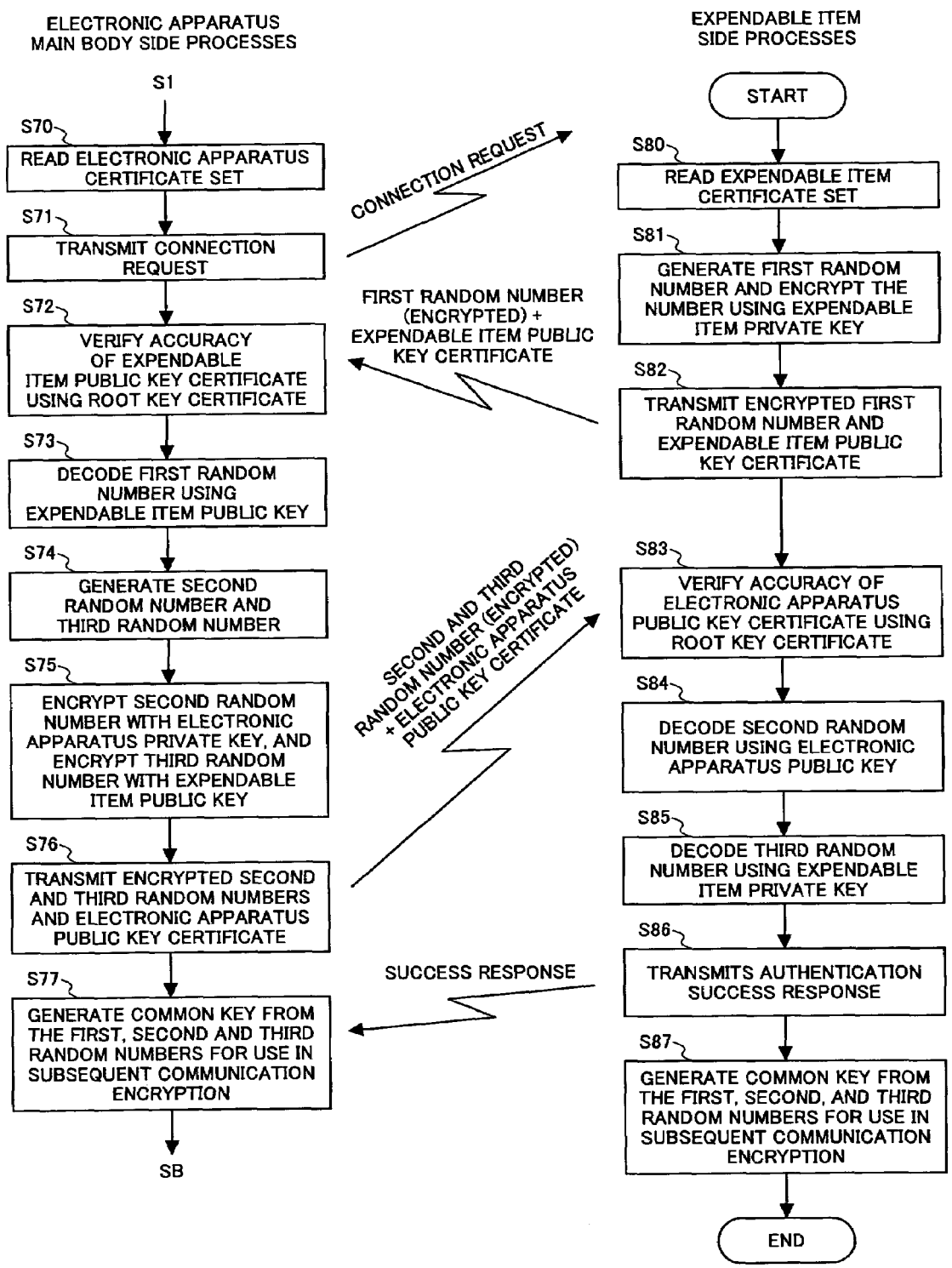
FIG. 23 shows a pair of flowcharts illustrating detailed procedures of the authentication process step of FIG. 22 according to one example.
Figure 24:
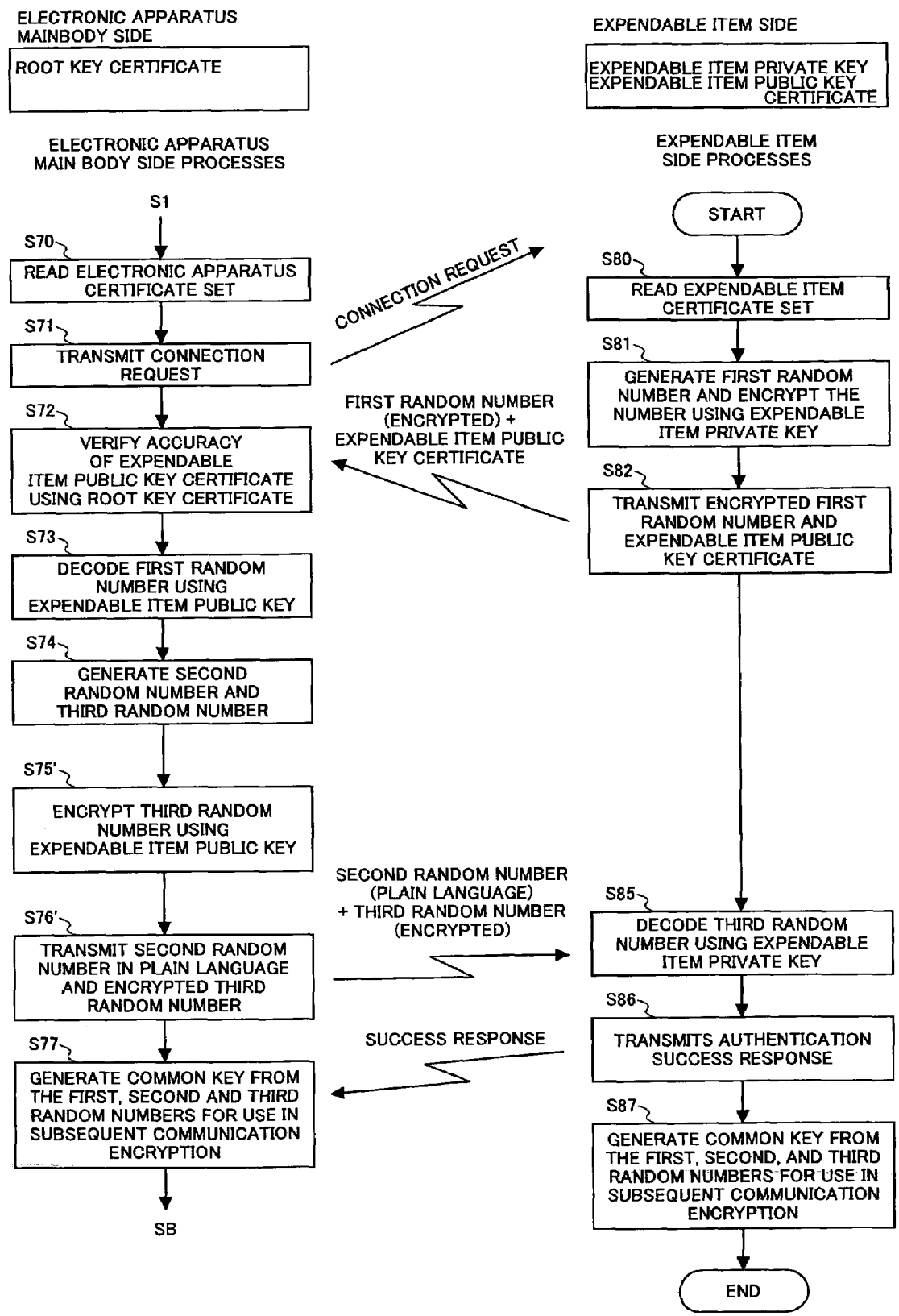
FIG. 24 is shows a pair of flowcharts illustrating detailed procedures of the authentication process step of FIG. 22 according to another example.

FIGS. 23 and 24 are flowcharts illustrating detailed authentication processing procedures of step SA shown in FIG. 22. It is noted that in these drawings, arrows show that information indicated above each arrow is transmitted to the other side in the root step of the arrow, and at the other side, the corresponding process of the pointed step of the arrow is performed upon receiving the transmitted information.

FIG. 23 illustrates process steps performed in a case where the electronic apparatus main body 100 and the expendable item 200 conduct authentication processes on each other; and FIG. 24 illustrates process steps performed in a case where the electronic apparatus main body 100 authenticates the expendable item 200. It is noted that in the latter case, the electronic apparatus main body 100 does not have to store the public key certificate and the private key for realizing the authentication process, and the expendable item does not have to store the root key certificate (see FIG. 24).

In the following, the specific process steps illustrate in FIGS. 23 are described.

First, process steps S70 through S77 performed at the electronic apparatus main body side are described.

S70: read electronic apparatus certificate set;
S71: transmit connection request to expendable item side;
S72: upon receiving encrypted first random number and expendable item public key certificate from the expendable item side, verify accuracy of expendable item public key certificate using root key certificate;
S73: decode first random number using expendable item public key;
S74: generate second random number and third random number;
S75: encrypt second random number with electronic apparatus private key, and encrypt third random number with expendable item public key;
S76: transmit encrypted second and third random numbers and electronic apparatus public key certificate; and
S77: upon receiving authentication success response from the expendable item side, generate common key from the first, second and third random numbers for use in subsequent communication encryption.

Next, process steps S80 through S87 performed at the counterpart expendable item side in response to receiving a connection request from the electronic apparatus main body side are described.

S80: read expendable item certificate set;
S81: generate first random number and encrypt the number using expendable item private key;
S82: transmit encrypted first random number and expendable item public key certificate;
S83: upon receiving the second and third random numbers and the electronic apparatus public key certificate from the electronic apparatus main body side, verify accuracy of electronic apparatus public key certificate using root key certificate;
S84: decode second random number using electronic apparatus public key;
S85: decode third random number using expendable item private key;
S86: transmits authentication success response; and
S87: generate common key from the first, second, and third random numbers for use in subsequent communication encryption.

In the example of FIG. 24, steps S83 and S84 of FIG. 23 are not performed at the expendable item side, and at the electronic apparatus main body side, instead of performing steps S75 and S76 of FIG. 23, a step of encrypting the third random number using the expendable item public key (S75') and a step of transmitting the second random number in plain language and the encrypted third random number to the expendable item side (S76') are performed.

It is noted that the process step S72 for verifying the accuracy of the expendable item public key certificate includes a process of referring to the bibliographic information of the public key certificate and verifying that the expendable item 200 is suitable for use in the electronic apparatus 10 based on the contents of the bibliographic information. Also it is noted that communication encryption is used in order to prevent leakage of information even when the information flowing past a signal line is monitored; however, the encryption does not necessarily have to be performed. Further, it is noted that in a case where one or more of the processes of the steps illustrated in these drawings are not successfully completed, it is determined that the authentication process has been unsuccessful and the operation moves on to subsequent processes. The authentication process is determined to be successful when all the processes illustrated in FIG. 23 or 24 are successfully completed.

It may be presumed that an appropriate set of a public key certificate and a private key cannot be stored in an expendable item 200 manufactured/recycled at an unqualified facility. Accordingly, by conducting the authentication processes described above, a warning may be issued indicating that the electronic apparatus 10 may not operate properly when such an expendable item 200 manufactured/recycled at an unqualified facility is installed for use in the electronic apparatus 10. In this case, since a digital certificate is used for authentication of the expendable item 200, even when information pertaining to the expendable item type and the manufacturer thereof is tampered with, this may be accurately detected in the authentication process according to the present embodiment. In this way, an expendable item manufactured/recycled at an unqualified facility may be identified or distinguished from an expendable item manufactured/recycled at a qualified facility with high reliability.

Also, it is noted that in the case of conducting authentication of the expendable item 200 in the manner described above, usage of the expendable item 200 may be limited to a certain electronic apparatus and the corresponding ID information of the apparatus that is authorized to use the expendable item 200 may be described in the expendable item public key certificate as certified apparatus ID information.

Figure 25:
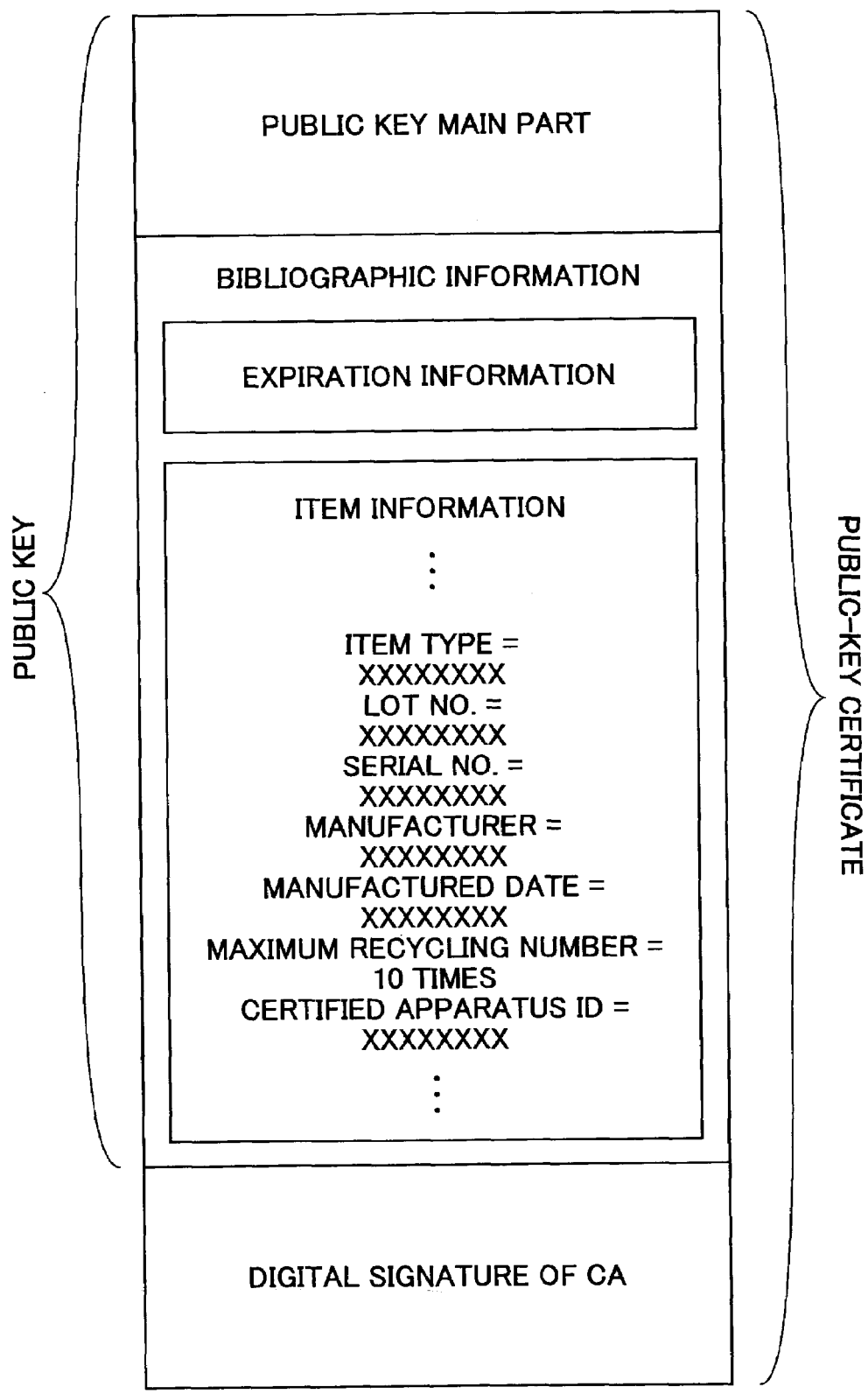
FIG. 25 is a diagram illustrating a configuration of the expendable item public key certificate of FIG. 20 according to a modified example.

FIG. 25 is a diagram illustrating an exemplary configuration of an expendable item public key certificate that includes such certified apparatus ID information. It is noted that ID information of plural apparatuses may be stored as the certified apparatus ID information. By using a certificate as is illustrated in this drawing, a manufacturer may be able to authorize only a certain apparatus to use a given expandable item 200 so as to properly manage distribution of the expendable item 200. Also, according to the present example, even in a case where the entire memory contents of a genuine item are copied and incorporated into non-genuine items to then be distributed, such non-genuine items may only be used in a certain apparatus so that harm inflicted by such non-genuine items may be kept to a minimum.

Figure 26:
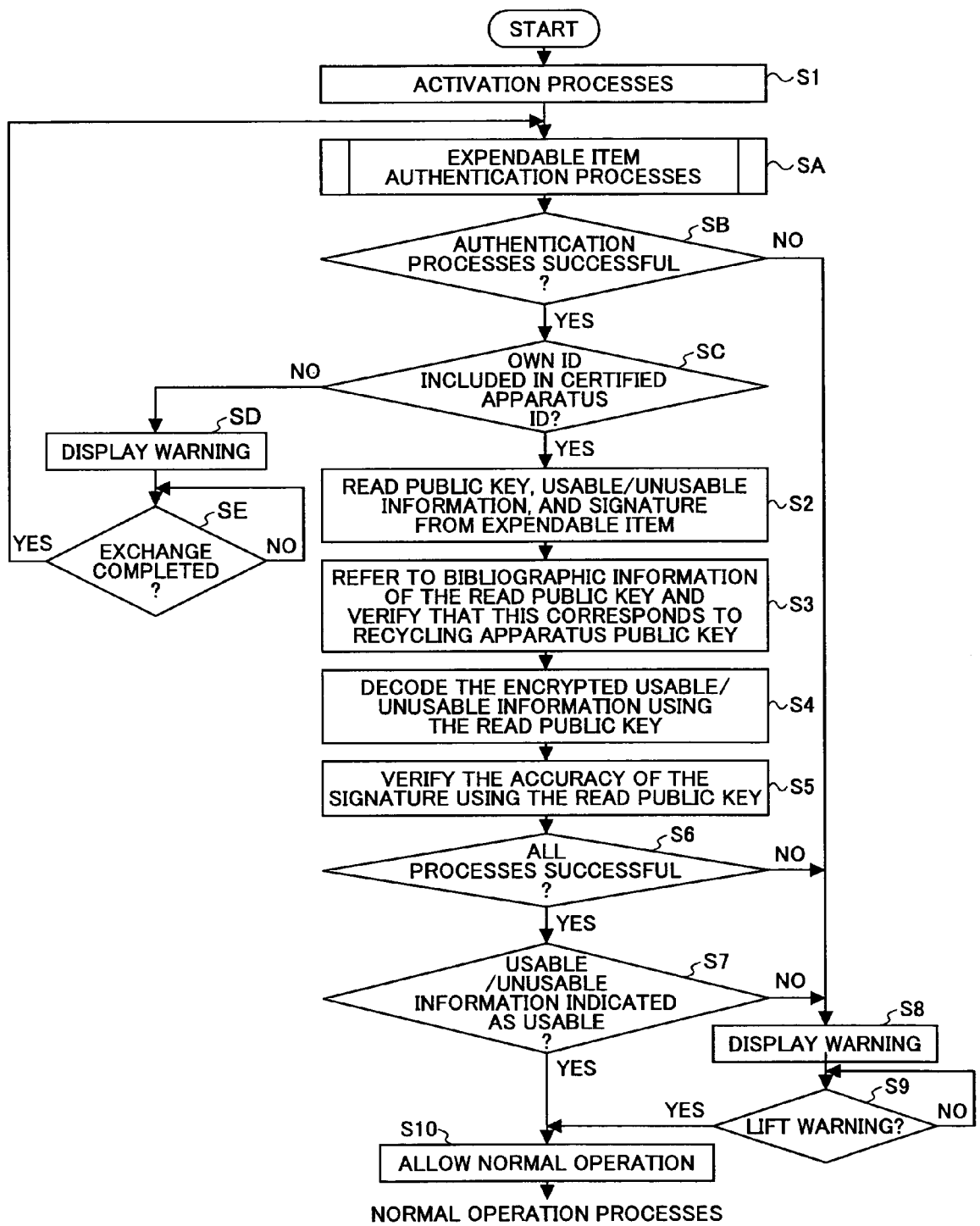
FIG. 26 is a flowchart illustrating process steps that are executed in a case where authentication using the certificate of FIG. 25 is performed upon activation of the electronic apparatus.

FIG. 26 is a flowchart illustrating process steps that are executed in a case where authentication using such a certificate is conducted upon activation of the electronic apparatus 10.

According to the present example, process steps SC through SE are added between process steps SB and S2 of FIG. 22. Specifically, in step SC, a determination is made as to whether ID information of the apparatus performing this step is described as the certified apparatus ID information in the expendable item public key certificate. If the corresponding ID information is described, it is determined that the expendable item 200 may be used in the electronic apparatus 10. In turn, the operation proceeds to step S2 and further identification processes on the expendable item 200 based on usable/unusable information are conducted. It is noted that the certified apparatus ID information is preferably acquired in the authentication process step SA. Also, it is noted that the process step SC may also be regarded as a part of the authentication process.

If it is determined in step SC that the ID information of the apparatus performing this step is not described as the certified apparatus ID information, this means that the expendable item 200 is not authorized to be used in the electronic apparatus 10. Accordingly, the operation proceeds to step SD where a warning is displayed by predetermined warning means such as a display (not shown) of the electronic apparatus main body 100. In one example, the warning may be displayed by a display screen as is illustrated in FIG. 27. According to other examples, other display screens, or other means such as sound, light, and/or vibration may be used to issue the warning to the user. It is noted that the process step SD may correspond to a warning step according to an embodiment of the present invention and the CPU 111 may function as warning means.

When the operation proceeds to step SD, this may often mean that the user has installed the expendable item 200 in a wrong apparatus, or the user has installed a non-genuine item having a copied version of the certificate of a genuine item. Therefore, the confirmation button is not provided in the display screen of FIG. 27, and the user is prompted to exchange the expendable item 200.

The operation may remain in a standby mode in step SE until the exchange process is completed. After the exchange process is completed that operation may go back to step SA, and the illustrated process steps may be repeated.

According to the present example, the CPU 111 is arranged to control and adjust the operation of the electronic apparatus 10 based on the authentication result of the authentication process realized by executing process steps SC through SE of FIG. 26.

It is noted that according to a modified example, the warning display step SD may be arranged to be identical to the illustrated process step S8 so that the warning issued in step SD may be lifted when a predetermined condition is satisfied to allow normal operation processes to be conducted.

In another modified example, the process step S8 may be arranged to be identical to the process step SD so as to prompt the user into exchanging the expendable item 200.

By performing the process steps as described above, a warning may be issued to the user when an expendable item 200 that is not authorized to be used in an electronic apparatus 10 is installed for use in this electronic apparatus 10, and the user may be prompted to exchange the installed expendable item 200. In this case, since a digital certificate is used is used in the identification of the expandable item 200, even when the certified apparatus ID information is tampered with, this may be detected in the present example.

Accordingly, even when a non-genuine item having an exact copy of the certificate set of a genuine item is distributed, since the certified apparatus ID information included therein cannot be rewritten, the non-genuine item may only be used in a certain apparatus so that harm inflicted by the distribution of the non-genuine item may be controlled. Also, even genuine items have to be authorized by the manufacturer to be used in a particular apparatus, and thereby, even when the expendable item handled by a user, the manufacturer may be able to easily control the usage of the expendable item so as to prevent usage of the expendable item in a manner not intended by the manufacturer.

Second Embodiment

In the following, an electronic apparatus and an expendable item according to a second embodiment of the present invention is described. The second embodiment illustrates a specific application of the present invention.

According to the present embodiment, the electronic apparatus of the present invention is applied to a digital multifunction image processing apparatus, and the expendable item of the present invention is applied to a process cartridge that is used in an image forming unit of the image processing apparatus. It is noted that a process cartridge corresponds to a unit that includes image forming means and a toner supplying member that supplies toner to the image forming means.

Figure 28:
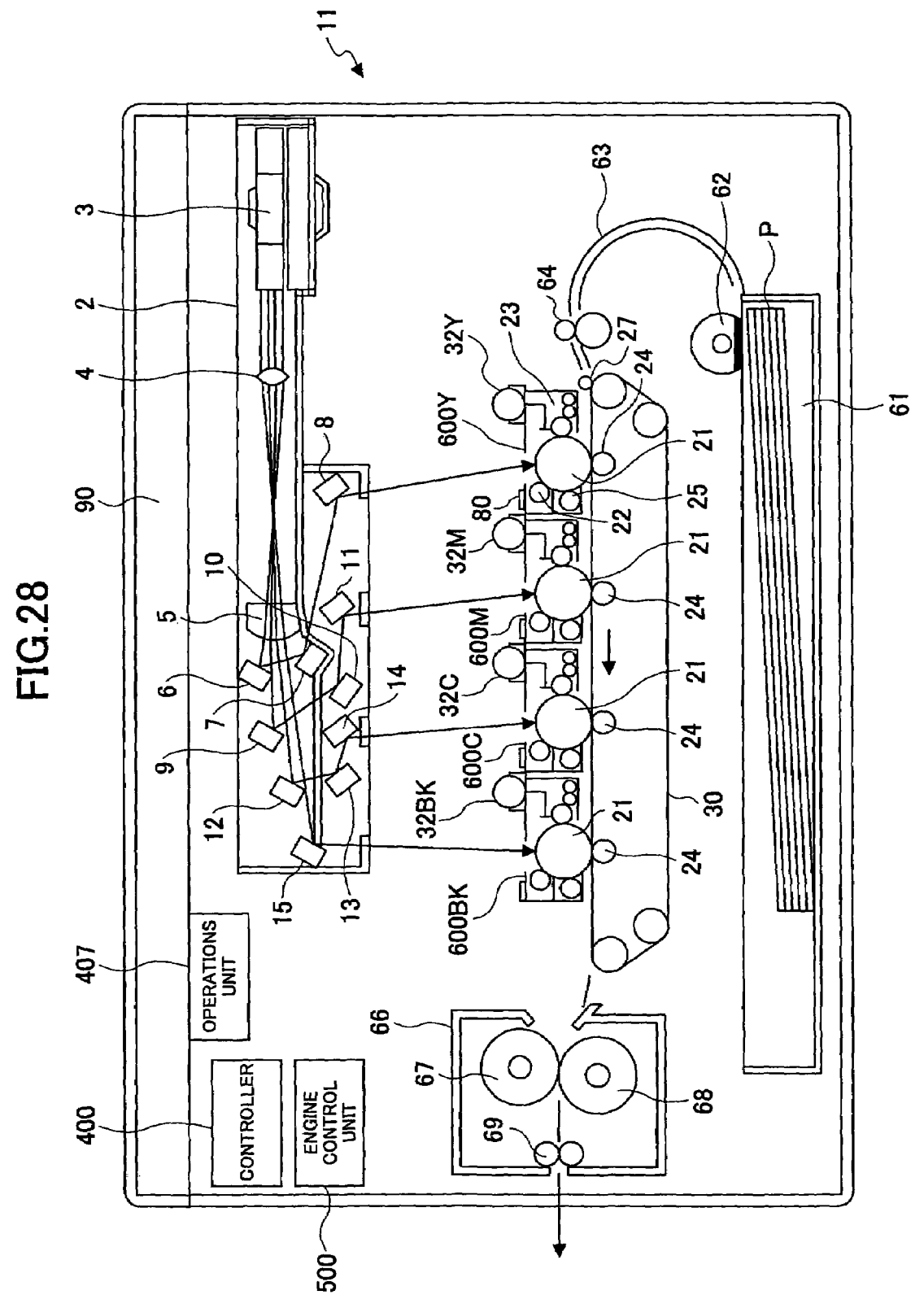

FIG. 28 is a cross-sectional view illustrating an overall configuration of the digital multifunction image processing apparatus according to the present embodiment.

The digital multifunction image processing apparatus 11 shown in this drawing has image processing functions such as copying, facsimile, and scanner functions, and communication functions for communication with an external apparatus, and the digital multifunction image processing apparatus 11 implements application programs for providing services relating to the above functions.

The digital multifunction image processing apparatus 11 includes an optical unit 2 that emits laser light based on image information, process cartridges 600Y, 600M, 600C, and 600BK corresponding to colors yellow, magenta, cyan, and black, respectively, (collectively referred to as process cartridge 600 hereinafter) that are exchangeably set to their respective setting positions, a paper feeding unit 61 that accommodates transfer media such as transfer paper P, a paper feeding roller 62, a delivering guide 63, a resist roller 64, an attraction roller 27, paper delivering means including a transfer belt 30, a heat roller 67, a pressure roller 68, a paper discharge roller 69, a fixing unit 66 for fixing an image on the transfer medium P, a scanner 90 that optically reads a document, an operations unit 407 arranged in a manner such that a portion thereof is exposed to the exterior side of the apparatus main body, a controller 400 for controlling overall operations of the digital multifunction image processing apparatus 11, and an engine control unit 500 for controlling operations of an engine unit, for example.

It is noted that in the present example, a color image processing apparatus is shown; however, the present invention may be applicable to a monochrome image processing apparatus as well. In such a case, only one process cartridge is included in the imaging apparatus.

Figure 29:
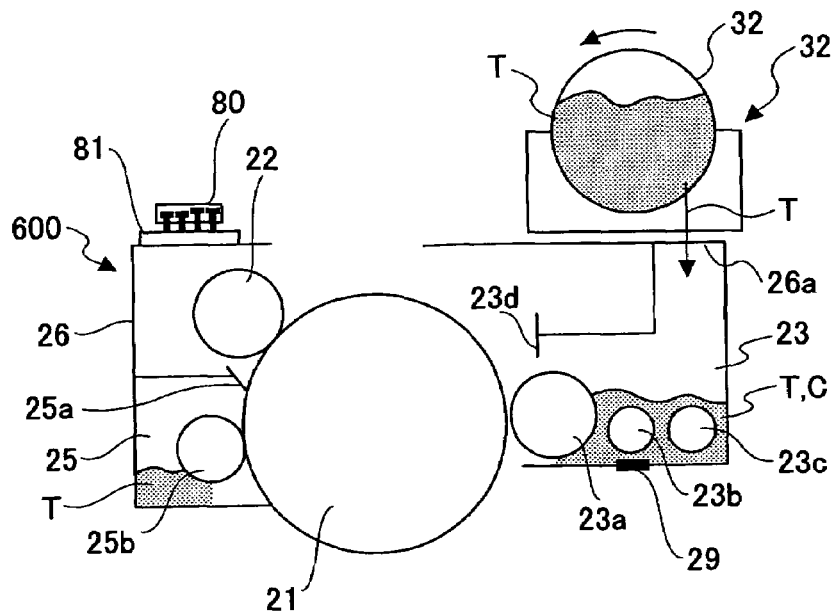
FIG. 29 is a cross-sectional view of a process cartridge shown in FIG. 28 that is not loaded in the digital multifunction image processing apparatus.
Figure 30:
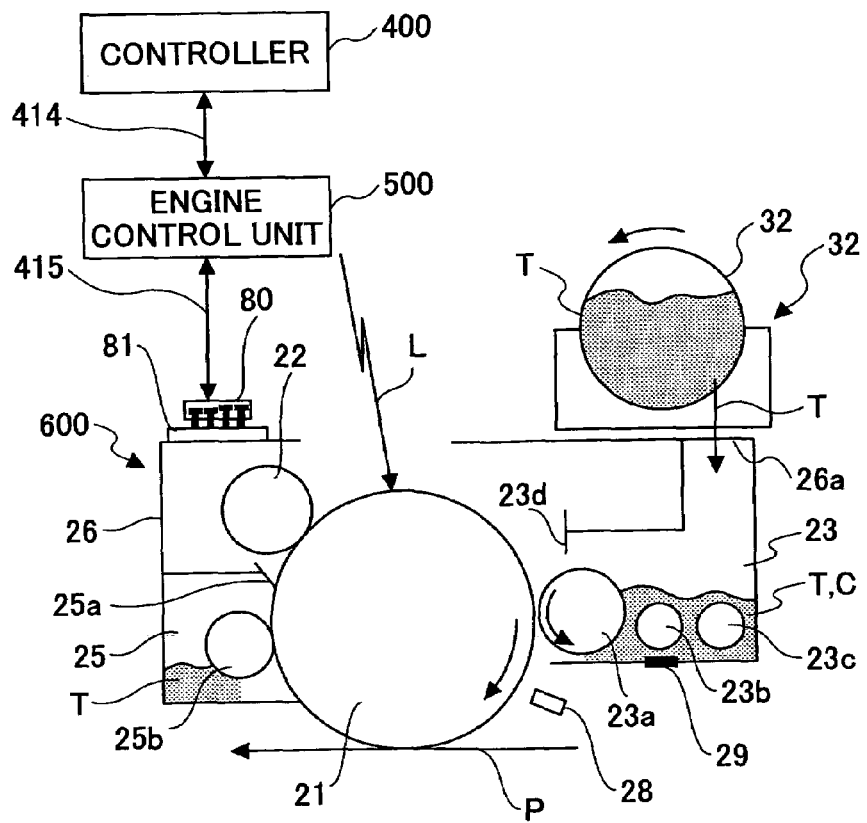
FIG. 30 is a cross-sectional view of the process cartridge that is loaded in the in the digital multifunction image processing apparatus.

FIGS. 29 and 30 are cross-sectional views of the process cartridge 600. FIG. 29 shows the process cartridge 600 that is not loaded in the digital multifunction image processing apparatus 11; and FIG. 30 shows the process cartridge 600 in a loaded state.

As is illustrated in these drawings, the process cartridge 600 includes a photoconductor drum 21 corresponding to an image supporting medium, an electrostatic unit 22, a developing unit 23, and a cleaning unit 25 that are accommodated within a case 26. The process cartridge also includes a toner supply unit 32. In this respect, the process cartridge 600 may be referred to as a toner cartridge.

The developing unit 23 includes a developing roller 23a, stirring rollers 23b, 23c, a doctor blade 23d, and a T sensor 29 (toner concentration sensor), for example. A developing agent that is made up of carrier C and toner T are accommodated inside the developing unit 23. It is noted that toner T that is accommodated within a toner bottle 33 of the toner supply unit 32 is supplied to the developing unit 23 as is necessary or desired in accordance with the consumption of toner T at the developing unit 23. It is noted that the cleaning unit 25 includes a cleaning blade 25a and a cleaning roller 25b, for example.

Also, in the illustrated example, a control chip 80 is fixed on top of the case 26 of the process cartridge 600. The control chip 80 corresponds to a microcomputer including a CPU and a NVRAM (nonvolatile memory) that is embodied by a packaged IC having an external terminal. The external terminal of the control chip 80 is connected to a connection terminal of a socket 81 that is attached to the case 26. It is noted that the control chip 80 is not limited to a particular configuration, and may take the form of an IC chip of a few millimeter-angle in size, or a PCB (printed circuit board) with an external terminal having an IC chip mounted thereon.

In the case of forming an image on a sheet of paper at the digital multifunction image processing apparatus 11, an electrostatic latent image is formed on the photoconductor drum 21 that is charged by a laser beam irradiated from the optical unit 2, and the latent image is developed into a prominent image with toner at the developing unit 23. The prominent image is then transferred by the transfer roller 24 shown in FIG. 28 to a sheet of paper supplied from the paper feeding unit 61, after which the image is fixed by the fixing unit 66.

It is noted that the service life of the process cartridge 600 is shorter than that of the digital multifunction image processing apparatus 11 main body. Thus, the process cartridge 600 corresponds to an expandable item that may be exchanged in a case where the photoconductor drum 21 or the cleaning unit 25 is worn down, or the toner within the toner bottle 33 is used up. In the case of exchanging the process cartridge 600, an operator may perform exchange operations on the apparatus main body exchanging processes with respect each individual process cartridges 600 that needs to be exchanged. In this case the operator may open a door (not shown) of the apparatus main body and insert the process cartridge 600 into the apparatus main body via a guide rail (not shown) so that the process cartridge 600 may be set to the apparatus main body.

Then, as is shown in FIG. 30, when the process cartridge is inserted inside the apparatus main body, the socket 81 of the process cartridge 600 is connected to the CPU 501 of the engine control unit 500 via a serial bus 415, and the control chip 80 may be able to establish communication with the controller 400 via the engine control unit 500 and a PCI bus 414.

The process cartridge 600 in such a state may perform image forming operations using the toner supplied from the toner bottle 33.

In this case, the consumption amount of the toner T accommodated within the developing unit 23 is detected by the toner concentration sensor (P sensor) 28 corresponding to an optical sensor that is arranged to face the photoconductor drum and the toner concentration sensor (T sensor) 29 corresponding to a magnetic permeability sensor that is arranged within the developing unit 23 of the process cartridge 600, and the detection result is informed to a CPU of the control chip 80.

Figure 31:
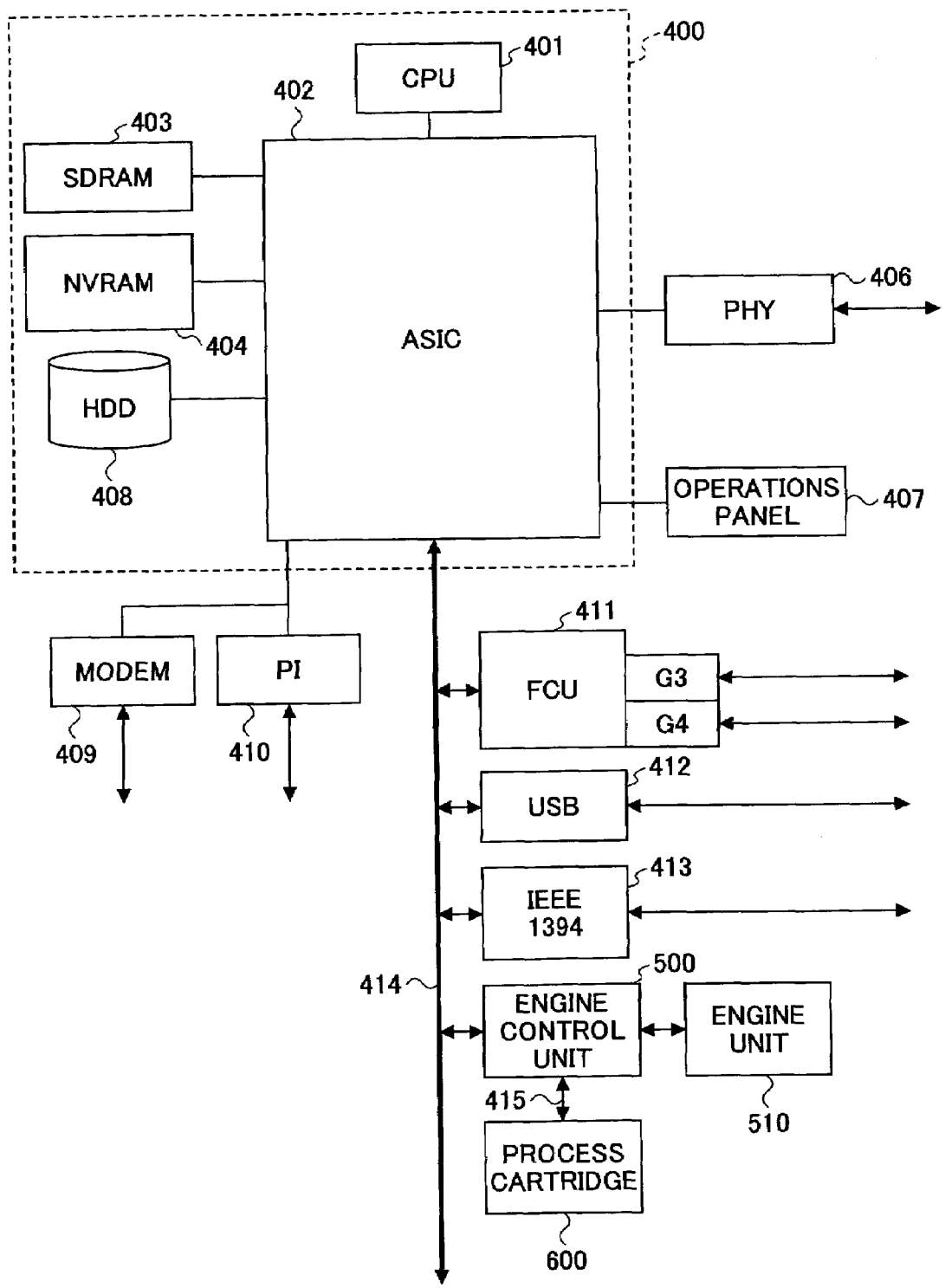
FIG. 31 is a block diagram illustrating an exemplary hardware configuration of the digital multifunction image processing apparatus of FIG. 28 associated with operations control and communication.

In the following, a hardware configuration of the digital multifunction image processing apparatus 11 associated with operations control and communication is described. FIG. 31 is a block diagram illustrating an exemplary hardware configuration of the digital multifunction image processing apparatus 11 associated with operations control and communication.

As is shown in this drawing, the digital multifunction image processing apparatus 11 includes a CPU 401, an ASIC (Application Specific Integrated Circuit) 402, a SDRAM 403, a NVRAM (nonvolatile memory) 404, a PHY (physical medium interface) 406, an operations unit 407, a HDD (hard disk drive) 408, a modem 409, a PI (personal interface) 410, a FCU (fax control unit) 411, a USB (universal serial bus) 412, IEEE1394 413, the engine control unit 500, the engine unit 510, and the process cartridge 600.

It is noted that the controller 400 corresponding to control means for controlling the overall operations of the digital multifunction image processing apparatus 11 includes the CPU 401, the ASIC 402, the SDRAM 403, the NVRAM 404, and the HDD 408.

The CPU 401 corresponds to computational processing means for performing data processes (functions control) via the ASIC 402.

The ASIC 402 corresponds to a multifunction device board that includes a CPU interface, a SDRAM interface, a local bus interface, PCI interface, a MAC (media access controller), and a HDD interface, for example. The ASIC 402 is arranged to enable sharing of the devices being subject to control by the CPU 401 and assist in achieving high efficiency in development of application software and/or a common system service from an architectural standpoint.

The SDRAM 403 corresponds to a main memory that may be used as a program memory storing various programs including the OS and/or a working memory that is used by the CPU 401 upon performing data processes, for example. It is noted that a DRAM or a SRAM may alternatively be used in place of the SDRAM 403.

The NVRAM 404 corresponds to a nonvolatile memory (storage means) that is configured to maintain its storage contents even when the power of the apparatus is turned off. The NVRAM 404 may be used as a program memory storing a boot loader (boot program) for activating the digital multifunction image processing apparatus 11 and/or an OS image corresponding to an OS file, a key storage part for storing a private key and/or a public key used in storing usable/unusable information in an expendable item such as the process cartridge 600, a certificate memory storing a digital certificate used in an authentication process based on PKI (public key infrastructure) between the apparatus main body and the expendable item, a fixed parameter memory for storing various types of fixed parameters having values that are rarely changed, and/or an apparatus number memory that stores the apparatus number of the digital multifunction image processing apparatus 11 corresponding to identification information of this apparatus, for example.

The PHY 406 corresponds to an interface for establishing communication with an external apparatus via a LAN.

The operations unit 407 corresponds to operation display means (i.e., operation means and display means).

The HDD 408 corresponds to storage means (storage medium) for storing data irrespective of whether the apparatus is turned on or off. It is noted that the programs and other data in the NVRAM 404 described above may be stored in this HDDD 408.

The modem 409 corresponds to modulation means and is configured to modulate data into a format for enabling the data to be transmitted through a public circuit in the case of transmitting data to an external apparatus via such a public circuit. Also, the modem 409 is configured to demodulate data upon receiving the data in a modulated format from an external apparatus.

The PI 410 includes an interface conforming to the RS485 standard and is connected to the public circuit via a line adapter (not shown).

The FCU 411 is configured to control communication with an external apparatus such as a digital copier or a digital multifunction printer having facsimile or modem functions (facsimile communication functions) via the public circuit.

The USB 412 and the IEEE1394 413 correspond to interfaces for establishing communication with peripheral apparatuses that conform to the USB standard and the IEEE1394 standard, respectively.

The engine control unit 500 corresponds to control means for controlling operations of the engine unit 510 according to instructions from the controller 400 as well as an interface for connecting the engine unit 510 to the PCI bus 414. Also the engine control unit 500 has a function of mediating communication between the CPU of the process cartridge 600 and the CPU 401 of the controller 400.

The engine unit 510 corresponds to a post-processing unit that performs post processes such as sorting, hole punching, and/or stapling processes on paper having an image formed thereon, the image being formed by an image reading/forming engine or a plotter engine shown in FIG. 28, for example.

The process cartridge 600 is connected to the engine control unit 500 via the serial bus 415 as is described above.

When the power of the digital multifunction image processing apparatus 11 is turned on, the CPU 401 activates the boot loader within the NVRAM 404 via the ASIC 402, reads the OS image within the NVRAM 404 according to the boot loader, and loads the OS in the SDRAM 403 to develop the OS into a usable state. When the development of the OS is completed, the OS is activated. Then, applications within the NVRAM 404 or NRS applications within the NRS memory 405 may be read, loaded in the SDRAM 403, developed, and activated as is necessary or desired to realize the various functions of the digital multifunction image processing apparatus 11.

In the digital multifunction image processing apparatus 11 according to the present embodiment, usable/unusable information as is described in relation to the first embodiment may be stored in a memory of the process cartridge 600, and when the apparatus is activated in response to power-on or reset operations, an initialization process may be started in which process the CPU 401 of the controller 400 may execute the process steps illustrated in FIG. 10 to determine whether the process cartridge 600 corresponds to a qualified recycled item or a genuine item. When it is determined that the process cartridge 600 does not correspond to a qualified recycled item or a genuine item, a warning may be issued. In other words, the process cartridge 600 according to the present embodiment may correspond to the expendable item 200 according to the first embodiment, and component parts other than the process cartridge 600 (e.g., controller 400) of the digital multifunction image processing apparatus 11 according to the present embodiment may correspond to the electronic apparatus main body 100 of the first embodiment, and these units may be arranged to perform operations similar to those of the first embodiment.

Figure 32:
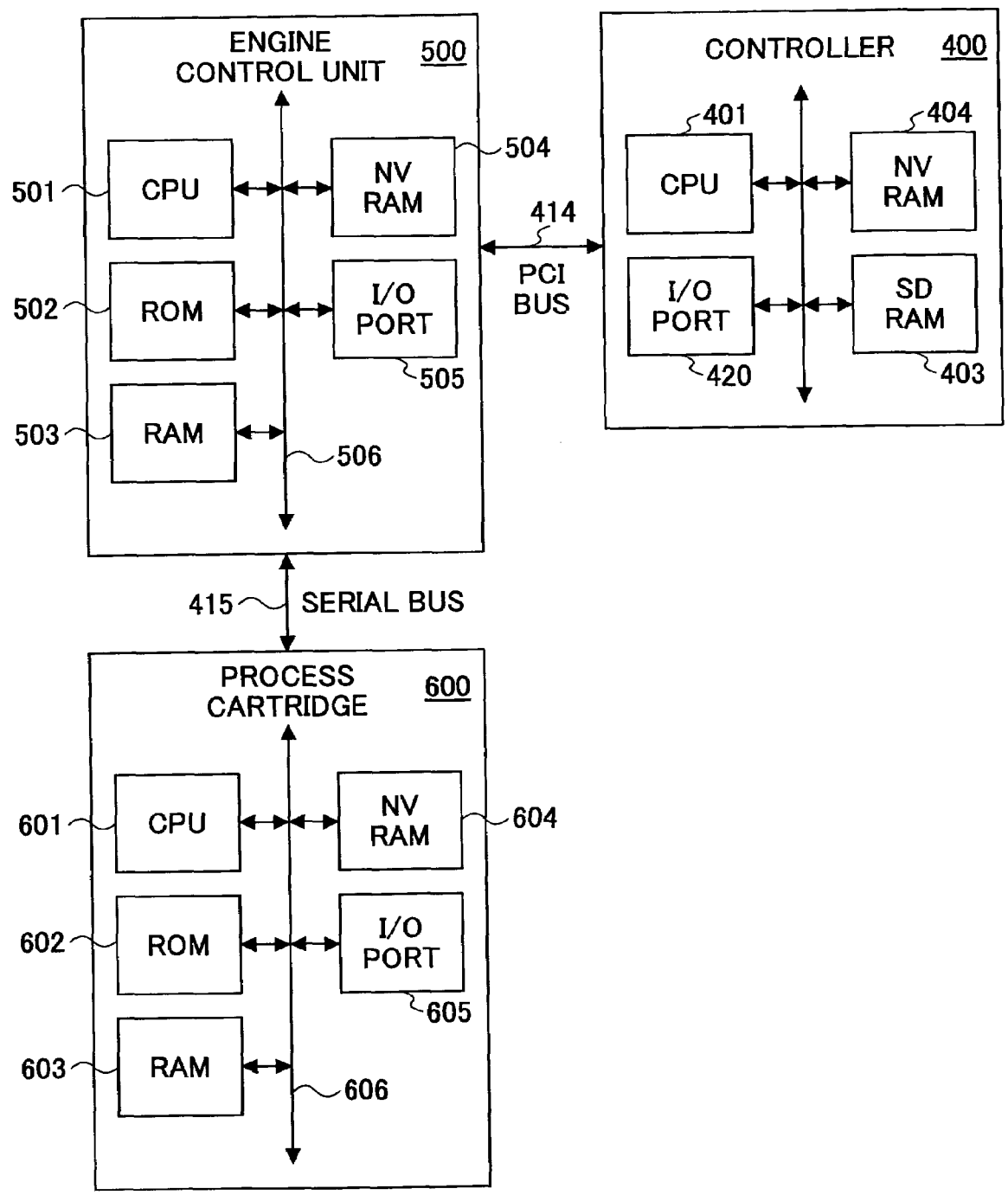
FIG. 32 is a block diagram showing hardware configurations associated with the determination and warning processes performed in the digital multifunction image processing apparatus of FIG. 28.

FIG. 32 is a block diagram showing hardware configurations associated with the determination and warning processes. It is noted that in the following description, the configuration and processes of one process cartridge are explained. However, in a case where plural process cartridges are used, the other process cartridges 600 may have configurations identical to that described below, and the processes described below may be performed in a parallel manner or in a serial manner between the controller 400 and the engine control unit 500.

In the determination process, the controller 400, the engine control unit 500, and the process cartridge 600 are involved.

The controller has a configuration as is described above with reference to FIG. 31; however, in the present drawing, only relevant parts of the controller 400 are shown. Also, it is noted that in the illustrated example, the controller 400 includes an I/O port 420 corresponding to a connection port of the ASIC 402 for establishing connection with the PCI bus 414.

The engine control unit 500 includes a CPU 501, a ROM 502, a RAM 503, an NVRAM 504, and an I/O port 505 that are interconnected by an internal bus 506. The CPU 501 is configured to execute programs stored in the ROM 502 or the NVRAM 504 to perform processes pertaining to control of the engine unit 510 and data communication between the controller 400 and the process cartridge 600.

The process cartridge 600 includes a CPU 601, a ROM 602, a RAM 603, a NVRAM 605, and an I/O port 605 that are interconnected by an internal bus 606. The NVRAM 604 stores a digital certificate and a key used for the authentication process as is described above. The CPU 601 is configured to execute programs stored in the ROM 602 or the NVRAM 604 to perform processes pertaining to control and data management of the process cartridge 600 and data communication with the engine control unit 500. It is noted that the above-described component parts of the process cartridge 600 may be provided in the control chip 80 or the socket 81, for example.

In a case where the controller 400 and the process cartridge 600 are to communication with each other in the present example, the engine control unit 500 may simply function as a mediating unit for mediating the communication between the controller 400 and the process cartridge 600.

Figure 33:
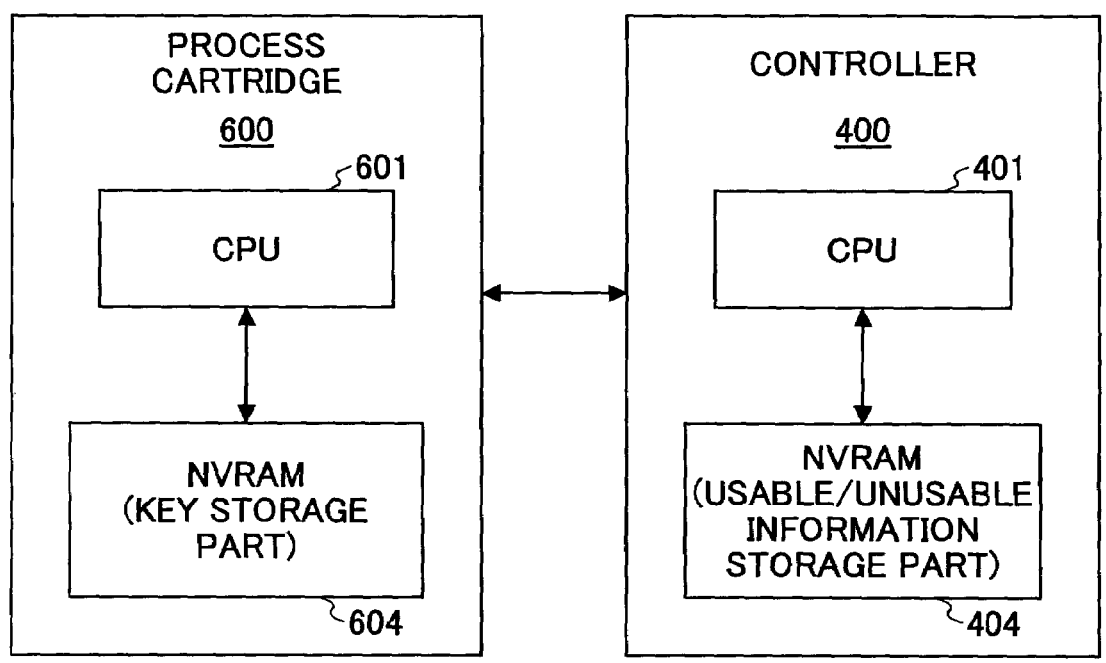
FIG. 33 is a block diagram illustrating the configuration of FIG. 32 in a simplified manner.

FIG. 33 is a block diagram illustrating parts particularly associated with information exchange between the controller 400 and the process cartridge 600 in the determination process for the process cartridge 600.

According to the present example, the CPU 401 of the controller 400 reads from the NVRAM 404 functioning as the key storage part information such as the private key information and the public key information of the digital multifunction image processing apparatus 11 that is required for writing usable/unusable information in the process cartridge 600.

Also, the CPU 601 of the process cartridge 600 reads from the NVRAM 604 functioning as the usable/unusable information storage part information such as usable/unusable information and public key information that is required for performing the identification process for identifying the process cartridge 600. Then, communication between the CPU 401 and the CPU 601 is established, and the read information is used for realizing the identification process and the usable/unusable information writing process. It is noted that component parts shown in FIG. 32 other than those corresponding to the parts shown in FIG. 33 may correspond to supplementary parts used for assisting the execution of the processes described above.

It is noted that by controlling the digital multifunction image processing apparatus 11 and the process cartridge 600 to store information and perform processes similar to those described in relation to the first embodiment, advantageous effects similar to those of the first embodiment may be obtained.

Also, it is noted that according to the present embodiment, the expendable item recycling apparatus may be embodied by a refill apparatus that refills a used process cartridge 600 with toner so as to enable its reuse, for example.

Also, it is noted that modified examples of the first embodiment may also be applied to the present embodiment.

Also, it is noted that a program according to an embodiment of the present invention may be run on a computer and executed by the computer to perform processes of controlling an electronic apparatus or an expendable item recycling apparatus according to the embodiments and modified examples described above.

It is noted that such a program according to an embodiment of the present invention may be stored in storage means such as a ROM or a HDD that is provided in the computer beforehand. Also, the program may be stored in a nonvolatile storage medium (memory) such as a CD-ROM, a flexible disk, a SRAM, a EEPROM, or a memory card, for example. In this case, the program stored in the memory may be installed in the computer so that the CPU may execute the program, or the CPU of the computer may be arranged to read the program from the memory to execute the program. Alternatively, the program may be downloaded from an external apparatus connected to a network, for example.

As can be appreciated from the above descriptions, according to embodiments of the present invention, when using a recyclable expendable item in an electronic apparatus, a determination may be easily made as to whether the expendable item corresponds to a genuine item/qualified recycled item or a non-genuine item/unqualified recycled item, and use of the genuine item/qualified recycled item may be encouraged/promoted. Accordingly, quality control/management of an electronic apparatus by a manufacturer/supplier may be facilitated.

Further, it is noted that the present invention is not limited to the embodiments described above, and variations and modifications may be made without departing from the scope of the present invention.

The present application is based on and claims the benefit of the earlier filing date of Japanese Patent Application No. 2004-227081 filed on Aug. 3, 2004, the entire contents of which are hereby incorporated by reference.

What is claimed is:

1. An electronic apparatus comprising:
   a recyclable expendable item that stores usable/unusable information pertaining to the expendable item, first encrypted information generated by encrypting information corresponding to the usable/unusable information using a first key, and a second key corresponding to the first key;
   a decoding part that decodes the first encrypted information using the second key; and
   a control part that controls an operation of the electronic apparatus based on a decoding result of the decoding part and the usable/unusable information.

2. The electronic apparatus as claimed in claim 1, further comprising:
   a first write part that writes in the expendable item the usable/unusable information and second encrypted information generated by encrypting the information corresponding to the usable/unusable information using a third key; and
   a second write part that writes in the expendable item a fourth key corresponding to the third key.

3. The electronic apparatus as claimed in claim 2, wherein the fourth key corresponds to a public key for the electronic apparatus, and the third key corresponds to a private key corresponding to said public key.

4. The electronic apparatus as claimed in claim 1, wherein the first key corresponds to a private key, and the second key corresponds to a public key corresponding to said private key.

5. The electronic apparatus as claimed in claim 1, wherein the control part includes a signaling part that signals a user when the usable/unusable information corresponds to information indicated as unusable.

6. The electronic apparatus as claimed in claim 1, further comprising:
a third write part that writes in the expendable item information indicating that the expendable item is unusable as the useable/unusable information when the expendable item becomes unusable.

7. An electronic apparatus comprising:
a recyclable expendable item that stores first encrypted information generated by encrypting usable/unusable information pertaining to the expendable item using a first key, and a second key corresponding to the first key;
a decoding part that decodes the first encrypted information using the second key; and
a control part that controls an operation of the electronic apparatus based on a decoding result of the decoding part and decoded usable/unusable information obtained by the decoding part.

8. The electronic apparatus as claimed in claim 7, further comprising:
a first write part that writes in the expendable item second encrypted information generated by encrypting the usable/unusable information using a third key; and
a second write part that writes in the expendable item a fourth key corresponding to the third key.

9. The electronic apparatus as claimed in claim 8, wherein the fourth key corresponds to a public key for the electronic apparatus, and the third key corresponds to a private key corresponding to said public key.

10. The electronic apparatus as claimed in claim 7, wherein
the first key corresponds to a private key, and the second key corresponds to a public key corresponding to said private key.

11. The electronic apparatus as claimed in claim 7, wherein
the control part includes a signaling part that signals a user when the usable/unusable information corresponds to information indicated as unusable.

12. The electronic apparatus as claimed in claim 7, further comprising:
a third write part that writes in the expendable item information indicating that the expendable item is unusable as the useable/unusable information when the expendable item becomes unusable.

13. An expendable item recycling apparatus that is configured to recycle a recyclable expendable item used in an electronic apparatus, the expendable item recycling apparatus comprising:
a write part that writes in the expendable item usable/unusable information indicating that the expendable item is usable, encrypted information generated by encrypting information corresponding to the usable/unusable information using a first key, and a second key corresponding to the first key when the expendable item is recycled.

14. The expendable item recycling apparatus as claimed in claim 13, wherein
the first key corresponds to a private key, and the second key corresponds to a public key corresponding to said private key.

15. The expendable item recycling apparatus as claimed in claim 13, wherein
the second key corresponds to a public key for the expendable item recycling apparatus, and the first key corresponds to a private key corresponding to said public key.

16. An expendable item recycling apparatus that is configured to recycle a recyclable expendable item used in an electronic apparatus, the expendable item recycling apparatus comprising:
a write part that writes in the expendable item encrypted information generated by encrypting usable/unusable information indicating that the expendable item is usable using a first key, and a second key corresponding to the first key when the expendable item is recycled.

17. The expendable item recycling apparatus as claimed in claim 16, wherein
the first key corresponds to a private key, and the second key corresponds to a public key corresponding to said private key.

18. The expendable item recycling apparatus as claimed in claim 16, wherein
the second key corresponds to a public key for the expendable item recycling apparatus, and the first key corresponds to a private key corresponding to said public key.

19. A recyclable expendable item configured to be used in an electronic apparatus, the expendable item comprising:
a storage part storing usable/unusable information pertaining to the expendable item, encrypted information generated by encrypting information corresponding to the usable/unusable information using a first key, and a second key corresponding to the first key.

20. A method of controlling an electronic apparatus that uses a recyclable expendable item that stores usable/unusable information pertaining to the expendable item, first encrypted information generated by encrypting information corresponding to the usable/unusable information using a first key, and a second key corresponding to the first key, the method comprising the steps of controlling the electronic apparatus to execute:
a decoding procedure for decoding the first encrypted information using the second key; and
a control procedure for performing an operation according to a decoding result of the decoding procedure and the usable/unusable information.

21. The method as claimed in claim 20, further comprising the steps for controlling the electronic apparatus to execute:
a first write procedure for writing in the expendable item the usable/unusable information and second encrypted information generated by encrypting the information corresponding to the usable/unusable information using a third key; and
a second write procedure for writing in the expendable item a fourth key corresponding to the third key.

22. The method as claimed in claim 21, wherein
the fourth key corresponds to a public key for the electronic apparatus, and the third key corresponds to a private key corresponding to said public key.

23. The method as claimed in claim 20, wherein
the first key corresponds to a private key, and the second key corresponds to a public key corresponding to said private key.

24. The method as claimed in claim 20, wherein
the control procedure includes a signaling procedure for signaling a user when the usable/unusable information corresponds to information indicated as unusable.

25. The method as claimed in claim 20, further comprising:
a third writing procedure for writing in the expendable item information indicating that the expendable item is unusable as the useable/unusable information when the expendable item becomes unusable.

26. A method of controlling an electronic apparatus that uses a recyclable expendable item that stores first encrypted information generated by encrypting usable/unusable information pertaining to the expendable item using a first key, and a second key corresponding to the first key, the method comprising the steps of controlling the electronic apparatus to execute:
a decoding procedure for decoding the first encrypted information using the second key; and
a control procedure for performing an operation according to a decoding result of the decoding procedure and decoded usable/unusable information obtained from the decoding procedure.

27. The method as claimed in claim 26, further comprising:
a first writing procedure for writing in the expendable item second encrypted information generated by encrypting the usable/unusable information using a third key; and
a second writing procedure for writing in the expendable item a fourth key corresponding to the third key.

28. The method as claimed in claim 27, wherein
the fourth key corresponds to a public key for the electronic apparatus, and the third key corresponds to a private key corresponding to said public key.

29. The method as claimed in claim 26, wherein
the first key corresponds to a private key, and the second key corresponds to a public key corresponding to said private key.

30. The method as claimed in claim 26, wherein
the control procedure includes a signaling procedure for signaling a user when the usable/unusable information corresponds to information indicated as unusable.

31. The method as claimed in claim 26, further comprising:
a third writing procedure for writing in the expendable item information indicating that the expendable item is unusable as the useable/unusable information when the expendable item becomes unusable.

32. An expendable item recycling method for recycling a recyclable expendable item that is used in an electronic apparatus, the method comprising:
a recycling procedure for recycling the expendable item; and
a write procedure for writing in the recycled expendable item usable/unusable information indicating that the expendable item is usable, encrypted information generated by encrypting information corresponding to the usable/unusable information using a first key, and a second key corresponding to a first key.

33. The method as claimed in claim 32, wherein
the first key corresponds to a private key, and the second key corresponds to a public key corresponding to said private key.

34. The method as claimed in claim 32, wherein
the second key corresponds to a public key for the expendable item recycling apparatus, and the first key corresponds to a private key corresponding to said public key.

35. An expendable item recycling method for recycling a recyclable expendable item that is used in an electronic apparatus, the method comprising:
a recycling procedure for recycling the expendable item; and
a write procedure for writing in the recycled expendable item encrypted information generated by encrypting usable/unusable information indicating that the expendable item is usable using a first key, and a second key corresponding to the first key.

36. The method as claimed in claim 35, wherein
the first key corresponds to a private key, and the second key corresponds to a public key corresponding to said private key.

37. The method as claimed in claim 35, wherein
the second key corresponds to a public key for the expendable item recycling apparatus, and the first key corresponds to a private key corresponding to said public key.

38. A computer readable medium storing a program run on a computer for controlling an electronic apparatus that uses a recyclable expendable item storing usable/unusable information pertaining to the expendable item, encrypted information generated by encrypting information corresponding to the usable/unusable information using a first key, and a second key corresponding to the first key, the program being executed by the computer to perform the steps of:
decoding the encrypted information using the second key; and
controlling an operation of the electronic apparatus based on a decoding result of the decoding step and the usable/unusable information.

39. A computer-readable medium storing a program run on a computer for controlling an expendable item recycling apparatus that recycles a recyclable expendable item that is used in an electronic apparatus, the program being executed by the computer to perform a step of:
writing in the expendable item usable/unusable information indicating that the expendable item is usable, encrypted information generated by encrypting usable/unusable information pertaining to the expendable item, encrypted information generated by encrypting information corresponding to the usable/unusable information using a first key, and a second key corresponding to the first key when the expendable item is recycled by the expendable item recycling apparatus.

* * * * *